US012575919B2

(12) United States Patent

Scherrer et al.

(10) Patent No.: US 12,575,919 B2

(45) Date of Patent: Mar. 17, 2026

---

(54) ELECTRICAL BODY CARE BRUSH

(71) Applicant: TRISA HOLDING AG, Triengen (CH)

(72) Inventors: Jonas Scherrer, Sempach (CH); Marc Bauhofer, Egolzwil (CH)

(73) Assignee: TRISA HOLDING AG, Triengen (CH)

( * ) Notice: Subject to any disclaimer, the term of this patent is extended or adjusted under 35 U.S.C. 154(b) by 7 days.

(21) Appl. No.: 18/210,236

(22) Filed: Jun. 15, 2023

(65) Prior Publication Data

US 2023/0320828 A1 Oct. 12, 2023

Related U.S. Application Data

(63) Continuation of application No. 16/499,544, filed as application No. PCT/EP2018/057223 on Mar. 22, 2018, now abandoned.

(30) Foreign Application Priority Data

| Mar. 31, 2017 | (EP) | ..................................... | 17164182 |
| Aug. 11, 2017 | (WO) | ................. | PCT/EP2017/070406 |

(51) Int. Cl.
| *A61C 17/34* | (2006.01) |
| *A46B 9/04* | (2006.01) |
| *A61C 17/22* | (2006.01) |

(52) U.S. Cl.
CPC ........ *A61C 17/3436* (2013.01); *A61C 17/222* (2013.01); *A46B 9/04* (2013.01); *A46B 2200/1066* (2013.01)

(58) Field of Classification Search
CPC ... A61C 17/3436; A61C 17/222; A46B 13/02; A46B 13/008; A46B 5/0095; A46B 9/04
See application file for complete search history.

(56) References Cited

U.S. PATENT DOCUMENTS

| 3,196,299 | A | | 7/1965 | Kott | |
| 4,047,822 | A | * | 9/1977 | Lehmann | ............ F16B 12/2036 |
| | | | | | 403/187 |
| 5,625,916 | A | | 5/1997 | McDougall | |
| 5,652,990 | A | | 8/1997 | Driesen et al. | |
| 5,732,432 | A | * | 3/1998 | Hui | ...................... A61C 17/222 |
| | | | | | 15/28 |
| D401,414 | S | | 11/1998 | Vrignaud | |
| 5,862,558 | A | | 1/1999 | Hilfinger et al. | |
| 5,974,615 | A | | 11/1999 | Schwarz-Hartmann et al. | |

(Continued)

FOREIGN PATENT DOCUMENTS

| CN | 101516290 A | 8/2009 |
| CN | 104320992 A | 1/2015 |

(Continued)

OTHER PUBLICATIONS

Sep. 4, 2018 International Search Report issued in International Patent Application No. PCT/EP2018/057223.

(Continued)

*Primary Examiner* — Laura C Guidotti

(74) *Attorney, Agent, or Firm* — Oliff PLC

(57) ABSTRACT

An attachment brush part for an electrical body care brush, in particular an electrical toothbrush, includes brush head with an in particular circular bristle carrier, on which a bristle field with a plurality of bristle bundles each with a plurality of care bristles is arranged.

20 Claims, 22 Drawing Sheets

(56) References Cited

U.S. PATENT DOCUMENTS

Figures 1A, 1B, 1C:
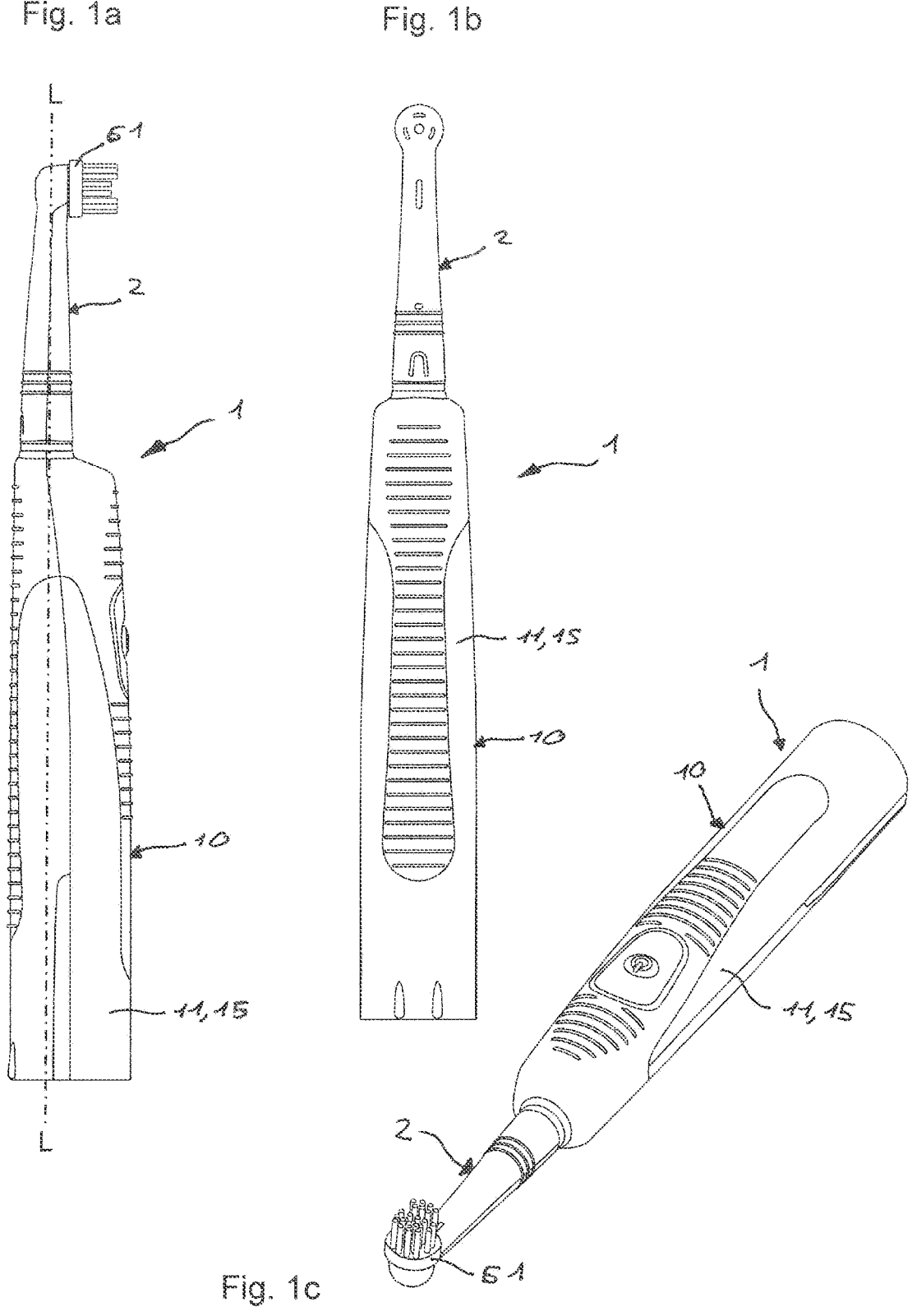

| | | | |
|---|---|---|---|
| 6,421,867 B1 | 7/2002 | Weihrauch | |
| 6,511,319 B1 * | 1/2003 | Hunter .............. A61C 17/3436 433/125 | |
| 6,523,907 B1 | 2/2003 | Buckner et al. | |
| 6,581,234 B2 | 6/2003 | Lee et al. | |
| 6,851,150 B2 | 2/2005 | Chiang | |
| D579,664 S | 11/2008 | Fisher et al. | |
| D623,415 S | 9/2010 | Geiberger | |
| 7,788,756 B2 | 9/2010 | Kraemer | |
| 7,934,284 B2 * | 5/2011 | Braun ................... A46B 9/028 15/28 | |
| 8,621,698 B2 | 1/2014 | Chenvainu et al. | |
| 9,095,206 B2 | 8/2015 | Varila | |
| 9,364,303 B2 | 6/2016 | Driesen et al. | |
| 9,439,741 B2 | 9/2016 | Dishon | |
| 2003/0131427 A1 | 7/2003 | Hilscher et al. | |
| 2003/0163881 A1 | 9/2003 | Driesen et al. | |
| 2004/0034951 A1 | 2/2004 | Davies et al. | |
| 2004/0200016 A1 | 10/2004 | Chan et al. | |
| 2009/0211043 A1 | 8/2009 | Kressner | |
| 2011/0247154 A1 | 10/2011 | Driesen et al. | |
| 2012/0124759 A1 | 5/2012 | Fritsch | |
| 2013/0139339 A1 | 6/2013 | Hess et al. | |
| 2014/0359957 A1 | 12/2014 | Jungnickel | |
| 2014/0359958 A1 | 12/2014 | Jungnickel et al. | |
| 2015/0320529 A1 | 11/2015 | Schaefer et al. | |
| 2016/0331116 A1 | 11/2016 | Follows et al. | |
| 2017/0189151 A1 | 7/2017 | Fischer et al. | |
| 2018/0228583 A1 | 8/2018 | Fischer et al. | |

FOREIGN PATENT DOCUMENTS

| | | | | |
|---|---|---|---|---|
| DE | 39 22 889 A1 | 3/1990 | | |
| DE | 4438732 A1 | 5/1996 | | |
| DE | 19627752 A1 | 1/1998 | | |
| DE | 19734287 A1 | 2/1999 | | |
| DE | 10209320 A1 | 9/2003 | | |
| DE | 10211391 A1 | 10/2003 | | |
| EP | 0145039 B1 | 4/1990 | | |
| EP | 0716821 A1 | 6/1996 | | |
| EP | 0765642 A2 | 4/1997 | | |
| EP | 0850027 B1 | 5/2002 | | |
| EP | 1844733 A2 | 10/2007 | | |
| EP | 1905382 A1 | 4/2008 | | |
| EP | 2184033 A1 | 5/2010 | | |
| EP | 1480579 B1 | 1/2011 | | |
| EP | 2454967 A1 * | 5/2012 | .............. A46B 7/04 | |
| EP | 2543277 A1 | 1/2013 | | |
| EP | 2543278 A2 | 1/2013 | | |
| EP | 2810580 A1 | 12/2014 | | |
| GB | 2366995 A * | 3/2002 | ............ A61C 17/26 | |
| JP | 2000-000119 A | 1/2000 | | |
| JP | 5373099 B2 | 12/2013 | | |
| KR | 200331449 Y1 * | 10/2003 | ............ A61C 17/26 | |
| KR | 200365918 Y1 * | 10/2004 | ........ A61C 17/3436 | |
| WO | 9741753 A1 | 11/1997 | | |
| WO | 03073958 A1 | 9/2003 | | |
| WO | 03077790 A1 | 9/2003 | | |
| WO | 2004/000155 A1 | 12/2003 | | |
| WO | 2004/098444 A1 | 11/2004 | | |
| WO | 2004/098445 A1 | 11/2004 | | |
| WO | 2008/040401 A1 | 4/2008 | | |
| WO | 2010/052658 A1 | 5/2010 | | |
| WO | 2013/005184 A1 | 1/2013 | | |
| WO | 2013/020237 A1 | 2/2013 | | |
| WO | 2013/170390 A1 | 11/2013 | | |

OTHER PUBLICATIONS

Oct. 1, 2019 International Preliminary Report on Patentability issued in International Patent Application No. PCT/ EP2018/ 057223.

U.S. Appl. No. 16/499,513, filed Sep. 30, 2019 in the name of Jonas Scherrer et al.

Oct. 1, 2019 International Preliminary Report on Patentability issued in International Patent Application No. PCT/EP2017/ 070406.

Jan. 3, 2018 International Search Report issued in International Patent Application No. PCT/EP2017/070406.

Oct. 8, 2021 Office Action issued in U.S. Appl. No. 16/499,513.

Apr. 11, 2022 Office Action issued in U.S. Appl. No. 16/499,513.

Oct. 29, 2024 Search Report issued in European Patent Application No. 24180914.

* cited by examiner

Fig. 3a
Fig. 3b
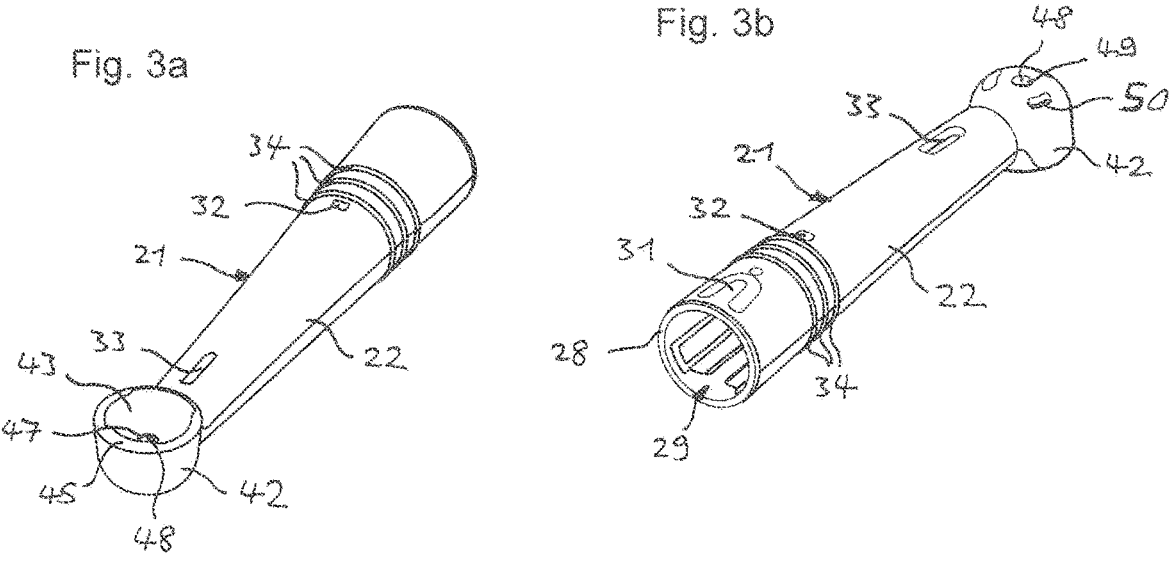
Fig. 3c
Fig. 3d
Fig. 3e
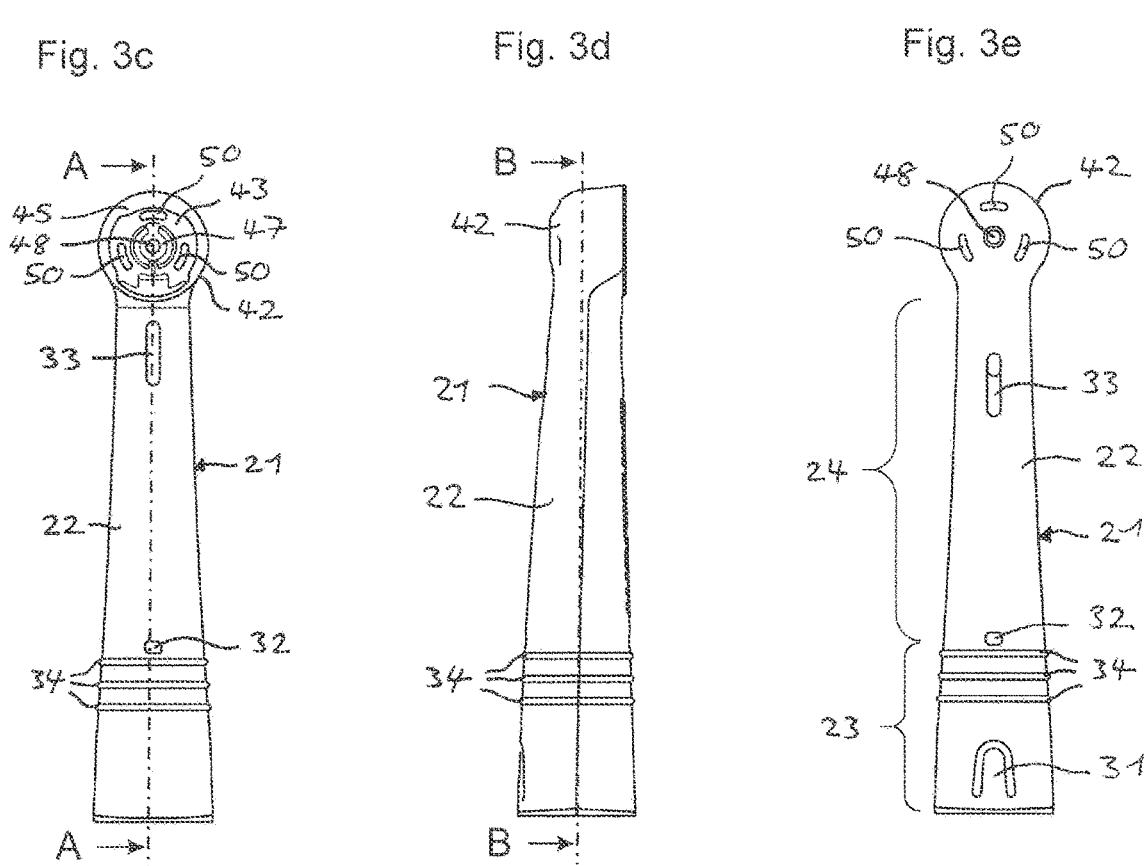

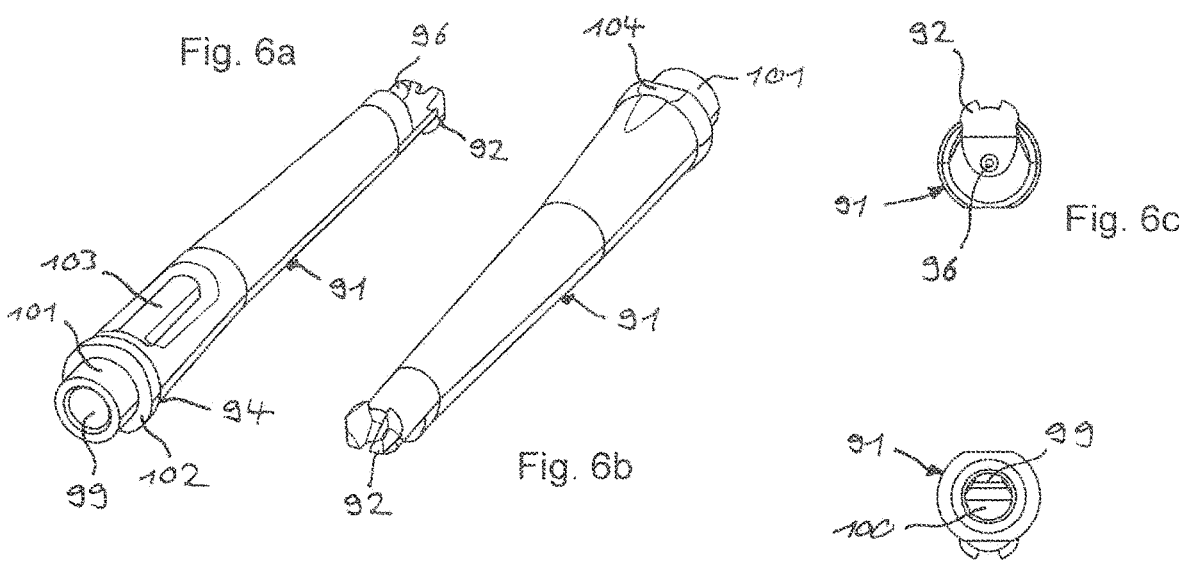
Fig. 6a
Fig. 6b
Fig. 6c
Fig. 6d
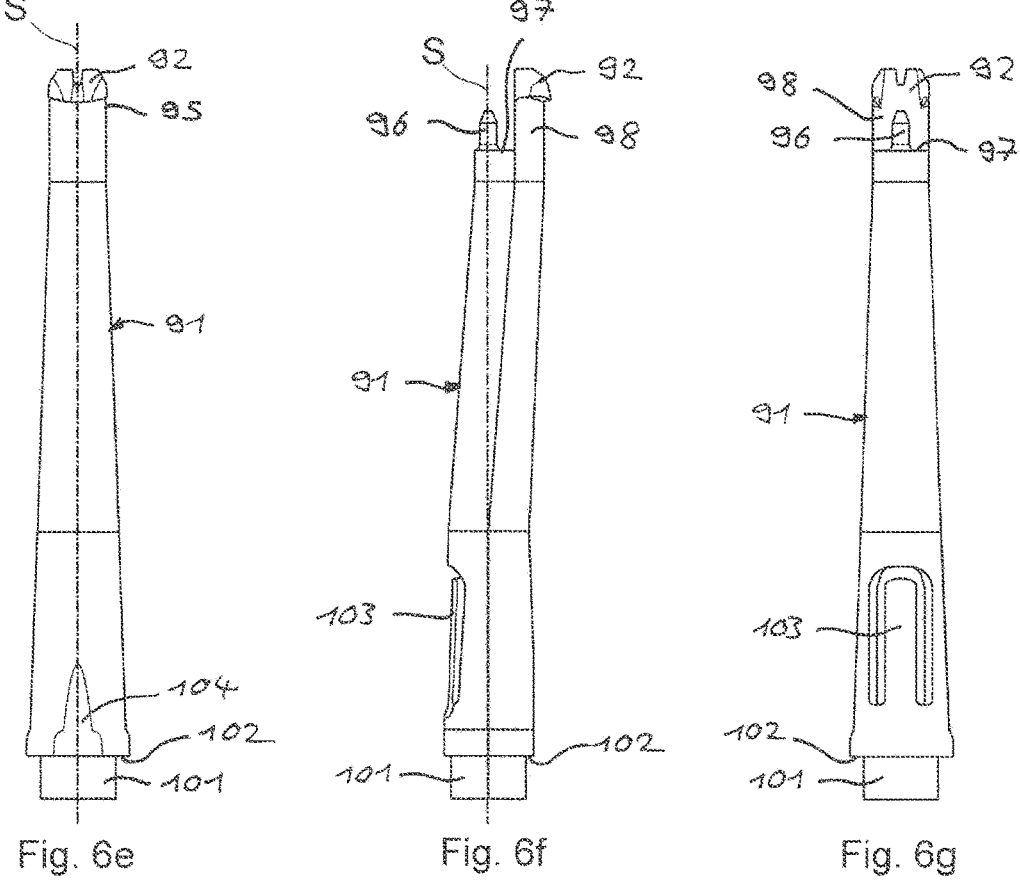
Fig. 6e
Fig. 6f
Fig. 6g

Fig. 7a
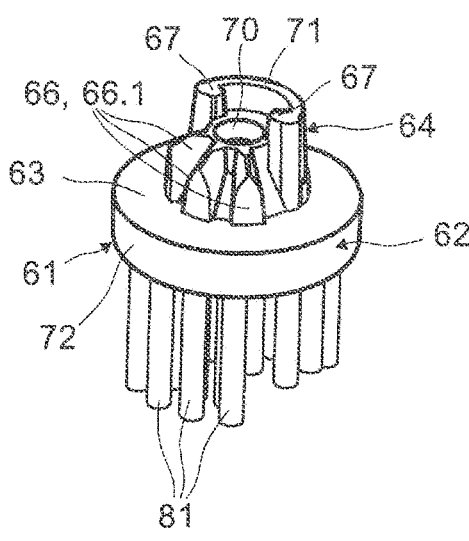
Fig. 7b
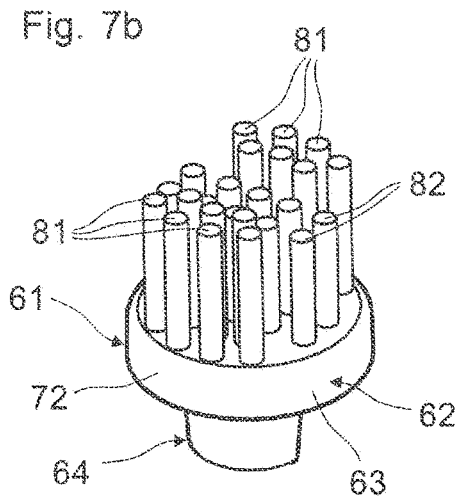
Fig. 7c
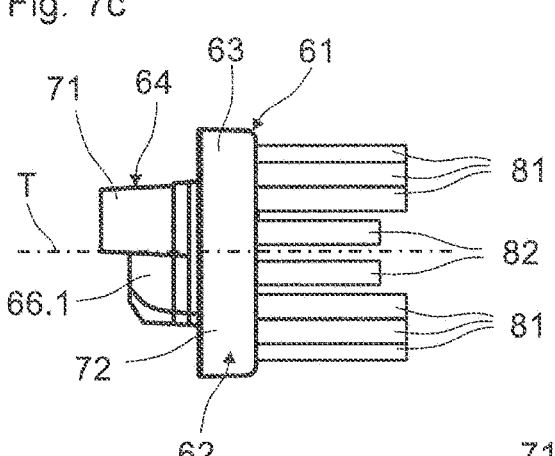
Fig. 7d
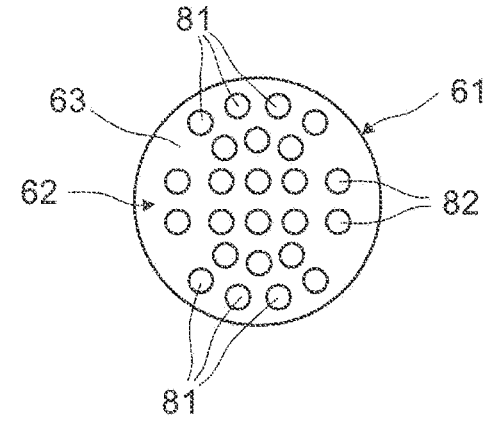
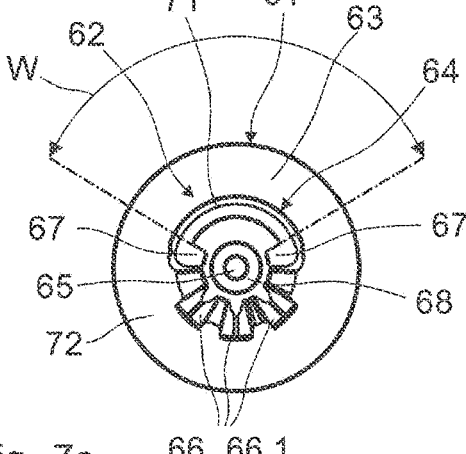
Fig. 7e Fig. 8a
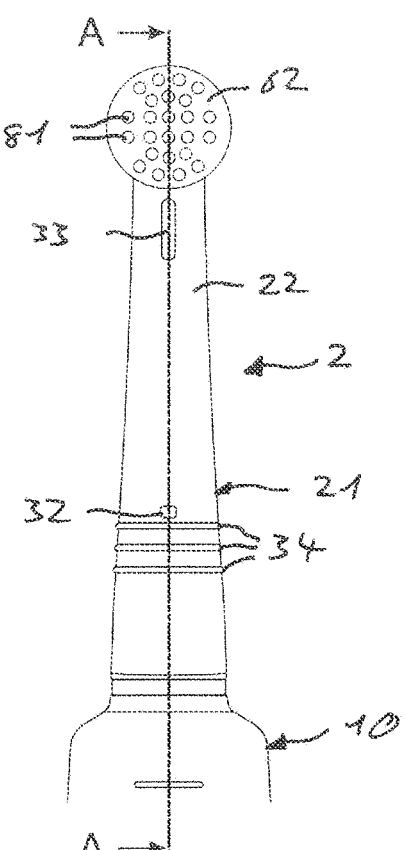
Fig. 8b
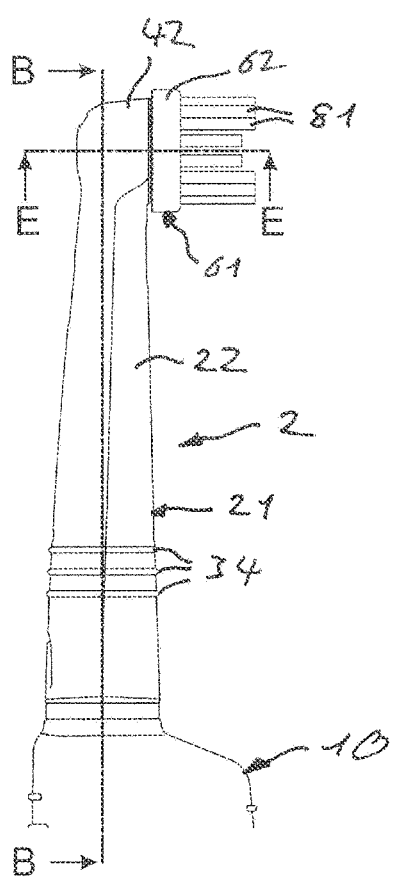
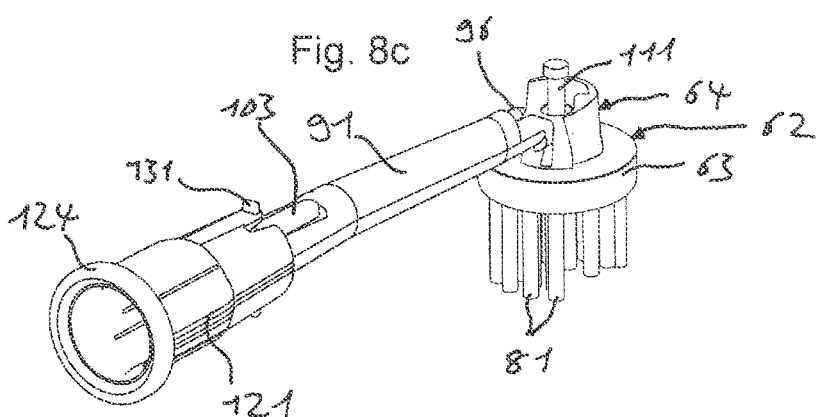
Fig. 8c

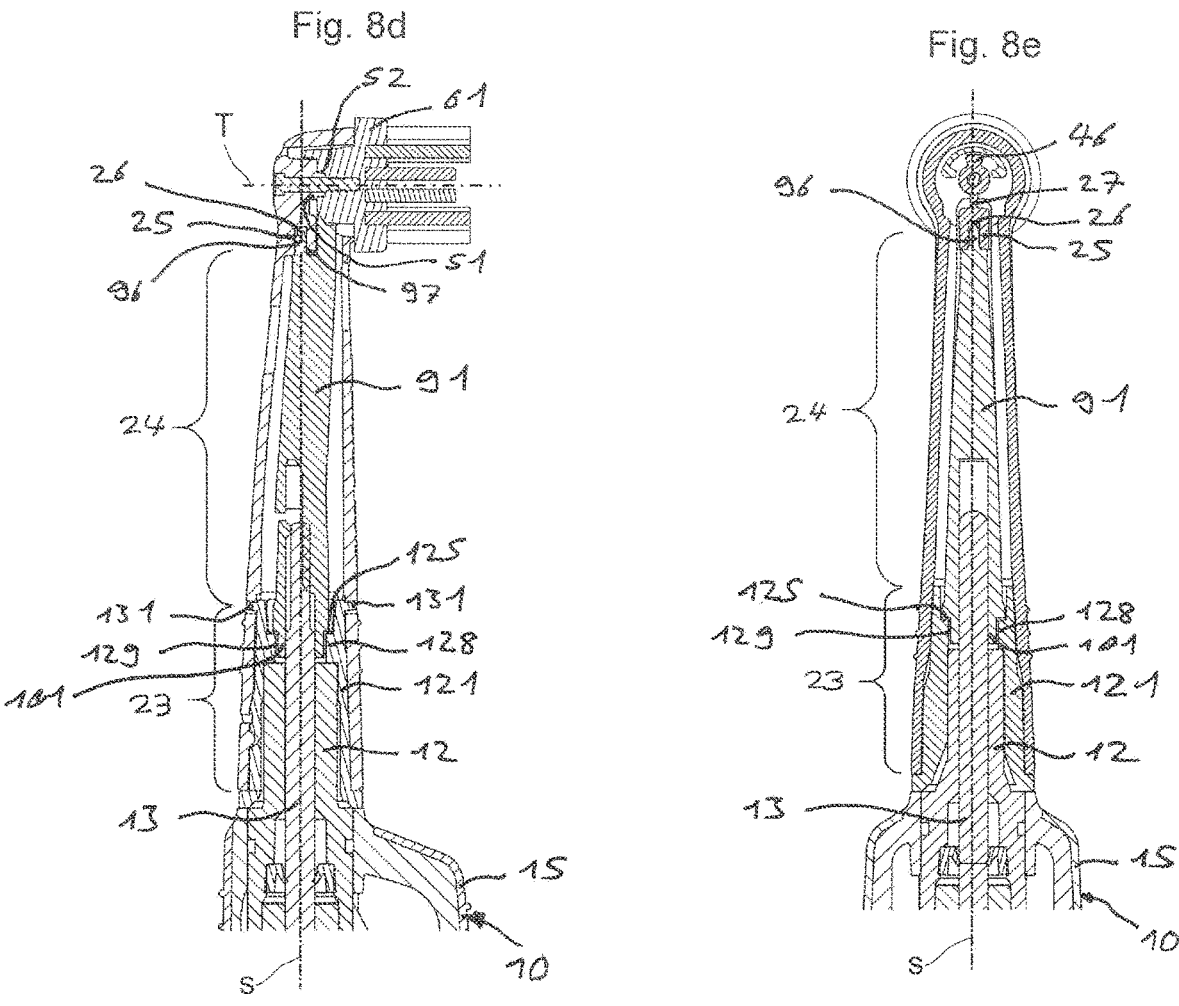
Fig. 8d
Fig. 8e
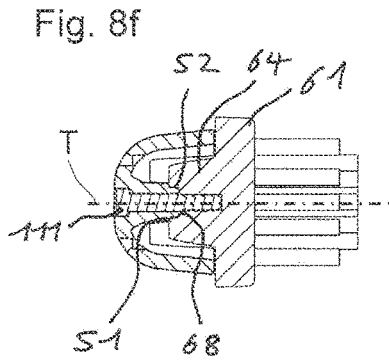
Fig. 8f

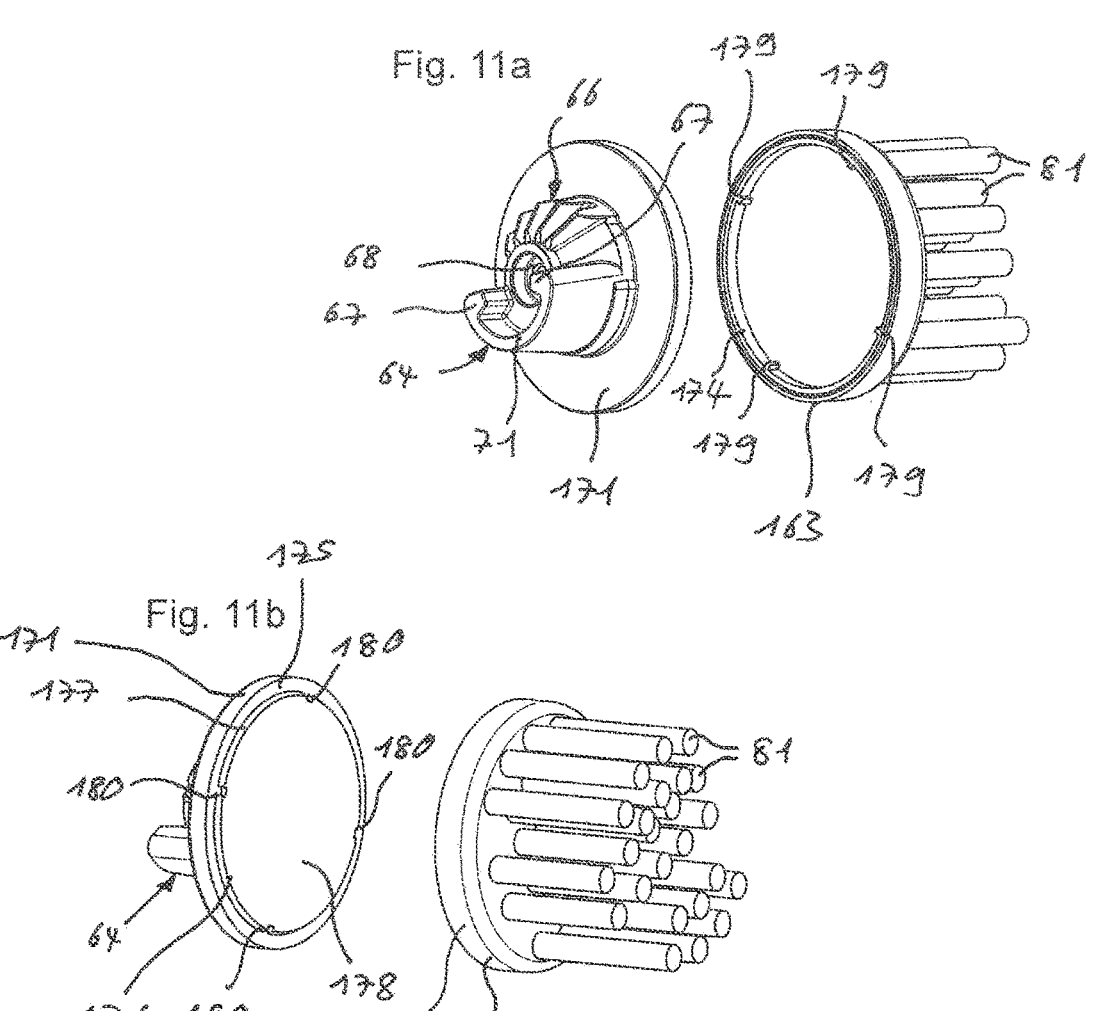
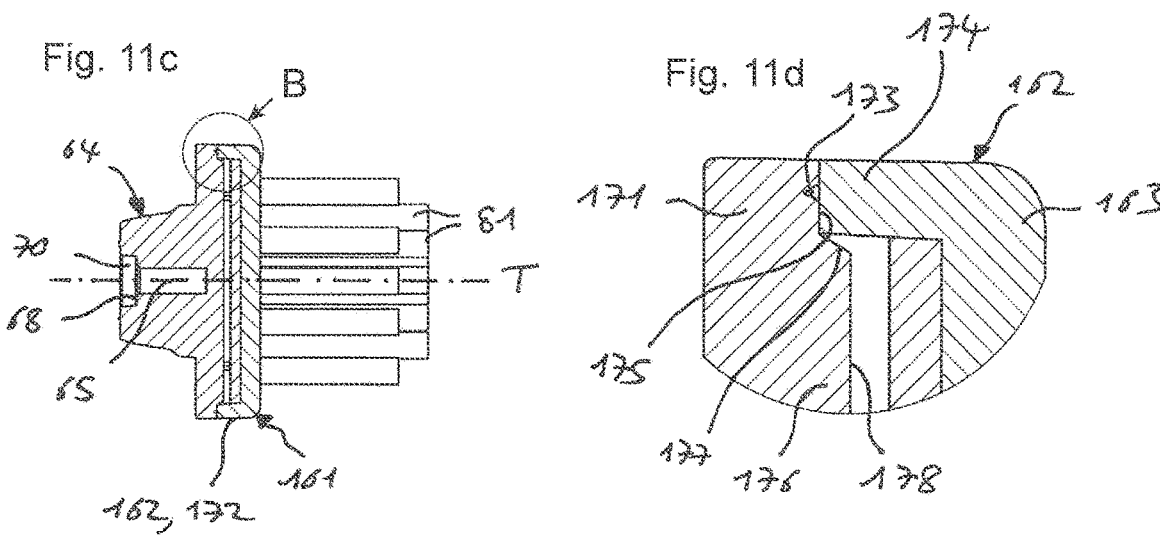

Fig. 12a
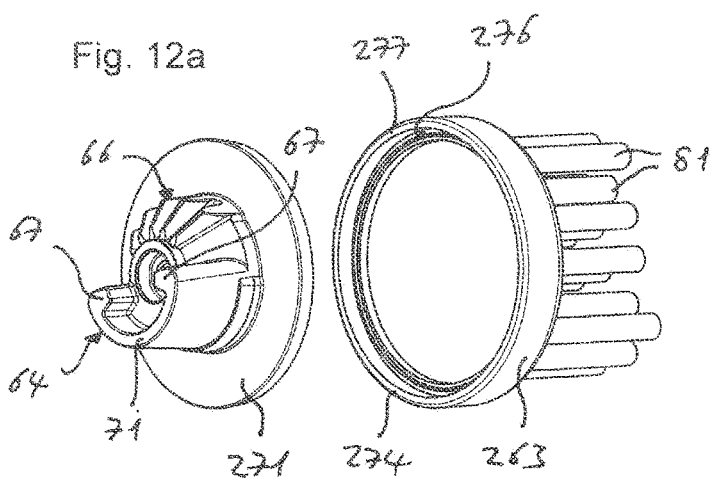
Fig. 12b
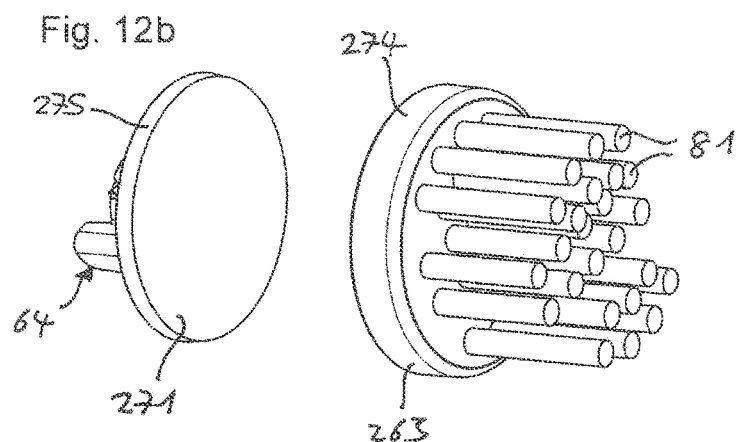
Fig. 12c
Fig. 12d
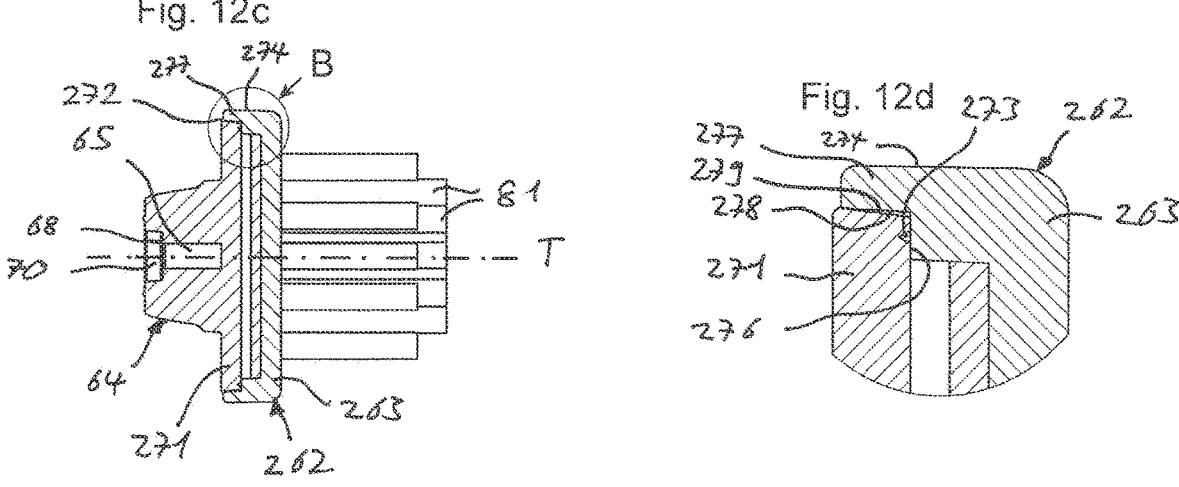

Fig. 13a
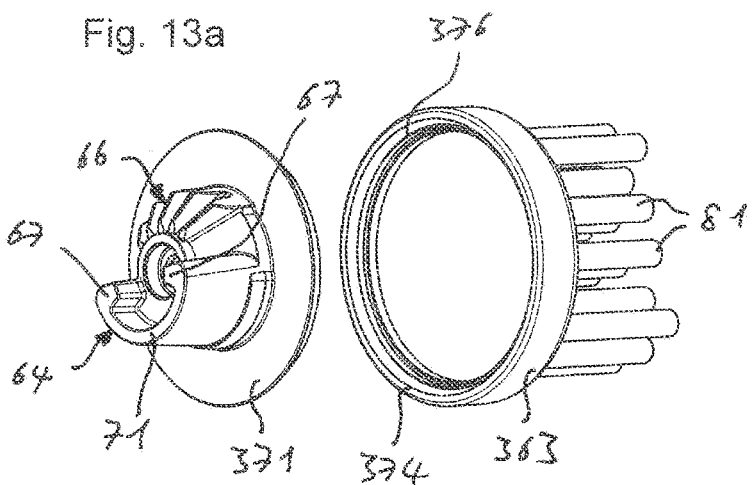
Fig. 13b
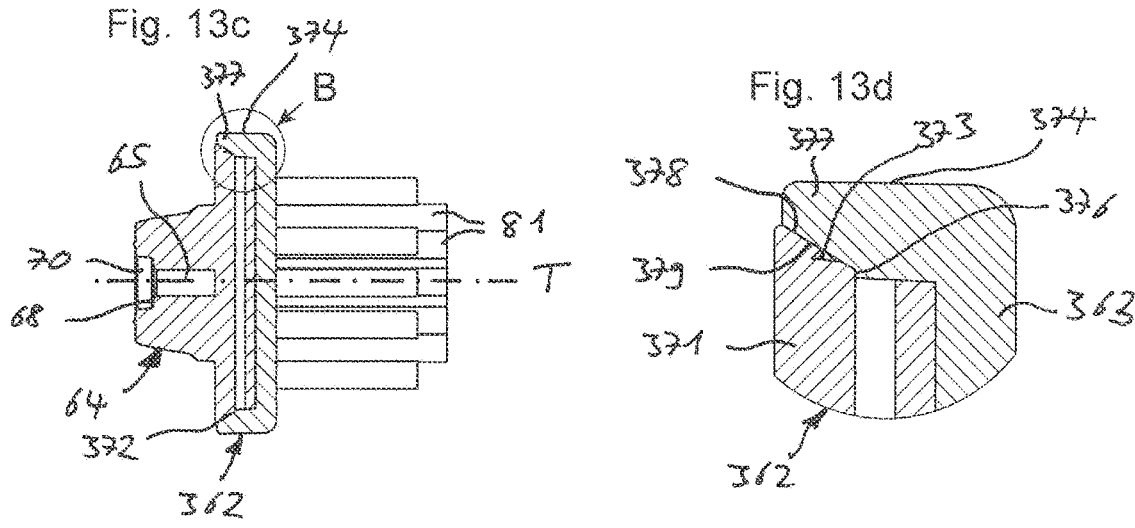
Fig. 13c
Fig. 13d

Fig. 14a
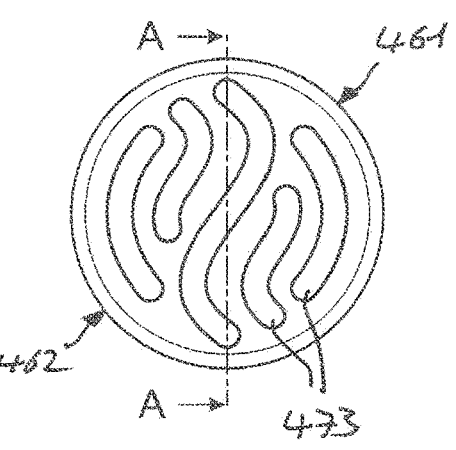
Fig. 14b
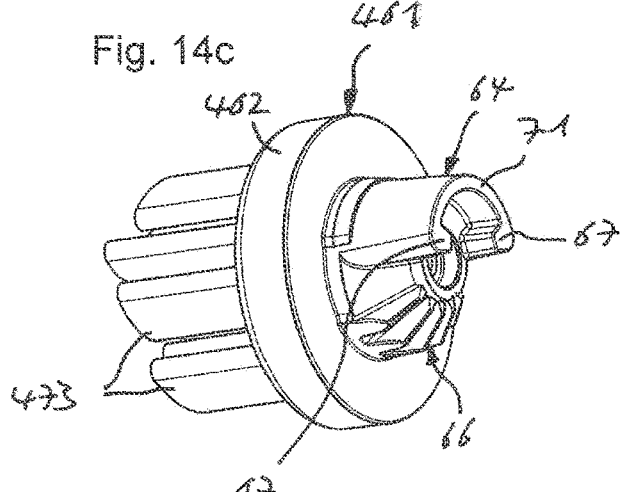
Fig. 14c
Fig. 14d
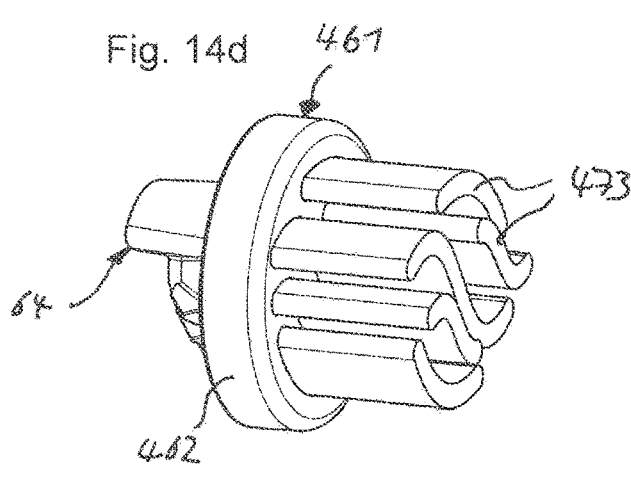

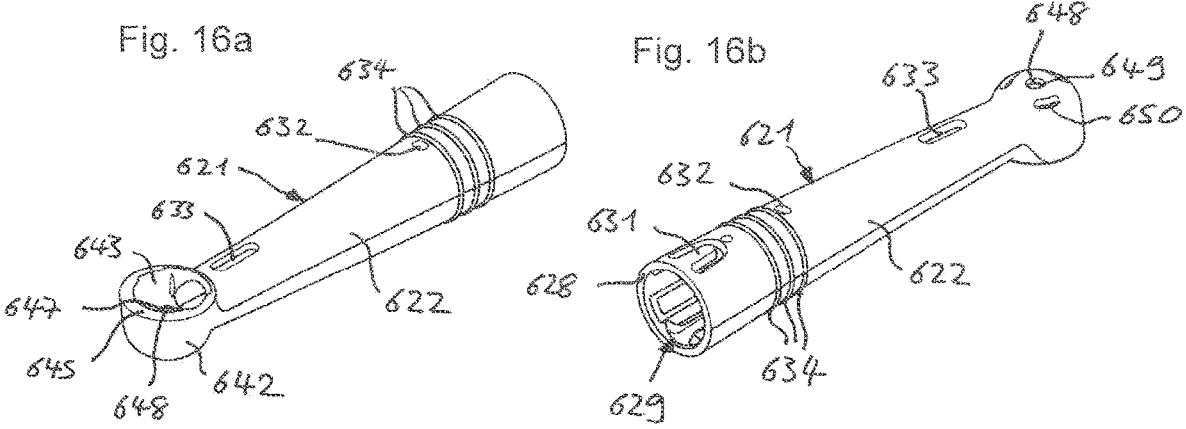
Fig. 16a
Fig. 16b
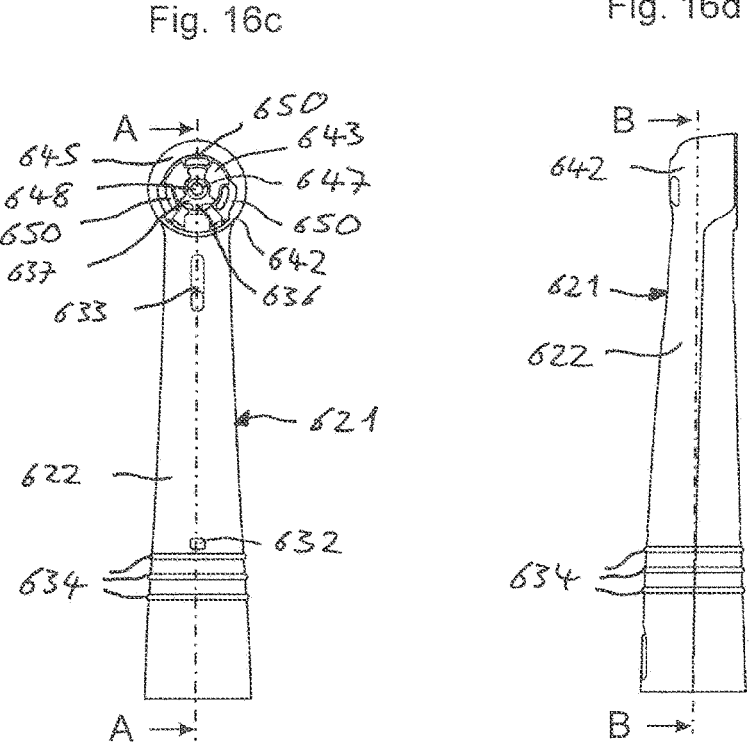
Fig. 16c
Fig. 16d

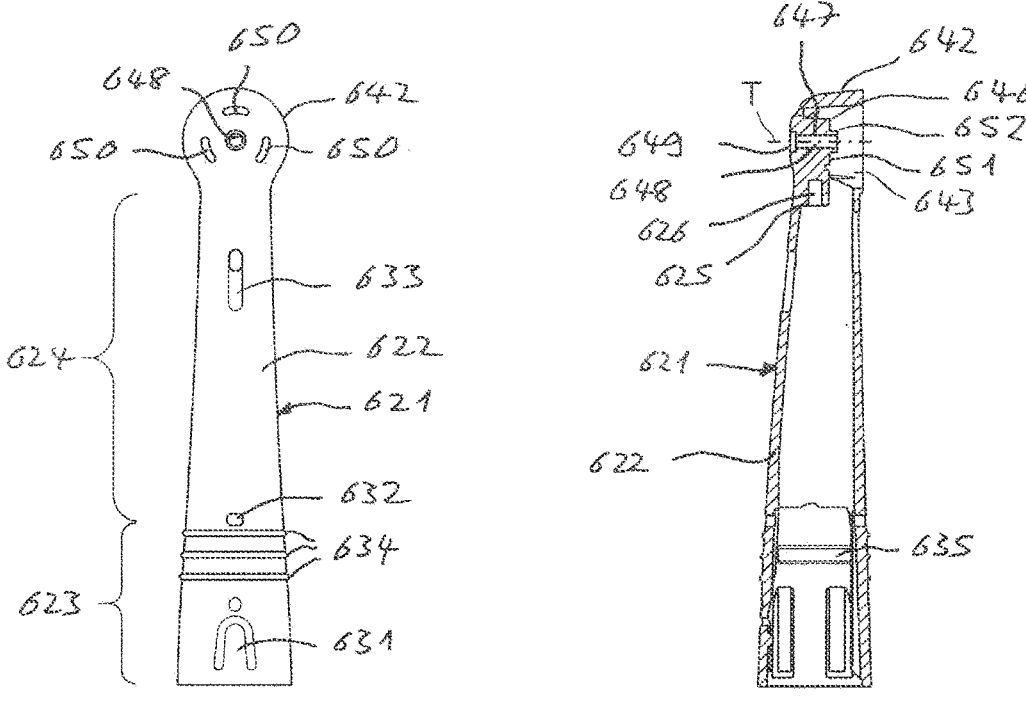
Fig. 16e                  Fig. 16f
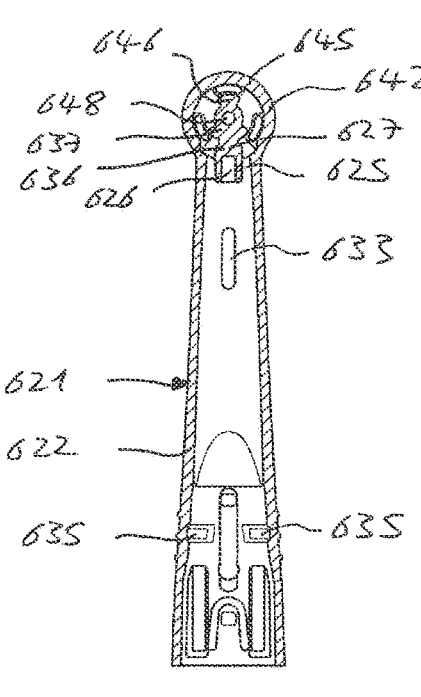
Fig. 16g

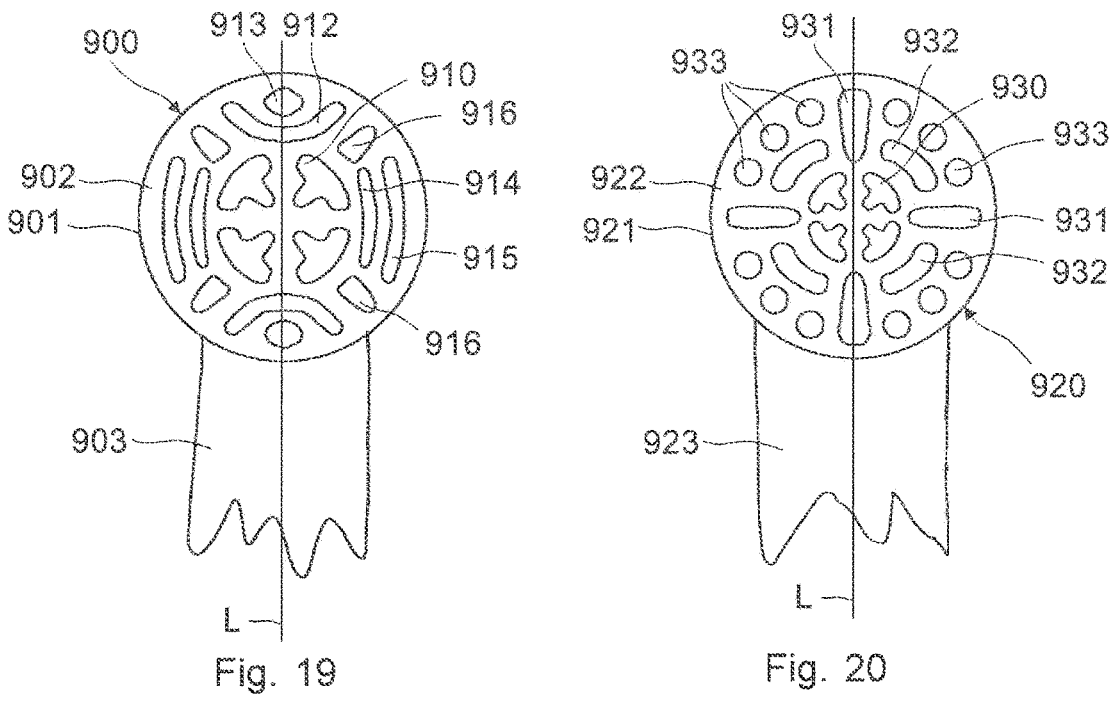
Fig. 19
Fig. 20
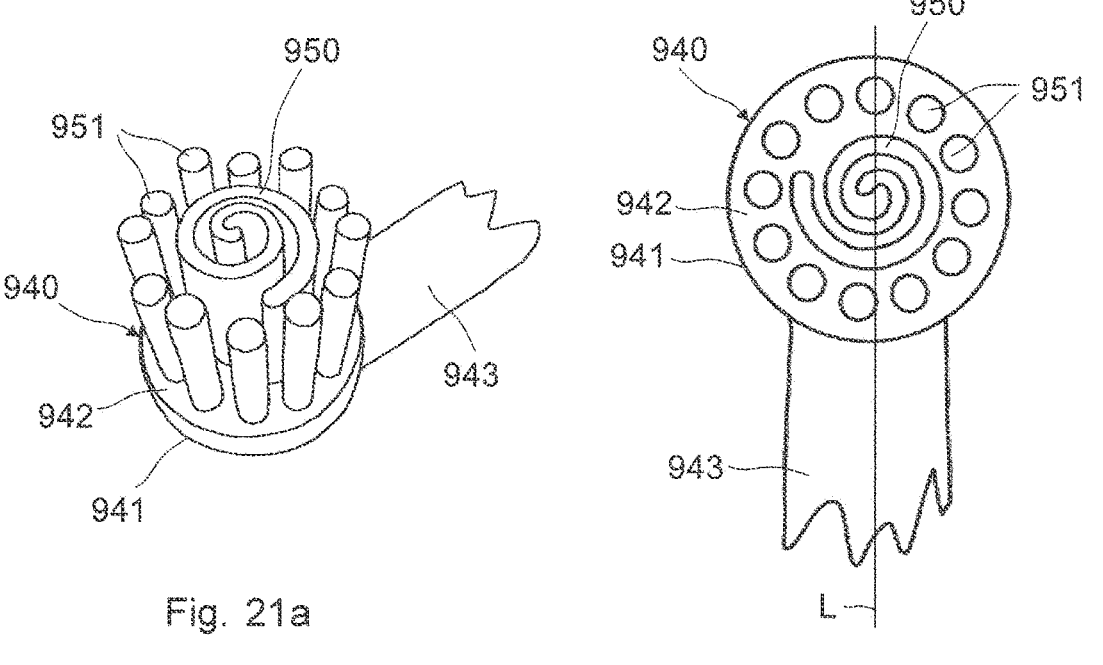
Fig. 21a
Fig. 21b

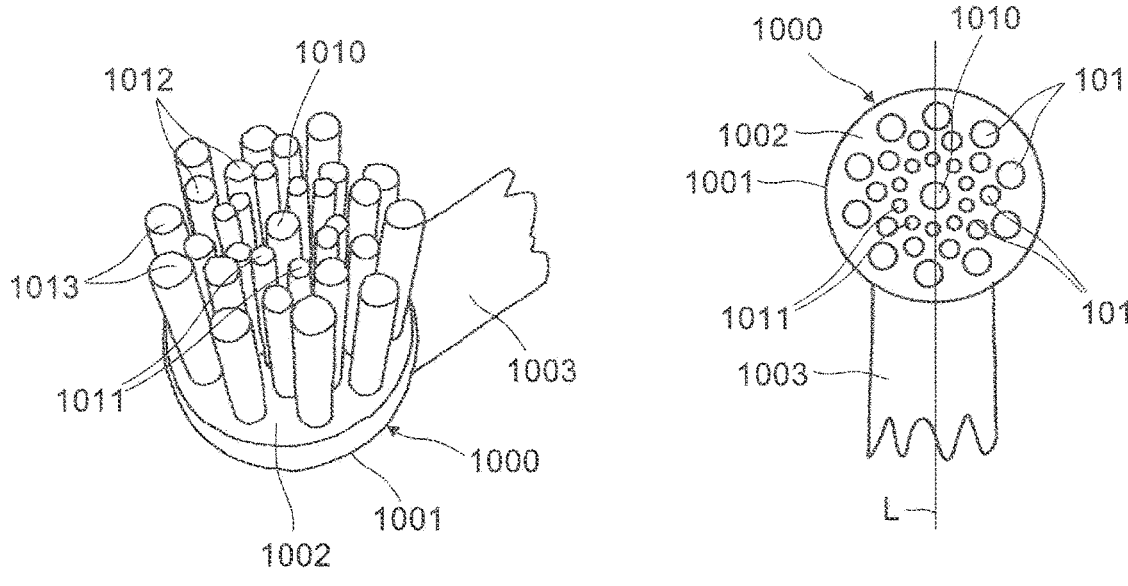
Fig. 24a                    Fig. 24b
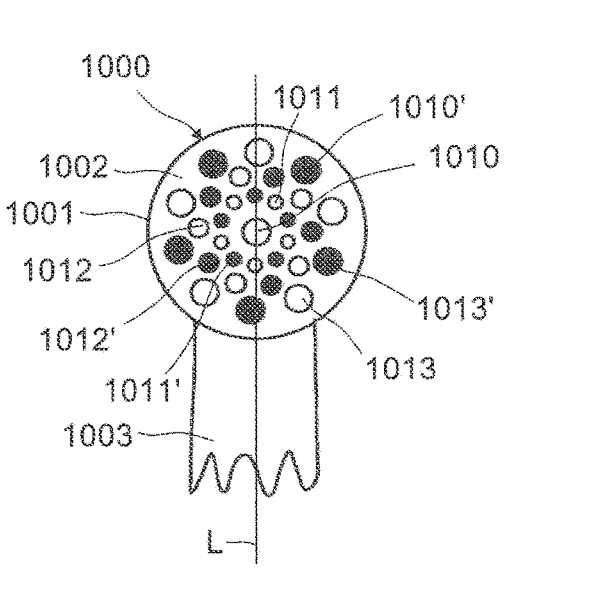
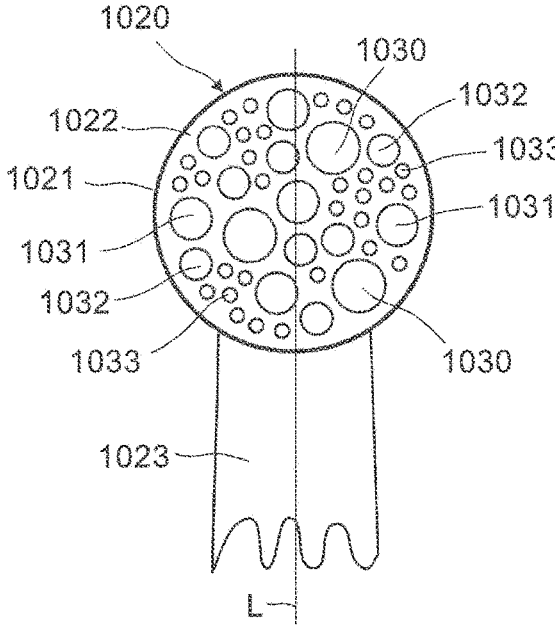
Fig. 24c                    Fig. 25

ELECTRICAL BODY CARE BRUSH

This is a Continuation of application Ser. No. 16/499,544 filed Sep. 30, 2019, which in turn is a National Stage of International Patent Application No. PCT/EP2018/057223 filed on Mar. 22, 2018, which claims the benefit of European Patent Application No. 17164182.2 filed on Mar. 31, 2017 and PCT/EP2017/070406 filed on Aug. 11, 2017. The disclosure of the prior applications is hereby incorporated by reference herein in its entirety.

The invention relates to the field of electrical care and cleaning brushes, such as electrical body care brushes, and in particular to electrical toothbrushes.

The invention concerns an in particular multi-part attachment brush part for an electrical body care brush, in particular for an electrical toothbrush, as well as an electrical body care brush, in particular an electrical toothbrush, with an in particular multi-part attachment brush part and a hand part.

Electrical care and cleaning brushes are characterised in that the brush head is brought into movement via an electromotoric drive. Concerning electrical toothbrushes, several types of electrical tooth cleaning brushes are available on the market today, amongst other things the oscillating rotation toothbrushes and sonic toothbrushes. Rotation toothbrushes are characterised in that the brush head rotates in an oscillating manner about a rotation axis essentially perpendicular to the longitudinal axis of the electrical body care brush. In contrast, in the case of sonic toothbrushes, the brush head is made to oscillate as a rule with a higher frequency and the rotation axis is herein preferably parallel to the cleaning surface or parallel to the longitudinal axis of the electrical body care brush.

Concerning rotation toothbrushes or sonic toothbrushes, apart from the described movements, additional or superimposed movements parallel and/or perpendicular to the rotation axis are also possible.

Electrical care and cleaning brushes which are designed for a longer service life and as a rule also have a greater functionality, as a rule comprise a hand part as well as a separately designed attachment brush part which can be reversibly stuck onto the hand part and removed again.

As a rule, the hand part comprises the electromotoric drive for driving the brush head. Furthermore, the hand part as a rule additionally comprises a gear for converting the rotation movement of the electromotoric drive into an oscillating rotation movement of the control pin. Furthermore, the hand part comprises an energy store such as a battery or primary cell, for the supply of the electromotoric drive with electricity.

Furthermore, as a rule, an on/off-switch as well as a control unit belong to the hand part. The electrical functions of the device can be set or controlled by the control unit.

The separate design of the attachment brush part is due to the fact that the attachment brush parts needs to be exchanged from time to time, e.g. because the bristles have become worn or the prior attachment brush part should no longer be used for hygienic reasons.

In this manner, the relatively durable hand part can be used far beyond the average life expectancy of an attachment brush part. Furthermore, the exchangeability of the attachment brush parts also permits the use of a single hand part by several users, for example by several family members.

The present invention relates to electrical care and cleaning brushes, concerning which the brush head rotates in an oscillating manner about a rotation axis. With regard to electrical toothbrushes, the present invention concerns itself with a rotation toothbrush.

The hand part and the attachment brush part of such care and cleaning brushes each comprise coupling means for the mutual coupling of the attachment brush part and hand part, e.g. for sticking the attachment brush part onto the hand part.

The coupling means comprise a sleeve-like coupling section which has a nub receiver and which is arranged on the attachment brush part in the end section which is at the hand part side (hand-part-side end section). A control pin which projects out of the coupling nub at the end side and serves for transmitting mechanical drive energy into the attachment brush part is led through the coupling nub. Furthermore, the coupling nub serves for fixing certain parts of the attachment brush head with respect to the hand part.

The control pin is brought into an oscillating rotation via mechanical means, such as a gear, by way of the electromotoric drive in the hand part. This oscillating rotation is converted in the attachment brush part, again via mechanical means, into an oscillating rotation movement of the brush head.

It is important for the hand part and the attachment brush part to be connected to one another in an optimally fitting via the coupling means, for an optimal, i.e. as loss-free and as low-noise as possible transmission of the mechanical movement from the control pin onto the attachment brush part. This means that the coupling means need to be designed such that the connection of the attachment brush part and the hand part in the coupled state is secured axially as well as with respect to a twisting.

The published document U.S. Pat. No. 6,851,150 B2 describes an attachment brush part of an electrical toothbrush. This comprises a brush head with cleaning bristles as well as a connection section for sticking on a hand part. Furthermore, the attachment brush part comprises a tubular neck section for receiving a control pin. The brush head is rotatably mounted at the front end of the attachment brush part. The control pin is arranged in the tubular neck section between the brush head and the connection section.

Conventional electrical care and cleaning brushes have the disadvantage that the attachment brush part is composed of many individual parts. Furthermore, the mechanically loaded parts of conventional attachment brush parts are subjected to an increased wear.

It is therefore an object of the present invention to suggest a multi-part attachment brush part for an electrical care and cleaning brush, in particular for an electrical body care brush, such as electrical toothbrush, which consists of as few as possible individual parts and can be simply assembled.

Furthermore, the attachment brush part, interacting with the hand part and the drive of the electrical care and cleaning brush which is contained therein, should be characterised by a low wearing or by way of a reduced wear between the mechanically moved parts, and accordingly by its durability and a high reliability for the user.

Furthermore, it is the object of the present invention to suggest an electrical care and cleaning brush, in particular an electrical body care brush, such as electrical toothbrush, with a multi-part attachment brush part, which is inexpensive to manufacture and is characterised by a low energy consumption as well as a pleasant noise volume on use.

A further object of the present invention is the implementation of particular bristle fields arranged on the attachment brush part, said bristle fields having an improved cleaning effect.

The invention is achieved by the independent claims 1, 14 and 15.

The dependent claims as well as the description and the figures comprise particular embodiments and further developments of the invention.

The multi-part attachment brush part comprises:

an attachment brush housing;

a drive rod for driving the bristle carrier, with an end section which is on the brush head side (brush-head-side end section) and on which a first toothing is arranged, and with an end section which is on the hand part side (hand-part-side end section);

a brush head with a bristle carrier and bristles which are arranged on this, wherein the bristle carrier comprises a second toothing; as well as a securing element for the rotatable mounting of the hand-part-side end section of the drive rod.

Furthermore, the multi-part attachment brush part in particular comprises a bearing pin for positioning, securing and for the oscillatorily rotatable mounting of the brush head on the attachment brush housing.

The brush head can be of one part and in particular of several parts.

The first and the second toothing form a drive toothing for driving the bristle carrier and the brush head by way of the drive rod. This means that the oscillating rotation movement of the drive rod about a geometric control rotation axis is transmitted into an oscillating rotation movement of the brush head about a geometric carrier rotation axis via the drive toothing. The bristle field is also actively moved by way of the oscillating rotation movement of the brush head.

The geometric control rotation axis is hereinafter simply merely called "control rotation axis". The geometric carrier rotation axis is hereinafter simply called "carrier rotation axis".

The terms "front side", "rear side" and "laterally" are used within the framework of this description. The "front side" indicates that side of the care or cleaning brush, on which the bristle field is arranged. This means that the "front side" corresponds to the care or cleaning side. The "rear side" indicates the side of the care or cleaning brush which is opposite to the "front side" and accordingly opposite to the bristle field.

"Laterally" also indicates that region of the care or cleaning brush which with a view perpendicularly to the front side of the toothbrush is arranged to the left or right of a reference point.

What is meant by the direction detail "above" or "at the top" is a direction along the control rotation axis towards the housing head.

What is meant by the direction detail "at the bottom" or "below" is a direction along the control rotation axis towards the hand part.

The hand part comprises a grip body for holding the electrical care and cleaning brush. The grip body comprises a housing, in which an electromotoric drive as a rule with a gear for driving a control pin is arranged.

The gear can be constructed for example such that a cog which is attached to the drive axle rotates continuously in one direction. The cog meshes into the teeth on a crown wheel, and this is continuously rotated in one direction. The rotation axes of the drive axle of the motor or of the respective cog and that of the crown wheel are perpendicular to one another. A cam which is attached eccentrically to the rotation axis of the crown wheel is attached to the crown wheel. A catcher in the form of a U which encompasses the cam and is connected to a control pin takes up the movement of the cam and converts the rotation movement of the cam into an oscillating to and fro movement. Herewith, one succeeds in the control pin executing a corresponding movement. The axis of the cam pin is again essentially parallel to the drive axle of the motor.

The gear can basically also be constructed differently. However, the gear is essentially constructed such that this generates an oscillating rotation movement of the control pin from a continuous rotation movement of the motor.

Furthermore, an energy store for supplying the electromotoric drive with electricity is arranged in the housing. The energy store can be a battery, such as e.g. a NiMh battery or Li-Ion battery. The battery can be charged via a cable-free connection (inductively) or via a cable connection.

Alternately to an accumulator, cells (primary cells) which are exchangeable can also be used.

The electromotoric drive is controlled via a switch and/or an electronic control in the hand part.

In particular, the construction manner of the electromotoric drive can also be an oscillating armature drive. This accomplishes a rapid oscillating rotation movement with a relative small angle. A gear is not necessary in this case since the oscillating armature drive already provides the control pin with an oscillating rotation movement.

The electromotoric drive can have a speed of 3,000-20,000 r.p.m (revolutions per minute), in particular 5,000-16,000 r.p.m and very particularly 6,000-13,000 r.p.m.

Likewise arranged in the housing is a mechanical gear for transmitting the torque from the electromotoric drive onto the control pin. Herein, the gear brings the control pin into an oscillating rotation movement about a certain rotation angle.

The gear can be designed such that the rotation angle of the control pin is limited to 30° to 100°, in particular 50° to 70°. The angle unit "°" in this description always relates to the angle degree.

Furthermore, the speed is also reduced from the electromotoric drive onto the control pin way of the gear, so that the control pin oscillates at a smaller frequency than would be the case without a gearing of the speed of the drive motor.

A coupling nub for connecting the hand part to the attachment brush part is arranged on the attachment-brush-side end of the grip body.

One can also envisage the control pin executing a linear movement which is superimposed on the oscillating rotation movement and which is likewise transmitted onto the brush head. Apart from the oscillating movement, the linear movement can also activate a further movement in the brush head. For example, an additional movement of the brush head to the front and/or to the top can be activated.

In the present embodiment, a linear movement of the brush head upwards, or parallel to the rotation axis is realised by way of the design of the first and second toothing and the oscillating drive, said movement interacting with a zero position or neutral position of the drive rod. The zero position or neutral position of the drive rod is present if this could rotate in both directions of the possible oscillation angle by essentially the same angle.

The control pin executes an essentially oscillating movement. The linear movement can be produced by way of a suitable design of the attachment brush. For example, a suitable ramp or movement guide can be provided in the mounting of the brush head. A further possibility for activating the desired linear movement lies in a correspondingly designed drive toothing between the bristle carrier and the drive rod.

In particular, the maximal linear travel or the maximal height of the carrier body with respect to the attachment brush housing is achieved in the zero position or neutral position of the drive rod.

The height difference can be up to 0.5 mm, in particular up to 0.05 mm. The frequency of the linear movement corresponds in particular to the frequency of the oscillating brush head or of the drive. Of course, a higher frequency of the linear movement than the frequency of the oscillating brush head can also be achieved by way of a suitable design of the means which effect the linear movement. In the case, in particular a 1.5, 2, 2.5, 3, 3.5 or 4-fold frequency of the linear movement is realised.

As a rule, the control pin consists of metal. As a rule, it has a circular basic cross section. The control pin merges from the circular basic cross section into a semicircular cross section in its brush-head-side end section, i.e. in the drive section. I.e., the control pin forms a semicircular recess in the mentioned end section, with a plane front side and a rear side which is semicircular-arc-shaped in cross section.

The control pin is led outwards through the coupling nub out of the grip body housing. The control pin protrudes with a drive section out of the coupling nub in the longitudinal direction of the care or cleaning brush at the attachment-brush-side end of the hand part. This means that the control pin runs in the longitudinal direction of the care and cleaning brush.

The control pin lies on the control rotation axis, about which the control pin rotates in an oscillating manner.

The control pin can comprise a latching notch in the drive section, in particular on the arched peripheral surface of a semicircular cross section. The latching notch serves for the latching-in or snapping-in of a latching element on the attachment brush part on bringing together the hand part and the attachment brush part. An additional axial securing is to be created with the attachment brush part in this manner. The latching-in of the latching element can also provide an acoustic or haptic feedback or signal for securing the attachment brush part.

A haptic signal can basically be a vibration, a knock, a jerk or a shaking.

The control pin can have a diameter of 1.5 mm to 4.5 mm, in particular from 2.5 mm to 3.5 mm.

The length of the attachment brush part can be 50 mm to 90 mm, in particular 60 mm to 80 mm. The width of the attachment brush part can be 10 mm to 18 mm, in particular 12 mm to 16 mm. The height of the attachment brush part (without bristles) can be 8 mm to 20 mm, in particular 12 mm to 16 mm.

The attachment brush housing of the attachment brush part forms a carrier structure for receiving various components, such as the brush head or drive rod. The attachment brush housing also serves for creating connections to other components or for mounting other components. In particular, the attachment brush housing is designed in a single-part manner, e.g. by way of injection moulding.

The length of the attachment brush housing can be 50 mm to 90 mm, in particular 60 mm to 80 mm.

The greatest width of the attachment brush housing can be 8 mm to 20 mm, in particular 10 mm to 15 mm. The width at the brush-head-side end in particular is smaller than in the hand-part-side end.

The greatest height of the attachment brush housing can be 8 mm to 18 mm, in particular 12 mm to 14 mm. The height at the brush-head-side end in particular is smaller than in the hand-part-side end.

The attachment brush housing is manufactured from plastic. The attachment brush housing comprises at least one hard component or consists of this. The attachment brush housing in particular consists of polybutylene terephthalate (PBT) or comprises this.

Apart from the mentioned plastic, the attachment brush housing can also comprise one or more additives or additional substances for the modification of the material characteristics. The attachment brush part can comprise e.g. fibres for reinforcement. Herein, the additives are embedded in the matrix-forming plastic. Further possible additives are hereinafter described in more detail in the section further below relating to the additives.

Polybutylene terephthalate is characterised by a high impact strength and wear-resistance. The first is of significance concerning the dropping of the attachment brush part or brush. The second is of significance concerning the frictional contacts with the brush head and the drive rod.

The attachment brush housing comprises a housing neck and a housing head which connects onto the housing neck at the brush head side. The housing neck is a tubular body with a continuous receiver which at the hand part side ends in a receiver opening and at the brush head side runs out in the bristle carrier receiver of the housing head.

The housing neck in particular serves for receiving the drive rod. The housing neck moreover also receives the securing element.

A first receiving section for receiving the securing element connects onto the hand-part-side receiver opening in the direction of the brush head.

According to a particular embodiment variant, the first receiving section forms a sleeve-shaped coupling section with a nub receiver for receiving the coupling nub of a hand part.

The coupling section runs out in the receiver opening. The attachment brush part and the hand part are connected to one another by way of inserting the coupling nub into the nub receiver of the coupling section of the housing neck.

If the coupling section with the nub receiver is formed by the securing element, as is yet described hereinafter, then the attachment brush part and the hand part are connected to one another by way of inserting the coupling nub into the nub receiver of the coupling section of the securing element.

It is known for different models of electrical toothbrushes to comprise coupling nubs with different nub geometries. It is now conceivable for example for the coupling section in the first receiving section of the housing neck to have an inner geometry for receiving a coupling nub of a first model of an electrical toothbrush.

The securing element which is described in more detail hereinafter can in turn comprise a coupling section with an inner geometry for receiving the coupling nub of a second model of an electrical toothbrush. This is to say that the inner geometries of the two coupling sections in the securing element and in the housing neck are different from one another.

Depending on the model, with which the attachment brush is to be combined, in a first case a securing element with a coupling section and in a second case a securing element without a coupling section can be inserted into the first receiving section of the housing neck.

In the first case, the coupling section of the securing element is arranged in the coupling section of the housing neck. Accordingly, the coupling nub of the hand part is coupled to the coupling section of the securing element. In this case, the securing element also serves for connecting the attachment brush part to the hand part.

In particular, the outer geometry of the coupling section of the securing element can correspond to the inner geometry of the coupling section of the housing neck. This means that the outer geometry of the coupling section of the securing element corresponds at least partly to an interface of a first model. The coupling section of the securing element is positively received in the coupling section of the housing neck in this manner.

In the second case, the securing element without a coupling section is designed accordingly shorter than the securing element with a coupling section, so that this does not occupy the coupling section in the housing neck, but is arranged in a section which connects onto the coupling section in the direction of the brush head. Accordingly, the coupling nub of the hand part is coupled directly to the coupling section of the housing neck.

A securing element with or without a coupling section is then inserted into the housing neck, depending onto which model of the hand part the attachment brush head is to be stuck.

This has the disadvantage that a common attachment brush housing can be applied for several models of electrical toothbrushes. The differentiation of the coupling between the attachment brush and the hand part is consequently controlled via a suitable design of the securing element. This has a positive effect on the tooling and manufacturing costs.

Basically, even several types of securing elements can be provided, and these differ from one another by differently designed coupling sections. The different types of securing elements can possibly also differ with regard to the feed-through of the control pin or the securing of the drive rod. This is due to the different geometries of the control pins which are sometimes entailed by different coupling nubs.

In this manner, a common attachment brush housing can even be applied for more than two models of electrical toothbrushes with different coupling nubs.

It is also possible for the first receiving section on the housing neck to form no coupling section and for the coupling sections with the nub receivers to be exclusively accommodated in the securing element.

Spring means such as for example a spring-elastic latching tongue with a latching lug can be arranged in the housing wall of the first receiving section. The latching tongue is exposed via a U-shaped slot in the housing wall. The arrangement, i.e. the latching tongue, is preferably attached on the rear side. In particular, the U-shaped slot is directed to the rear.

The spring means serve for the fixation of the securing element in the housing neck. According to the aforementioned embodiment variant therefore, the latching tongue with its latching lug thus latches into a deepening on the securing element and fixes the securing element which is inserted into the housing neck, in the axial direction. The mentioned parts additionally have a fit, so that an adequate non-positive or friction fit arises after assembly.

In the first receiving section, one or several grooves can be arranged towards the second receiving section. In particular, the groove or grooves run along the periphery. This means that their longitudinal extension is aligned transversely to the longitudinal axis of the attachment brush housing. The grooves can additionally fix the securing element with regard to torsion forces which arise on use.

In particular, two grooves can be formed and these are incorporated in the first receiving section and in the attachment brush housing axially at the same location or at the same height and each extend over a part of the periphery.

In the assembled state, the one or more grooves in particular interact with corresponding prominences which are formed in the securing element.

Together, these effect an even more stable assembly of the securing element in the first receiving section in the axial direction.

Furthermore, a second receiving section for receiving the drive rod connects onto the first receiving section in the direction of the brush head.

An in particular elongate pin receiver body with a pin receiver for receiving the bearing pin of a drive rod which is yet described further below is arranged at the brush-head-side end of the second receiving section. The pin receiver body in particular projects a little into the bristle carrier receiver of the housing head. The outer surface of the pin receiver body in cross section is designed in an arched or round manner towards the front side.

In particular, the pin receiver is a circular-cylinder-shaped deepening. In particular, the pin receiver is an elongate hole. In particular, the pin receiver is designed as a blind hole with an opening at the hand part side. In particular, the pin receiver lies on the control rotation axis.

The pin receiver can comprise a funnel-like widening in the region of the insert opening, said widening serving as insert aid for the bearing pin.

The pin receiver can have a length or depth of 1 mm to 5 mm, in particular of 2.5 mm to 3.5 mm. The pin receiver can have a diameter of 0.8 mm to 2 mm, in particular of 1 mm to 1.5 mm.

In particular, there is enough play between the bearing pin and the pin receiver, so that tolerance deviations of the drive rod as occur e.g. due to shrinkage or deformation can be compensated.

A lateral tolerance of 0.05 mm to 0.2 mm, preferably of 0.08 mm to 0.15 mm therefore exists. Amongst other things, angular deviations between the components can be compensated herewith.

In the assembled state, in particular a play of 0.1 mm to 1 mm, preferably of 0.2 mm to 0.5 mm exists in the longitudinal direction between the drive rod and the attachment brush housing or the securing element. Longitudinal tolerances with respect to the control pin can be compensated herewith.

In particular, the pin receiver body is arranged on the rear-side housing wall and projects from this into the second receiving section.

The pin receiver body can be connected to a mounting sleeve for a bearing pin in the housing head via a connection rib. Furthermore, the connection rib can be connected to the rear-side housing wall. This increases the stability of the housing head and renders this more robust with regard to impacts and knocks. The rib, just as the pin receiver body, in particular is an integral part of the attachment brush housing.

The rib can be designed as a straight-lined component between the mounting sleeve for the bearing pin in the housing head and the pin receiver body.

However, in particular the rib can also have a wider basic shape, with a wider base and also with a larger or wider end surface.

The connection rib can have a height of 2 mm to 2.5 mm. The connection rib at its base can have a width of 0.4 to 1.2 mm, in particular from 0.6 mm to 1 mm. In particular, this is the case if the connection rib is shaped as a straight-lined component.

The connection rib can also be designed as an arrow-shaped element or comprise this or form this and comprise e.g. an arrow tip and arrow shank. The tip is hereby directed to the mounting sleeve whilst the shank faces the pin receiver body. The shank can form at least a part of the pin receiver body.

In this case, the width at the base of the arrow tip in particular is maximally 2.5 to 6 mm. The width in the region of the arrow shank in particular is 0.7 to 2 mm.

The arrow-like design of the connection rib leads to an end surface which is larger considered in the assembly direction of the brush head and which also acts as a support or a tilt limitation for the brush head. Herein, the mentioned end surface acts as a stop surface in the assembly direction of the brush head.

The connection rib can further taper from its base on the housing wall in the direction of the free end.

One, in particular two through-openings which lie opposite one another can be arranged in the housing wall of the housing neck in the transition from the first to the second receiving section. The recesses, in particular through-openings, serve for receiving latching lugs of latching tongues on the securing element. Moreover, it is possible for three or four through-openings to be arranged for receiving latching lugs of latching tongues.

Moreover, through-openings, in particular slot-like through-openings can be provided in the housing wall, in the housing neck as well as in the housing head. These serve for the passage of water on cleaning the attachment brush part. Herewith, toothpaste residues which have penetrated into the attachment brush part can be rinsed out.

Thus a through-opening can be provided on the front side and on the rear side, in the second receiving section of the housing neck, in particular towards the housing head.

The length of the through-openings can be 5 mm to 9 mm, in particular 6.5 mm to 7.5 mm. The width of the through-openings can be 0.5 mm to 2.5 mm, in particular 1 mm to 2 mm.

The through-openings can be arranged in the housing head at the rear side. Straight-lined or arched, slot-like through openings which are arranged concentrically about the carrier rotation axis can therefore be arranged on the rear side. 2 to 5, in particular 3 such through-openings can be provided.

The length of the slot opening can be 2 mm to 5 mm, in particular 2.5 mm to 3.5 mm. The width of the slot opening can be 0.5 mm to 2 mm, in particular 0.7 mm to 1.5 mm.

One or more withdrawal ribs, in particular annular withdrawal ribs, can be arranged on the outer surface of the housing neck. These are concentric to the control rotation axis. The withdrawal ribs are to ensure the necessary retention on withdrawing the attachment brush part from the hand part. The withdrawal ribs can be manufactured of a different material than the attachment brush housing, for example of a soft component.

The one or more withdrawal ribs can also be provided with a double function. Apart from the mentioned retention on withdrawal, they can also be used on conveying in the context of an automatic assembly. The at least one withdrawal rib in particular can serve for the catching, such as e.g. the gripping, and firm holding of the attachment brush parts by a facility component such as a gripper or clip.

In this case, it is particularly only one withdrawal rib which is formed. This however in particular is somewhat more pronounced with a greater width and height. Furthermore, in this case the withdrawal rib in particular is manufactured from a hard component.

In particular, the outer diameter of the withdrawal rib is larger than the largest diameter of the attachment brush housing in the region of the withdrawal rib.

The housing head forms a beaker-shaped bristle carrier receiver which is open to the front side via a carrier receiver opening. The bristle carrier receiver serves for receiving or mounting at least the function unit of the bristle carrier.

According to a particular further development, one can envisage the carrier body with the care bristles being arranged outside the carrier receiver opening.

The carrier receiver opening is delimited by a peripheral face end surface which has different widths along the periphery. These different widths represent different wall thicknesses in the housing head. The outer geometry of the face end surface can thus be designed in a circularly round manner, whereas the inner geometry is designed irregularly due to the changing wall thicknesses.

The face end surface is preferably designed in an extensive manner. Alternatively, this can be designed only partly extensively and additionally also comprise prominences and deepenings. These prominences and deepenings, on interaction and given a suitable design of the bristle carrier can activate the already described linear movement of the brush head in the direction of the bristles.

The housing head has the greatest wall thickness along the control rotation axis in particular at its outermost head end, since it is here that the housing head is particularly vulnerable with regard to mechanical loading and a confluence location of the plastic is located at this location inherent of the manufacture. The wall thickness here can be 1 mm to 2.5 mm, in particular 1.5 mm to 2 mm.

The housing head in particular has the smallest wall thickness towards the housing neck, since it is here that the connecting housing neck ensures the necessary stability. Here, the wall thickness can be 0.45 mm.

A mounting sleeve with a feed-through opening for leading through a bearing pin which is yet described hereinafter is arranged in the bristle carrier receiver. The mounting sleeve or the feed-through opening has a length of 2 mm to 7 mm, in particular of 3.5 mm to 5 mm.

The mounting sleeve can form a peripheral stop shoulder, in particular one which is peripheral in an annular such as annulus-shaped manner, said stop shoulder being directed to the front side and encompassing a cylinder-shaped end section of the feed-through opening. The stop shoulder can lie with a face end surface of the limitation cam which is directed to the brush head, in one plane.

The surface of the stop shoulder is preferably designed in an extensive manner. Alternatively, the stop shoulder can be designed only in a partly extensive manner and additionally also comprises prominences and/or deepenings. These prominences and deepenings, on interaction and given a suitable design of the function unit can activate the already described linear movement of the brush head in the direction of the bristles.

The cylinder-shaped, in particular circular-cylinder-shaped end section engages in particular into a subsequently described cylinder receiver on the function unit and lies with the face end surface on a contact shoulder which surrounds a bearing pin receiver and is likewise described hereinafter.

A depression for receiving the pin head of the bearing pin is provided on the rear side of the housing head. The interaction between the pin head and the depression which is yet described at another location is conducive to the stability of the bearing pin and in particular accommodates lateral forces upon these.

The depression can have a diameter of 1.5 mm to 4 mm, in particular of 2 mm to 2.6 mm. The depth of the depression can be 0.5 mm to 4 mm, in particular 1 mm to 2 mm.

The limitation cam which is already mentioned further above is arranged in particular on the outer wall of the mounting sleeve for the bearing pin and is connected to this. The limitation cam can moreover also be connected to the rear-side housing wall. In particular, the limitation cam is directed to the outermost head end along the control rotation axis.

In particular, the limitation cam is an integral part of the housing head. In particular, the limitation cam is arranged on the extension of the control rotation axis.

In particular, the limitation cam and the pin receiver of the pin receiver body are arranged in a common plane. In particular, the control rotation axis is likewise arranged in this plane. If present, a connection rib as described further above can also be arranged in this plane. The feed-through opening of the mounting sleeve can also be arranged in this plane. In particular, the plane corresponds to the middle longitudinal plane of the attachment brush part.

The limitation cam can be designed in an essentially trapezoidal manner. This means that the limitation cam tapers from its free end to its base. In particular, the trapezoidal shape is symmetrical. The side flanks of the trapezoidal limitation cam can enclose an angle of 20° to 70°, in particular of 35° to 60° with respect to the control rotation axis.

Greater angles of the side flanks of the trapezoidal limitation cam entail the (trapezoidal) surface becoming larger toward the front side, also called end surface. Herewith, apart from the angular limitation, corresponding support surfaces also become larger. Moreover, the reinforcement ribs are designed in a more stable manner in the direction of the rear side.

The limitation cam can form a contact surface for the rotation movement of the function unit. In particular, this contact surface corresponds to the aforementioned end surface.

The wall thickness of the attachment brush part, disregarding the aforementioned wall thickness of the housing head, can be 0.5 mm to 1.8 mm, in particular 0.8 mm to 1.3 mm. Basically, the wall thicknesses in the attachment brush part are variable and are optimised at the respective locations according to their functionality and demands.

Information, such as lettering or signs can be attached to the outer side of the attachment brush housing. The information can deposited by way of a printing method such as a tampon printing methods, digital printing methods. The information can also be deposited by way of an embossing method.

Furthermore, the information can also be incorporated integrally in the injection moulding tool during the injection moulding, by way of suitable inserts, such as lettered inserts. In this case, the information, as also on embossing, is represented by way of raised and recessed regions. This method can also be combined with an embossing method or a printing method.

Additionally or alternatively, information can also be produced by way of using two materials which are different in colour, in particular plastic components. In particular, the attachment brush housing can be manufactured in the multi-component injection moulding method. The use of a hard component and a soft component particularly lends itself for this.

Function elements, for example bristles such as injected bristles, vibration-damping elements, flexible zones in the attachment brush housing, massage elements or tongue cleaners, which are stationary with respect to the oscillatorily rotatable brush head, can be arranged on the outer side of the attachment brush housing, in particular of the housing head. The mentioned function elements can be provided individually or in combination with one another. The mentioned function elements can be arranged on the front side and/or rear side of the housing head.

One can envisage the mentioned function elements likewise being brought into motion by way of the movement of the brush head. The function elements can be touched or displaced e.g. by way of a movement of the brush head or of the bristle carrier, which leads to a movement of the function elements.

The function elements can alternatively also be brought into motion in a direct manner by way of the drive rod. In particular, it is possible for the function elements to be brought into motion by way of a superimposed movement of the drive rod (for example a longitudinal movement).

The mentioned function elements can be manufactured together with the attachment brush housing from a common component. The mentioned elements however can also be manufactured from a material component other than the hard component of the attachment brush housing, in particular of a soft component, in a multi-component injection moulding method.

All elements of soft material are preferably injected on the attachment brush housing in one working operation.

This means that the hard component as well as the further soft plastic component (e.g. soft component) for the mentioned elements is processed in a multi-component injection moulding method.

The function elements can be elements of a soft component which are injected onto the outer side of the attachment brush housing or of the brush head. These elements can serve for damping the noises which are caused by the operation of the toothbrush. The elements can also serve for sealing against the penetration of water.

The function elements can moreover be damping elements against knocks and impacts. The damping elements can protect the oral cavity from inadvertent impacts of the attachment brush part during dental care. The damping elements can also serve as a drop protection. With regard to this, the damping elements are attached in particular to the front end of the attachment brush.

Furthermore, the function element can also serve for a better haptics. The function elements, such as grip elements, e.g. grip troughs, ribs etc., can serve for withdrawing and sticking the attachment brush part from and onto the hand part respectively.

The function elements can also form compliant, i.e. elastic surfaces which serve e.g. for compensating tolerances or for creating a bias or pre-loading, for example between the coupling section and the coupling nub. For this, the function elements can also be injected in the housing inside, e.g. in the coupling section.

Herein, the function elements can also be designed such that these, by way of a deformation which is initiated by the user, release a latching mechanism, in order to separate the attachment brush from the hand part.

Furthermore, the function elements can also act resiliently upon a latching mechanism, in order to reinforce the latching effect. As a rule, it is primarily the hard components of the mentioned components which act given a latching mechanism between the hand part and the attachment brush.

The function elements of a soft component in particular can also serve for at least partly closing or covering openings in the hard component on the attachment brush housing.

In particular, these can be openings which are technically necessary for the assembly of other parts on or in the attachment brush housing.

On assembly of other parts, the soft component can herein be at least partly displaced and herein act in a resilient or elastic manner. The assembly of other parts from the outside is not visible or is less visible on account of this. The contamination of these assembly zones is further also reduced.

Other parts for example can be the bearing pin, the securing element or the brush head. It is to be expressly mentioned that these methods can also be used for other parts which are not specified here, without departing from the framework of the invention.

The function elements can also be used in combination with a material weakening in the hard component of the attachment brush housing (e.g. small wall thicknesses, recesses, hinges, etc.), in order in this manner for example to create flexible zones in the attachment brush housing.

The drive rod has the function of receiving the control pin of the hand part in its hand-part-side end section when the attachment brush part is stuck onto the hand part. For this, the drive rod at its hand-part-side end section forms a control pin receiver for the end section of the control pin. The drive rod is designed in particular in a sleeve-like or tubular manner in this section.

The longitudinal axis of the control pin receiver in particular runs along the control rotation axis.

The control pin is pushed with its end section into the control pin receiver. The control pin receiver in particular serves for the positive and/or non-positive receiving of the control pin.

The oscillating rotation of the control pin should therefore be transmitted onto the drive rod via the described connection with as little loss or as little friction as possible. As already described elsewhere, the oscillating rotation movement is not a 360° rotation, but follows a defined oscillatory rotation angle.

The attachment brush housing together with the hand part is essentially stationary relative to the oscillating movement of the control pin, the drive rod and the brush head.

Despite a positive and/or non-positive receiving of the control pin, the drive rod or its control pin receiver is preferably designed with certain tolerances which permit control pins of different manufacturers or shapes and tolerances to be received.

The drive rod or its wall, in the region of the control pin receiver, in particular can have a certain compliance or elasticity, so that the control pin receiver is conditionally adaptable to different pin cross sections and permits e.g. a conditional, elastic widening of the receiver cross section. The control pin receiver can have displacement ribs or other deformable elements.

In particular, openings which are provided for forming a pressing tongue contribute to the compliance of the walls.

However, openings are not necessary in all cases given a suitable material selection. In certain cases, at the most they act in an assisting manner.

In particular, a sliding fit can be created between the control pin and the drive rod.

The drive section of the control pin is mounted in the control pin receiver in a rotationally fixed manner with respect to the drive rod so that it is ensured that an oscillating rotation movement of the control pin is transmitted onto the drive rod over the whole periphery.

The rotational fixation is achieved via a non-rotationally-symmetrical design of the drive section of the control pin, said design being described for example in the context of the control pin.

The control pin receiver can have a circularly cylindrical basic cross section. If the drive section of the control pin comprises a circle-segment-shaped recess as described above, then the control pin receiver, in relation to the circular basic cross section, can comprise an equal but opposite circle-segment-shaped wall thickening.

This on the one hand ensures a positive receiving of the drive section with the recess in the control pin receiver and hence a rotational fixation. On the other hand, the rotation position of the control pin and therefore of the hand part is also defined by way of this, by which means an incorrect sticking of the attachment brush part onto the hand part is prevented.

However, the mentioned rotation position can also be defined by a non-rotationally-symmetrical design of the coupling nub on the hand part and of the nub receiver of the coupling section on the attachment brush part.

The control pin receiver can have a greater length along the control rotation axis than the length of the inserted drive section of the control pin. This means that the receiver still has some free space towards the brush head given an inserted drive section. The inserted drive section does not therefore completely fill out the receiver towards the brush head.

As already mentioned further above, the drive rod can comprise a pressing tongue which is mounted in the wall of the control pin receiver in a spring-elastic manner, in the region of the control pin receiver. This tongue presses against the control pin which is inserted into the control pin receiver and thus clamps this (additionally) in the control pin receiver.

The pressing tongue is exposed out of the control pin receiver by way of an opening, in particular a slot-like opening, in the wall of the control pin receiver. In particular, the opening can be U-shaped. The opening can simultaneously serve as a venting opening, via which the air which is displaced by the introduced drive section of the control pin can escape.

The latching tongue with regard to the orientation can be orientated in the direction of the brush head or in the direction of the hand part.

The length of the pressing tongue can be 2 mm to 10 mm, in particular 3 mm to 7 mm. The greater the length of the pressing tongue, the greater can the deflections of the pressing tongue and accordingly the greater can the pressing force upon the control pin be.

In a further development, for the purpose of forming an axial securing, the pressing tongue can be designed as a latching tongue with an inwardly directed latching lug for latching into a latching notch on the control pin.

However, the latching notch and the latching lug in particular are designed and matched to one another such that the latching connection can be released again by hand by way of exerting a certain withdrawal force upon the attachment brush housing. The withdrawal movement is accordingly parallel to the longitudinal axis of the control pin or to the control rotation axis.

In particular, a haptic and/or acoustic signal arises with the assembly of the attachment brush on the hand part.

In particular, a certain play exists between the latching notch and the latching lug in the axial direction.

It is further alternatively or additionally possible for a slot to be created in the drive rod in the longitudinal direction on the brush head side, in particular in the continuation of the U-shaped opening, as a spring element or spring means. The control pin is clamped further by way of this. The length of the slot can be 2 mm to 10 mm, preferably 3 mm to 7 mm.

According to a further development, the drive rod comprises a stop cylinder in the hand-part-side end section of the control pin receiver. The stop cylinder is an annular, in particular annulus-shaped hollow cylinder section of a smaller outer diameter than the outer diameter of the receiving section of the control pin receiver of the drive rod, said receiving section connecting thereto. The stop cylinder accordingly has a circular inner cross section.

The length of the stop cylinder can be 1 mm to 4.5 mm, in particular 2 mm to 3.5 mm. The outer diameter of the stop cylinder can be 3 mm to 7 mm, in particular 4 mm to 5.5 mm.

A peripheral or partially peripheral stop shoulder is formed in the transition from the receiving section to the hollow cylinder section.

If the stop shoulder is designed as a partly peripheral stop shoulder, then preferably two to four sections of a stop shoulder are realised. These are preferably arranged in a symmetrical or regular manner and each form a part-shoulder of the complete stop shoulder.

The stop shoulder can also be designed peripherally with a different shoulder width. The stop shoulder can therefore be designed in a partly peripheral manner for example with one or several sections with a lower shoulder width and with one or more sections with a larger shoulder width.

The stop shoulder can comprise a shoulder width of 0.2 mm to 3 mm, in particular of 0.3 mm to 0.8 mm, or from 1.2 mm to 1.8 mm.

If a stop shoulder is designed with partly peripheral shoulder sections, then the individual shoulder sections each cover an angle of 40° to 120°, preferably of 50° to 80° with respect to the control axis.

In an embodiment, concerning which the wall is omitted in the securing element in the brush-side sleeve section, it is possible to design the stop shoulder at least partly wider than is shown. The support by the stop shoulder can assume a larger surface due to the additionally obtained space on the inner stop surface on the securing element.

The function of the annular hollow cylinder section and of the associated stop shoulder is explained in more detail in the context of the description of the securing element.

The drive rod further has the function of transmitting an oscillating rotation movement of the control pin further onto the bristle carrier or the brush head.

For this, the drive rod at its brush-head-side end section comprises the first toothing which with the second toothing which is yet described in more detail in the context of the bristle carrier forms a drive toothing. The first toothing is pivotable about the control rotation axis.

The first toothing consists for example of 1, 2, 3, 4, or 5, in particular 2 teeth. The teeth are designed in a comparatively large manner, which simplifies the compensation of tolerances.

The face end surfaces of the first teeth, via which the meshing with the second teeth is effected, can have an inclination of 30° to 60°, in particular of 40° to 50° and very particularly 45° with respect to the control rotation axis.

The outer geometry of the drive rod can be designed asymmetrically, i.e. not rotationally symmetrically, to the control rotation axis.

In particular, the drive rod is not constructed in a rotationally symmetrical manner. The drive rod in particular can comprise a curvature out of the control rotation axis. The drive rod can therefore comprise at least two longitudinal sections which are connected to one another via an arcuate section or consist of these sections.

A first hand-part-side longitudinal section of the drive rod can therefore run parallel to the control rotation axis and a second brush-head-side longitudinal section run in an inclined manner towards the front side with respect to the control drive axis. This means that the longitudinal axis of the drive rod is not necessarily congruent with the control rotation axis.

The drive rod can comprise a necking or tapering (necking section), in which the diameter in particular is essentially reduced. I.e. the drive rod can comprise a part-section with the smaller diameter. The reduced or smaller diameter can be 1.5 mm to 4 mm, in particular 2 mm to 3 mm.

The region of the necking or tapering can assume a share of 10% to 30%, in particular of 12% to 18% of the total length of the drive rod.

The formation of a necking in the drive rod has the effect that this rod has an increased flexibility in order to be able to accommodate loads which arise on sticking on or on operation of the attachment brush, to a better extent. As a whole, an improved performance and a lower energy consumption result.

The geometry of the drive rod in the hand-part-side end region can be adapted with regard to an improved handling in automated processes, such as e.g. with regard to an improved conveying ability within the framework of an automated assembly.

The drive rod in the hand-part-side end region, for the purpose of an optimal positionability of the drive rod in the automated process thus has an adapted cross section, differing from the round cross-sectional basic shape, in particular at two sides which lie opposite one another (to the left and right of the longitudinal axis). The cross-sectional adaptation in particular encompasses the formation in particular of plane surfaces. The surfaces can be formed by a lateral flattening of the round cross-sectional basic shape.

The drive rod can have a length of 30 mm to 65 mm, in particular of 40 mm to 55 mm. The drive rod can have a maximal width (extension between the two sides of the body care brush) of 5 mm to 8.5 mm, in particular of 6 mm to 7.5 mm The drive rod can have a height (extension between the first and rear side of the body care brush) of 5 mm to 9 mm, in particular from 6.4 mm to 7.5 mm.

The drive rod forms a bearing pin on its brush-head-side end section. The bearing pin is herein arranged on the drive rod in a manner such that this runs in the control rotation axis.

This means that the longitudinal axis of the control pin receiver and the longitudinal axis of the bearing pin lie on the control rotation axis and therefore essentially on a common geometric axis.

Since the control axis in the case of different models can have tolerances with regard to the longitudinal direction, the mounting of the bearing pin in the pin receiver has sufficient tolerances with respect to an angle deviation of the control axis or of the drive rod.

According to a further development, the drive rod in a brush-head-side end section has a cross-sectional recess which is delimited to the hand-part-side end section by a bearing pin shoulder. The bearing pin is then arranged on the bearing pin shoulder via its base.

The first toothing is arranged on the brush-head-side end of a rod continuation which starting from the bearing pin shoulder extends in the direction of the housing head. The rod continuation can run parallel to the bearing pin. A distance or a recess of 0.5 mm to 2 mm, in particular of 0.8 mm to 1.2 mm can be provided between the rod continuation and the bearing pin. The side of the rod continuation which faces the bearing pin can be a plane surface.

In the context of an emergency function or additional securing, the drive rod can also serve as a transmission element or bearing element should the bearing pin be broken on account of incorrect use or overuse. For this, the side of the rod continuation is arranged in the direction of the bearing pin relatively close to this and the pin receiver body is designed in a round manner. In the case of a breakage of the bearing pin, the rear side of the rod continuation drags or bears on the pin receiver body and the function and reliability of the attachment brush part is ensured as was hitherto the case.

The bearing pin is rotatably mounted at least with its free end section in a pin receiver on the attachment brush housing. The pin receiver was already described in more detail in the context of the attachment brush housing.

The bearing pin serves for the mounting of the brush-head-side end section of the drive rod in the attachment brush housing.

According to a further development, the drive rod in its brush-head-side longitudinal section forms a contact with the attachment brush housing merely via the bearing pin.

In particular, the surface of the bearing pin is smooth. In particular, a special treatment of the surface of the bearing pin is not necessary.

The bearing pin can have a total length of 1.5 mm to 4 mm, in particular of 2 mm to 3 mm.

In particular, the bearing pin forms at least one cylindrical middle section. The diameter of the cylindrical middle section can be 0.4 mm to 2 mm, in particular 1 mm to 1.8 mm. The length of the cylindrical middle section can be 0.5 mm to 2.5 mm, in particular 1 mm to 1.6 mm.

The base of the bearing pin, via which this is arranged on the bearing pin shoulder, can be designed in a cone-like manner. The cone height can be 0.2 mm to 1 mm, in particular 0.3 mm to 0.6 mm. The cone surfaces can enclose an angle of 10° to 40°, in particular of 15° to 30° to the control rotation axis.

The bearing pin can form a conically tapering, free end section. The length of this end section can be 0.4 mm to 1.2 m, in particular 0.6 mm to 1 mm. The cone surfaces can enclose an angle of 10° to 40°, in particular of 15° to 30° to the control rotation axis.

The bearing pin, considered from the front side, is arranged offset to the rear with respect to the first toothing. In particular, the bearing pin can be arranged behind the first toothing.

The drive rod can comprise a flattening in the region of the control pin receiver on the front side on the outer periphery. This flattening serves as an assembly aid and simplifies the correct alignment or positioning of the drive rod with respect to its rotation position before the assembly.

The drive rod in particular consists of a hard component or comprises such. The drive rod can comprise a polyamide (PA) as a matrix material or consist thereof. In particular, polyamide is characterised by its smooth surfaces.

The drive rod can comprise one or more additives for the modification of the material characteristics. The drive rod can comprise e.g. fibres, in particular glass fibres, for reinforcement. Herein, the additives are embedded in the matrix-forming hard component.

Further additional or alternative additives are described at another location in this description.

The bristle carrier consists of the carrier body and the function unit. The bristle carrier together with the care bristles and possibly further care elements forms the brush head.

In particular, the care bristles are cleaning bristles, such as tooth cleaning bristles.

In particular, the care elements are cleaning elements.

The bristle carrier serves for taking up the movement of the drive rod and transmitting it onto the bristle field. Furthermore, the bristle carrier receives the care bristles as well as possibly further care elements.

For the sake of simplicity, the care bristles amongst others are hereinafter also referred to merely as "bristles".

As a rule, the bristles are extruded in a separate process before they are inserted into bristle holes on the bristle carrier.

The bristles are arranged on the carrier body. The carrier body in turn comprises a bristle anchoring body, on which the bristles are anchored or fastened. The bristle anchoring body can be an integral constituent of the carrier body. The bristle anchoring body can also be joined with further parts into a carrier body.

In particular, the carrier body is essentially round, such as circularly round, in a plan view from the front side. The carrier body however can also be designed in an oval or elliptical or polygonal manner in the mentioned plan view. A polygonal carrier body can be designed e.g. as a regular or irregular polygon with e.g. 5, 6, 7, 8, 9, 10, 11 or 12 corners.

The carrier body forms a centre which in particular also corresponds to the centre of the bristle field. If the carrier body is oscillatorily mounted about a carrier rotation axis, then the carrier rotation axis in particular leads through the centre.

The carrier body can further be disc-like. This means that its height is significantly smaller than its largest diameter. This can be e.g. a ratio (height:diameter) of 0.3 or smaller.

In particular, the surface of the carrier body, from which the bristles exit, is plane. The mentioned surface however can also laterally comprise indentations or protrusions. The mentioned surface in particular can be designed convexly or concavely or also in a wave-shaped manner. The mentioned surface can further form concentrically arranged prominences and deepenings. The prominences and deepenings can also be orientated longitudinally or transversely.

In particular, the carrier body comprises integrated bristle holes, via which the bristles are led outwards.

The carrier body can also be designed of several parts, so that the bristle holes can be formed in a separate part or carrier part-body (e.g. bristle anchoring body) which is then unreleasably connected to a lower part or carrier part-body of the carrier body (e.g. base element) into the actual carrier body. The parts or the carrier part-body in particular consist of the same hard component.

As is specified in more detail further below, the bristles can be attached to the carrier body in different manners.

The bristle carrier or its carrier body can have a diameter of 10 mm to 18 mm, in particular of 12 mm to 16 mm.

The diameter of the bristle carrier or its carrier body can be equal to or larger than the outer diameter of the housing head in the region of the carrier receiver opening. By way of this, it is ensured that in the case of an excessive wear of the contact surfaces between the bristle carrier in the region of the yet subsequently described function unit and the housing head, the bristle carrier with it carrier body can form a resting contact with the annular face end surface of the housing head in the region of the carrier receiver opening.

This however also means that the carrier body of a wear-free attachment brush part in particular forms no resting contact with the annular face end surface of the housing head in the region of the receiver opening, particularly in the new condition. In particular, a gap is provided between the carrier body and the annular face end surface.

On use, the resting contact cannot arise until there is a large pressure or an increasing wear and develops a function for additional reliability by way of the face end surface accommodating additional contact pressure.

Furthermore, the bristle carrier comprises a function unit which is arranged on the rear side of the carrier body. The function unit projects in particular beyond a plane, rear side surface of the carrier body. The function unit can have a diameter of 4 mm to 12 mm, in particular of 6 mm to 10 mm.

The bristle carrier which encloses the function unit can have a total height of 5 mm to 12 mm, in particular of 7.5 mm to 10 mm.

The function unit amongst other things comprises the second toothing on the rear side of the carrier body. The second toothing as part of the bristle carrier is rotatable together with the bristle carrier about the carrier rotation axis.

The second toothing consists for example of 2, 3, 4, or 5, in particular of 3 teeth. The teeth are arranged in a radiant or radially running manner. The middle point of the radiant or radial arrangement in particular lies on the carrier rotation axis.

The face end surfaces of the second teeth, via which the engagement of the first teeth is effected, can have an inclination of 30° to 60°, in particular of 40° to 50° and very particularly of 45° with respect to the carrier rotation axis.

According to a further development, the bristle carrier comprises a rotation angle limitation device for the bristle carrier with two lateral stops for the limiting cams. In particular, the rotation angle limitation device is part of the function unit.

The rotation angle limitation device or the associated lateral stops are arranged in particular in the direction of the upper housing head end above the second toothing.

As has already been described in detail further above, the limitation cam is arranged in the bristle carrier receiver of the housing head. In the assembled state of the bristle carrier or brush head, the limitation cam is arranged between the two lateral stops. The bristle carrier is then rotatable about a defined rotation angle which is defined by the abutting of the lateral stops on the limitation cam. The rotation angle of the drive rod which is produced via the drive is however smaller than the rotation angle which is theoretically possible via the stops.

The rotation angle of the bristle carrier about the carrier rotation axis is for example maximally+/−30°, in particular maximally+/−25° with respect to the neutral position of the bristle carrier. The neutral position corresponds to the position of the limitation cam exactly between the two lateral stops. This means that the maximum total rotation angle here is 60° and 50° respectively.

The interaction of the lateral stops and the limitation cam in particular forms an over-twist protection.

In a further development, the lateral stops can be connected to one another via an arched, in particular circularly arched guide wall. In particular, the guide wall is arranged concentrically to the carrier rotation axis or to the aforementioned mounting sleeve in the housing head.

The function unit can have a height of 2 mm to 8 mm, in particular of 4 mm to 6 mm.

As already mentioned, the bristle carrier is rotatably mounted about the carrier rotation axis in the attachment brush housing or in the bristle carrier receiver in the housing head. In particular, the carrier rotation axis lies essentially perpendicularly to the control rotation axis. The carrier rotation axis however can also be arranged at an angle of smaller than 90° to the control rotation axis.

In particular, the brush head is rotatably mounted in the bristle carrier receiver of the housing head via a bearing pin which is yet described in more detail hereinafter.

The bristle carrier or the associated function unit comprises a bearing pin receiver which is open to the rear side, for a subsequently described bearing pin. In particular, the bearing pin receiver is designed as a blind hole. This means that the bearing pin receiver is not open to the front side of the carrier body.

The bearing pin receiver can also be designed as a through-opening. In this case, the bearing pin receiver is open to the front side of the carrier body.

In particular, the pin shank of the bearing pin is not led up to the front side of the carrier body. This means that the pin shank ends before the front side of the carrier body or of the bristle anchoring body. The pin shank can end in the carrier body or bristle anchoring body.

The longitudinal axis of the bearing pin receiver corresponds to the carrier rotation axis. The diameter of the bearing pin receiver can be 0.75 mm to 2 mm, in particular 1 mm to 1.6 mm. The axial length of the bearing pin receiver can be 2 mm to 5 mm and in particular 3 mm to 4 mm. The bearing pin receiver serves for anchoring the bearing pin in the bristle carrier. I.e. the bearing pin is fixed in the bearing pin receiver on the bristle carrier.

Extensive tests have found that the dimensions of the bearing pin and of the bearing pin receiver which have been described in this text are particularly advantageous, in order to ensure an optimal function and reliability of the attachment brush.

The bearing pin receiver is arranged at least partly and in particular completely in the function unit. According to a further development, the bearing pin receiver merely runs within the function unit which projects from the rear side of the bristle anchoring body. This means that the bearing pin receiver ends before the bristle anchoring body.

The bearing pin receiver can also end within the bristle anchoring body. This means that the bearing pin receiver does not extend up to the front side of the bristle anchoring body.

In the case of a multi-part brush carrier, i.e. of a separate bristle anchoring body, the bearing pin receiver preferably does not extend into the bristle anchoring body.

The lateral stops for the limitation cam are arranged in particular laterally of the bearing pin receiver in the neutral position of the bristle carrier.

The bristle carrier or the function unit, on its rear side further forms an annular contact shoulder which surrounds the opening of the bearing pin receiver. The annular contact shoulder is delimited to the outside by an annular wall which forms a cylinder receiver and to the inside by the bearing pin receiver. The annular, in particular annulus-shaped contact shoulder serves for the contact of the bristle carrier on the housing head or on the mounting sleeve and forms a contact surface for this.

The bristle carrier bears in particular on a face end surface of the mounting sleeve via the contact surface of the contact shoulder. The annular wall which surrounds the contact shoulder, in the assembled state in particular engages over the mounting sleeve along the carrier rotation axis and therefore ensures an adequate centring of the bristle carrier in the housing head before assembly of the bearing pin.

The annular contact shoulder can have an outer diameter of 1 mm to 4 mm, in particular of 2 mm to 3 mm. The width of the annular contact shoulder can be 0.2 mm to 1.2 mm, in particular 0.4 mm to 0.8 mm.

Basically, the geometry of the bristle carrier or the connections between the bristle carrier and the attachment brush housing and the drive rod are selected such that the forces which act upon the brush head due to cleaning and care procedures are not transmitted onto the drive rod and onto the securing element. In contrast, the forces are introduced into the housing head via the mounting sleeve via the aforedescribed annular contact shoulder.

Finally, it is predominantly lateral forces which are transmitted onto the second toothing on the bristle carrier by way of the rotating drive rod which are act upon the first toothing of the drive rod. In particular, practically no axial forces are transmitted from the brush head onto the drive rod.

This has the advantage that the movement function of the brush head is ensured even with high loads upon the brush head.

In particular, the bristle carrier consists of a hard component or comprises such. The bristle carrier can consist e.g. of polyoxymethylene (POM) or comprise this. Polyoxymethylene is very dimensionally stable even amid changing environmental conditions due to the low humidity absorption. Furthermore, polyoxymethylene is characterised by a high wear resistance, in particular in the region of the toothing. The characteristics of polyoxymethylene also permit an optimal anchoring of the bearing pin in the bearing pin receiver, said bearing pin being described in yet more detail hereinafter.

Apart from the mentioned plastic, the bristle carrier can also comprise one or more additives for the modification of the material characteristics. The bristle carrier can comprise e.g. fibres for reinforcement. Herein, the additives are embedded into the matrix-forming hard component.

Furthermore, the bristle carrier can also be improved with regard to its sliding characteristics and comprise one or more additives such as molybdenum disulphide, PTFE and chalk. A PTFE modification of the plastic component has also been found to be very effective with regard to increasing the wear resistance. The wear coefficient can thus be reduced to a third of the value for non-modified polyoxymethylene. Herewith, the energy consumption can be lowered and the wear reduced.

Further possible additives are described in more detail in the section "additives".

Since the bristle carrier bears on the attachment brush housing via a contact surface, the material pairing between the bristle carrier and the attachment brush housing is particularly important. A carefully selected material pairing is specifically to ensure a lower wear, i.e. friction and accordingly a longer service life of the attachment brush as well as minimised electricity consumption.

The material nature of the attachment brush part has already been described further above.

The bristle carrier is rotatably fastened on the housing head via a bearing pin. The bearing pin, apart from forming a physical rotation axle (pivot), also has the task of fixing the bristle carrier on the housing head. The bearing pin is led through the feed-through opening on the housing head for the rotatable mounting of the bristle carrier on the housing head. The bearing pin co-rotates with the brush head given correct use.

The bearing pin comprises a pin shank as well as a pin head which has a diameter which is wider compared to the pin shank. In particular, the pin head projects from the pin shank essentially at right angles. The pin shank towards the pin head comprises a first cylindrical section with a smooth surface. Furthermore, towards the free end the pin shank comprises a second fastening section.

The first cylindrical section with a smooth surface serves as a plain bearing for the bearing pin in the mounting sleeve. Forces occurring radially upon the bristle carrier are accommodated in this bearing. The smooth surface of the cylindrical section serves for preventing wear and damage to the bearing sleeve on account of this.

The fastening section comprises a structured surface which is to permit a rotationally fixed, in particular non-positive and/or positive connection to the bristle carrier.

The structured surface can be a roughness pattern, such as a roughening or corrugation. The roughness pattern serves for increasing the friction for the purpose of creating a friction fit.

The structured surface can also comprise anchoring elements, such as cone-shaped anchoring elements, or barbs. These permit the anchoring of the fastening section in the bristle carrier.

Anchoring means that the fastening section can be inserted into the receiver on the bristle carrier in an insertion direction. The withdrawal of the bearing pin in the opposite direction however is not possible or only possible amid the application of a high axial withdrawal force, e.g. of more than 10 kg in particular more than 13 kg.

Anchoring elements in the form of several cone bodies which are arranged successively along the pin axis and which each taper to the free end of the pin shank can therefore be arranged in the fastening section on a cylindrical base body.

The cone surfaces can enclose an angle of 40° to 80°, in particular 50° to 70° with regard to the pin axis.

The inner diameter of the cone body can be 0.3 mm to 2 mm, in particular 0.5 mm to 1.5 mm.

The length of the cone body along the pin axis can be 0.5 mm to 1 mm, in particular 0.65 mm to 0.85 mm.

The anchoring elements can be constructed identically or differently.

The fastening section can comprise 2 to 8, in particular 3 to 6 anchoring elements.

The fastening section can further comprise a roughness pattern of the aforementioned type which is superimposed on the anchoring elements.

The diameter of the pin head can be 1 mm to 3 mm, in particular 1.5 mm to 2.5 mm. The diameter of the pin shank can be 0.5 mm to 2.5 mm, in particular 1 mm to 2 mm. The length of the bearing pin can be 6 mm to 11 mm, in particular 8 mm to 9.5 mm.

The bearing pin in particular consists of a metal, such as stainless steel. The material selection is of significance inasmuch as the bearing pin should not corrode in contact with toothpaste and other oral cleaning agents. Furthermore, no substances should be released into saliva.

The bearing pin is manufactured as a turned part by way of turning or in particular by way of reshaping (forming). The reshaping can be effected by way of rolling.

The bearing pin is stuck through the bearing sleeve on the housing head via an opening on the rear side of the housing head and with a fastening section engages into a bearing pin receiver on the bristle carrier. A depression which receives the pin head, in particular in a complete manner, is provided in the region of the opening on the rear side of the housing head. This means that the pin head in the depression in particular is arranged flush with the outer surface of the housing head or is slightly sunk with respect to this. This is of significance inasmuch as the brush head is situated in the oral cavity during dental care and any danger of injury due to projecting parts must be avoided.

Some radial play can be provided between the wall of the depression and the pin head, e.g. $\frac{1}{10}$ of the diameter of the pin head.

As mentioned, the bearing pin is connected to the bristle carrier in a rotationally fixed manner. The receiving of the fastening section in the bearing pin receiver of the bristle carrier in particular is effected via a press fit or friction fit.

The fastening section of the bearing pin with regard to the diameter can have an overdimension with respect to the bearing pin receiver on the bristle carrier and this contributes to the formation of a friction fit. The overdimension can be 0.05 mm to 0.4 mm, in particular 0.1 mm to 0.2 mm.

However, it is also possible for the bearing pin receiver to have an overdimension with respect to the bearing pin, e.g. of 1.5/10 mm of the diameter of the bearing pin receiver.

The fastening section of the bearing pin, as mentioned, is a front end-section on the bearing pin. The length of the fastening section can be 2 mm to 5 mm, in particular 3 mm to 4 mm. The length of the fastening section can correspond to the axial length of the bearing pin receiver.

The length of the press fit can accordingly be 2.5 mm to 5 mm, in particular 3 mm to 4 mm.

In the assembled state, the free end of the bearing pin is arranged in the bearing pin receiver in particular such that this bears on the base of the bearing pin receiver or a distance is formed between the base of the bearing in receiver and the free end of the bearing pin. This distance can be 0 mm to 0.1 mm, preferably from 0.02 to 0.08 mm. This means that the end surfaces bear on one another in a plane manner or there is a defined gap.

The rotatable mounting of the bristle carrier is effected via the bearing pin which is rotatably mounted in the mounting sleeve.

The mounting sleeve on the housing head is then arranged between the pin head and the bristle carrier or its function unit.

In particular, the bearing pin is mounted in the mounting sleeve with radial play. The axial play can be 0.01 mm to 0.25 mm, in particular 0.02 mm to 0.18 mm.

The bearing pin can likewise have play in the longitudinal direction, so that the brush head is slightly displaceable along the carrier rotation axis relative to the housing head. The play can be 0.02 mm to 0.3 mm, in particular 0.05 mm to 0.2 mm. Stresses between the brush head and the housing head can be avoided by way of this.

The securing element serves for the radial securing or alignment of the hand-part-side end section of the drive rod. Furthermore, the securing element serves for the axial securing or fixation and positioning of the drive rod in the attachment brush housing, so that this cannot fall out of the attachment brush housing.

In particular, the securing element is inserted into the housing neck via the hand-part-side receiver opening on the attachment brush housing and is fastened in this neck. The securing element is fastened in the housing neck in particular via a non-positive and/or positive fit connection. The fastening can be releasable or non-releasable.

In particular, the securing element is designed as a securing sleeve. The securing sleeve in particular forms a continuous sleeve cavity.

The securing element in particular also serves for the attachment brush housing being fixed with regard to the hand part and only the drive rod and the brush head being moved.

The securing element in particular comprises a brush-head-side sleeve section for receiving and supporting the end section of the drive rod.

In particular, the brush-head-side sleeve section can also accommodate axial forces of the drive rod.

The brush-head-side sleeve section has sufficient tolerance such that an unhindered attachment of the attachment brush part and in particular the locating of the fit between the control pin and the drive rod is possible, despite angular deviations of the control pin.

According to a further development, the securing element in the brush-head-side sleeve section forms an inner-lying, annular cross-sectional narrowing in the form of an inner ring. The annular cross-sectional narrowing forms an annular inner stop surface which faces the brush head. In particular, the inner stop surface is orientated perpendicularly to the control rotation axis. The annular cross-sectional narrowing furthermore forms a cylinder-shaped receiving section, in particular circular-cylinder-shape receiving section, for receiving the stop cylinder of the drive rod.

The cylinder-shaped receiving section serves for the pre-centring of the drive rod via the stop cylinder of the drive rod which engages into this. The actual centring of the drive rod is effected via the insertion of the control in into the control pin receiver of the drive rod. Furthermore, the drive rod is also radially secured on its hand-part-side end section in this manner.

The cylinder-shaped receiving section is arranged concentrically to the control rotation axis. The cylinder-shaped receiving section can have an axial length of 0.5 mm to 3 mm, in particular of 1.5 mm to 2.5 mm.

The inner stop surface can have a radial width of 0.25 mm to 2 mm, in particular of 0.5 mm to 1 mm. The annular cross-sectional narrowing can have an inner diameter of 4 mm to 7 mm, in particular of 5 mm to 5.5 mm.

The drive rod is then rotatably mounted on the inner stop surface of the securing element via its contact shoulder and is therefore axially secured with the necessary tolerance. Herein, the stop shoulder and the inner stop surface in particular form an extensive sliding contact.

However, in particular a play exists between the stop cylinder and the annular cross-sectional narrowing, so that the stop cylinder forms no friction fit in the tubular cross-sectional narrowing. This means that the outer diameter of the stop cylinder is smaller than the (inner) diameter of the cylinder-shaped receiving section.

Consequently, the inner surface of the cylinder-shaped receiving section and the outer surface of the stop cylinder which lie opposite one another do not contact one another in operation. A contact of the mentioned surfaces is effected at the most within the framework of the pre-centring when the control pin is not yet inserted into the control pin receiver of the drive rod.

The drive rod is consequently rotatably mounted in its brush-head-side end section via the bearing pin on the attachment brush housing and in its hand-part-side section via the stop shoulder on the securing element. In particular, a radial and axial play exists.

The outer peripheral surface of the brush-head-side sleeve section of the securing element is for the most part designed in a smooth manner.

Furthermore, the injection point is arranged on the outer peripheral surface of the brush-head-side sleeve section of the securing element.

One or more, in particular two spring-elastic latching tongues which lie opposite one another can be arranged in the wall of the brush-head-side sleeve section of the securing element. The latching tongues can each comprise a latching lug which is arranged on the tongue end and which is directed outwards. In the assembled state of the securing element, the latching lug is latched in a latching notch, latching groove or latching opening, on the housing neck and in this manner ensures an axial securing of the securing element.

The at least one latching tongue is accordingly arranged outside the nub receiver in the direction of the brush head, said nub receiver being yet described hereinafter.

The brush-head-side section of the securing element comprises corresponding openings, in particular slot-like openings in the sleeve wall, said openings releasing the latching tongues. The openings are accordingly open to the free end of the sleeve section. The openings run in the longitudinal direction of the securing element.

The latching tongue can be part of a longitudinal rib on the outer periphery of the securing element, said rib being yet described hereinafter. The longitudinal rib can extend to into the hand-part-side sleeve section which forms e.g. a nub receiver. The longitudinal rib can serve as an assembly aid for inserting the securing element into the housing neck.

In a further embodiment, the wall of the brush-head-side sleeve section of the securing element is reduced or omitted to such an extent, that it is only the spring-elastic latching tongues with the latching lugs which are attached therein which are still present. Herein, the wall can be absent to such an extent that an empty space arises up to the inner stop surface. By way of this, one succeeds in the inner stop surface being wider in the region of the absent wall and hence providing more contact surface.

According to a further development of the securing element, this forms a hand-part-side sleeve section with a nub receiver for receiving the coupling nub of the hand part.

The securing element according to this further development consequently also serves for the connection of the attachment brush part to the hand part.

Longitudinal ribs which run in the longitudinal direction of the securing element can be arranged on the outer surface of the hand-part-side sleeve section. The longitudinal ribs can have a width of 0.2 mm to 0.7 mm, in particular of 0.35 mm to 0.55 mm. The longitudinal ribs can have a height of 0.5 mm to 0.2 mm, in particular from 0.08 mm to 0.12 mm. The length of the longitudinal ribs which in particular is the same for all longitudinal ribs, in particular corresponds to roughly the length of the hand-part-side sleeve section.

In particular, the securing element bears on the inner surface of the housing neck at least partly via the outer surface of the hand-part-side sleeve section.

The hand-part-side sleeve section therefore, as a coupling section, forms the interface to the hand part. The inner geometry of the nub receiver is accordingly adapted to the outer geometry of the coupling nub.

Outer geometries of coupling nubs on the hand part as well as inner geometries of sleeve-like coupling sections on the attachment brush part are described in detail for example in the published document WO 2013/170390.

The nub receiver in the region of the receiver opening can comprise a funnel-like widening which serves as an insert aid for the coupling nub. The funnel-like widening in particular is arranged in the region of the insert limitation flange which is yet described hereinafter.

The pin receiver can comprise so-called longitudinally running displacement ribs. "Longitudinally running" means in the longitudinal direction of the attachment brush part.

The displacement ribs are deformed under pressure, in particular plastically, and therefore ensure a good press fit.

The displacement ribs serve for firmly holding or clamping the coupling nub in the nub receiver. The displacement ribs permit larger tolerances between the coupling nub and the nub receiver without the friction fit connection between the coupling nub and the nub receiver becoming compromised.

The length of the displacement ribs can be variable and is orientated to the inner geometry of the nub receiver. Displacement ribs of a different length can be arranged in the nub receiver.

The width of the displacement ribs can be 0.1 mm to 0.8 mm, in particular 0.3 mm to 0.6 mm. The width can taper in the direction of the brush head. Too great a clamping or even a blocking of the coupling nub in the nub receiver is prevented even if no play is present between the basic inner geometry of the nub receiver and the coupling nub, thanks to the small width.

The height of the displacement ribs can be 0.05 mm to 0.4 mm, in particular 0.1 mm to 0.25 mm. The height can reduce in the direction of the brush head. A clamping is achieved thanks to the small height of the displacement ribs, even if play is present between the basic inner geometry of the nub receiver and the coupling nub.

In particular, the displacement ribs are arranged to the left and right side of the body care brush.

The outer surfaces of the two sleeve sections are each in particular designed conically and taper towards the brush head. By way of this, the insertability of the securing element into the conically designed receiver of the housing neck is ensured.

Alternatively or additionally to the displacement ribs, the securing element can comprise one or more spring elements opposite the coupling nub. The spring element or elements act upon the coupling nub.

The spring element or elements can consist of a hard component, of a soft component or of a combination thereof.

The spring element can also be attached to the attachment brush housing and act upon the coupling nub through a recess of the securing element or act upon the coupling nub in interaction with a further spring element on the securing element.

The action of the spring element or spring elements upon the coupling nub in particular lies in exerting a clamping force upon the inserted coupling nub.

A notch can be arranged on the outer surface of the hand-part-side sleeve section. This notch serves for receiving the latching lug of a latching tongue, said latching tongue being arranged in a first receiving section of the housing neck.

Furthermore, in particular geometries which correspond with the U-shaped slot of the latching tongue of the attachment brush housing are created on the rear side of the securing element.

A projecting geometry on the securing element can therefore be designed in a U-shaped manner and therefore be completely inserted into the U-shaped slot on assembly.

A projecting geometry on the securing element in the form of one or more parts of the U-shaped geometry can also be formed on the securing element, so that in particular only part-geometries are inserted into the U-shaped slot on assembly.

According to a particular embodiment, two stumps or projections which are next to one another and distanced to one another are arranged on the hand-part-side end of the securing element, said stumps or projections in the assembled state engaging into the U-shaped slot at the end limbs of this slot.

The projections can each have a length of 1 mm to 5 mm, in particular of 1.5 mm to 3 mm. Furthermore, the projections can have a ramp-shaped ascent in the assembly direction. In this manner, the insertion of the securing element into the attachment brush housing and hence also the moving of the projections into the U-shaped recess or its end limbs is assisted.

One or more, in particular two prominences which are arranged along the periphery of the securing part can be provided as further elements for the retention of the securing part in the attachment brush housing. This means that their longitudinal extension is aligned transversely to the longitudinal axis of the securing part.

In particular, the prominences are arranged in the first securing part axially at the same height.

The prominences latch into corresponding grooves on the attachment brush housing, said grooves having already been described further above, so that a latching is effected on inserting the parts into one another.

In particular, the prominences are formed on the two lateral walls between the latching tongues. The prominences lie over a peripheral region of 50° to 170°, in particular of 100° to 160°, between the latching tongues.

The prominences themselves can be subdivided, so that several smaller (part) prominences are formed.

The securing element at its hand-part-side end in the region of the nub receiver opening in particular comprises an annular insert limitation flange. The outer periphery of the insert limitation flange is flush with the connecting outer periphery of the housing neck, into which neck the securing element is inserted. The insert limitation flange ensures that the securing element is not inserted completely into the housing neck. For this, the insert limitation flange forms a stop, via which the securing element abuts on the face end surface of the hand-part-side receiver opening on the housing neck.

This means that the axial length of the securing element can no longer be changed at a later stage by inserting the control rotation axle as well as the coupling nub of the hand part into the coupling section.

The insert limitation flange can additionally comprise identification information on its outer surface, said information permitting the identification of the attachment brush part. The identification information can be a colour coding. The users of a common hand part can therefore unambiguously identify their personal attachment brush part by way of the colour coding on the outer surface of the insert limitation flange.

The attachment brush housing can be white for creating a particularly good contrast for the purpose of the colour coding.

The outer diameter of the insert limitation flange can be 8 mm to 18 mm, in particular 11 mm to 15 mm.

The length of the securing element can be 10 mm to 30 mm, in particular 18 mm to 24 mm.

The outer diameter of the securing element subsequently to the insert limitation flange can be 6 mm to 15 mm, in particular 8.5 mm to 12.5 mm.

The securing element can consist of a hard component or comprise this. The securing element in particular consists of polypropylene (PP) or comprises this. Polypropylene has the advantage that this is a comparatively soft hard component and the wearing at the coupling nub of the hand part therefore remains low.

The use of polypropylene however necessitates the securing element preferably being assembled with a friction fit or press fit, in order to ensure a significantly high withdrawal force with regard to the coupling nub.

The securing element in particular consists of a softer material than the coupling nub. In particular, the hand-part-side sleeve section which forms the nub receiver is compliant. This is of significance inasmuch as this ensures an optimal clamping of the coupling nub in the nub receiver.

Such a material combination also has the effect that it is not the coupling nub of the long-life hand part but rather the nub receiver of the comparatively short-lived attachment brush part which is worn by way of the repeated sticking-on and withdrawal.

Furthermore, the hand-side-part sleeve section can be shaped on the outer side such that it corresponds to a possible interface.

The selection of different plastic components and possibly of additives for manufacturing the attachment brush housing, the drive rod, the bristle carrier and the securing element very generally in particular serves for the friction-optimised interaction of the individual components.

As already mentioned further above, the bristle carrier and the bristles form the so-called brush head. The bristles form a bristle field on the carrier body.

The bristle field can be formed from one or more bristle field segments. Bristle field segments correspond to part-surfaces of the bristle field which are provided with bristles and possibly with care elements, and which in particular are distanced to one or more further bristle field segments.

In particular, the bristle field segments are formed from care bristles or bristle bundles of care bristles. However, it is also possible for individual bristle field segments, in particular elongate bristle field segments to be formed from soft material and in particular from one piece. This means that not all segments of a bristle field have to consist of bristles.

In turn, a bristle field segment can, but does not need to be designed exclusively of care bristles. Apart from care bristles, the bristle field segment can also comprise other types of care element, e.g. of a soft material. Such care elements can be e.g. lamellae.

As explained yet hereinafter, the bristle field segments can have different shapes of base surfaces, hereinafter simply called shape. A classical shape of a bristle field segment is the round shape, in particular the circular shape.

The bristle bundles which form the bristle field or the bristle field segments can be designed in a radiant manner. This means that the bristles of a bristle bundle run apart, from their base in the direction of the free end.

The bristle bundles which form the bristle field or the bristle field segments can be designed cylindrically. This means that the bristles of a bristle bundle run parallel to one another from their base in the direction of the free end.

The bristle bundles can be pointed at their free end. In particular, this improves the cleaning performance.

Round, in particular circularly round or circular bristle field segments can be formed from individual or individually standing bristle bundles.

The bristles can be conventional bristles, i.e. extruded bristles. The extruded bristles can be cylindrical. The free bristle ends can be cylindrical or pointed at one or both sides. A combination of cylindrical and pointed bristles in a bristle field or bristle field segment is likewise possible.

The bristles can moreover also be injected. In contrast to conventional, extruded bristles, injected bristles are manufactured by way of an injection moulding method and consist of a bristle component according to the present description.

Combinations of extruded and injected bristles in a bristle field are likewise possible.

Apart from bristles, as already mentioned, the brush head can comprise further function elements or care elements such as massage elements or cleaning elements. These can consist of a soft component.

The free bristle ends of the bristle field can be arranged in a plane. However, the bristle field can also be profiled. Profiling means that the free bristle ends of the care bristles or of the bristle bundles are not arranged in a common plane but lie on different planes. As a rule, such a profiling is achieved by way of different bristle lengths. However, the profiling can also be achieved by a profiling of the bristle carrier or its base. In this case, the bristle base is arranged on different planes. Herein, the care bristles can have the same lengths.

Thus for example a profiling of the bristle field, according to which a centre region of the bristle field lies deeper than the bristles or bristle field segments which surround the centre region, can be provided. The free ends of the care bristles in the centre region in particular lie the deepest compared to the remaining bristles.

The centre region can be formed by one or more bristle field segments.

One can envisage individual or all bristle field segments each having no profiling within a profiled bristle field. This means that the bristle ends of the care bristles of such a bristle field segment lie in a common plane.

However, one can also envisage individual or all bristle field segments themselves comprising a profiling. This means that the free bristle ends of the care bristles within a bristle field segment lie in different planes, thus have a different height.

The height relates to the level of the bristle ends from the bristle carrier in the direction of the bristle ends.

Individual or all bristle field segments of a profiled bristle field can have a profiling or no profiling.

The profiling, which is to say the height difference between the free bristle ends can be e.g. 1 mm or more.

With regard to the design of the bristle field segments, the bristle field according to a variant can comprise a central bristle field segment which is surrounded by further bristle field segments.

The further bristle field segments can be radiantly arranged about the central bristle field segment, particularly if these are elongate bristle field segments.

The further bristle field segments can be arranged concentrically about the central bristle field segment, particularly if they are bristle field segments which are designed in an arched manner. A combination of bristle field segments which are arranged radiantly and concentrically is possible.

The central bristle field segment can e.g. be round, in particular circularly round. The central bristle field segment can be spiral-shaped.

According to a further variant, the bristle field can comprise at least one bristle field segment which is designed in an arched manner. The bristle field segment can have the shape of a circular arc. The bristle field segment can also be banana shaped.

The bending of the bristle field segment can be directed outwards (bristle field segment is open to the inside). The bending of the bristle field segment can be inwardly directed (bristle field segment is open to the outside).

The at least one bristle field segment can be arranged concentrically to a circular bristle carrier.

In particular, the at least one arched bristle field segment bristle field is arranged peripherally and can be arranged e.g. on the outer edge of the bristle field.

According to a further variant, the bristle field can comprise a spiral-shaped bristle field segment. In particular, the spiral-shaped bristle field segment is arranged in a centre region of the bristle carrier, thus forms a central bristle field segment.

The spiral-shaped bristle field segments can have 1, 2, 3, 4, or 5 windings.

The spiral-shaped bristle field segment can be anti-clockwise or clockwise.

The spiral-shaped bristle field segment can be profiled and considered from the inside (centre) to the outside can have an increasing height (centre is the highest point) or a reducing height (centre is the lowest point) along the spiral course. In particular therefore the bristle length can increase or reduce from the inside to the outside along the spiral course. The increase or reduction can be continuous or step-like.

According to a further variant, the bristle field can comprise at least one T-shaped bristle field segment. The at least one T-shaped bristle field segment comprises a trunk as well as two limbs which at the end side lead away from the trunk at an angle, in particular at a right angle. The trunk can be directed radially to the centre. The trunk can be directed radially outwards, away from the centre.

Several T-shaped bristle field segments of a bristle field can be directed with their trunk towards one another.

In particular, the at least one T-shaped bristle field segment is arranged in the centre region of the bristle field.

Two or more than two T-shaped bristle field segments can be connected to one another via their trunk, in particular via the free end of the trunk.

Two or more than two T-shaped bristle field segments can be connected to one another via one or both limbs, in particular via the free end of the limb.

According to a further variant, the bristle field can comprise at least one triangular bristle field segment and in particular several triangular bristle field segments. The at least one triangular bristle field segment can point with a triangle tip towards the centre. The at least one triangular bristle field segment can point with a triangle tip radially outwards away from the centre. A combination of triangular bristle field segments with triangular tips which point to the centre and radially outwards is also possible.

The at least one triangular bristle field segment can be arranged peripherally, in particular on the outer edge of the bristle carrier.

The at least one triangular bristle field segment can be arranged about a central bristle field segment.

According to a further variant, the bristle field can comprise at least one and in particular several elongate, straight, such as e.g. dash-shaped bristle field segments. In particular, the at least one elongate, straight bristle field segment is arranged in a radiant manner, i.e. arranged pointing radially outwards about the centre of the bristle carrier. The at least one elongate, straight bristle field segment can be designed tapering towards the centre or outwards.

The elongate, straight, such as e.g. dash-shaped bristle field segment, in particular four thereof, can each be arranged at a right angle to one another, in a cross-shaped or X-shaped manner.

In each case two dash-shaped bristle field segments can be arranged on a common straight line.

In each case two dash-shaped bristle field segments can be arranged parallel to or along the longitudinal axis of the attachment brush part.

It is also possible for two dash-shaped bristle field segments to be arranged on a common straight line which is arranged at an angle, e.g. of 45°, to the longitudinal axis of the attachment brush part.

The dash-shaped bristle field segments can project beyond the other bristle field segments in the bristle field.

According to a further variant, the bristle field can comprise at least one circle or ring of bristle field segments. In particular, the ring or circle of bristle field segments is arranged concentrically to the centre of the bristle carrier. In particular, the ring or circle of bristle field segments is arranged peripherally, very particularly on the outer edge of the bristle carrier.

The bristle field segments of such a ring or circle can be as follows:

round, in particular circular;
triangular.

The ring or circle of bristle field segments can be interrupted by other bristle field segments, such as for example elongate, radially outwardly directed bristle field segments.

In particular, two or more than two rings or circles of bristle field segments which are arranged concentrically to one another can also be provided.

According to a further variant, the bristle field can comprise several bristle field segments which are arranged randomly, i.e. without a recognisable pattern, on the bristle carrier. Despite the random arrangement, the bristle field segments can be distributed uniformly over the bristle field. In particular, the bristle field segments have the same shape. The bristle field segments can be differently large.

In particular, the bristle field segments are round, such as circular. The bristle field segment can have different diameters.

According to a further variant, the bristle field can comprise several bristle field segments which are arranged such that these have a spiral-like course from the outside towards the centre.

The spiral-like arrangement of bristle fields can be characterised by particular characteristics of the bristles or bristle bundles of the bristle field segments or of the bristle field segments themselves, said characteristics forming said arrangement and via which the bristle field segments differ from other bristle field segments. This for example can be the colour of the bristles or the bristle type or the design of the bristle end or of the ends of the bristle bundles. Furthermore, this can also be the shape and/or the size of the bristle field segments themselves or the inclination of the bristle bundles.

The bristle field segments of a spiral-like arrangement in particular are round, such as circular. The bristle field segments can have different sizes, such as e.g. different diameters. The size of the bristle field segments can thus decrease from the outside to the inside.

The spiral-like arrangement of bristle field segments can be achieved for example by way of several rings or circles of bristle field segments which are arranged concentrically to one another and which are arranged offset to one another. The rings or circles each have bristle field segments of a different size, by which means the aforementioned offset arises.

According to a further variant, the bristle bundles of at least one bristle field segment and in particular of several bristle field segments can be inclined. In particular, the bristle field segments concerned are round, such as circular.

An inclination of the bristle bundles, on interaction with the oscillation of the carrier body about the carrier rotation axis, can reinforce the cleaning effect.

In particular, the inclination of the bristle bundles is relative to a carrier rotation axis of the carrier body. The bristle bundles can be inclined towards the carrier rotation axis or away from this.

According to a particular embodiment, the bristle bundles are inclined in the peripheral direction. In particular, the peripheral direction is described by a family of tangents along the outer periphery of the carrier body. The peripheral direction can be in the clockwise or anti-clockwise direction.

The inclination axis of the bristle bundles can enclose an angle with the carrier rotation axis of larger than 0°, in particular of 5° or larger. The inclination axis of the bristle bundles can enclose an angle with a carrier rotation axis of 45° or smaller, in particular of 30° or smaller, very particularly of 20° or smaller.

The inclination axis of the bristle bundles can intersect with the carrier rotation axis.

The inclination axis of the bristle bundles can be at a skew relation to the carrier rotation axis. This means that both axes are neither parallel nor do they intersect The bristle field can comprise bristles or bristle bundles of bristle field segments with and without an inclination.

The bristle field can comprise bristles or bristle bundles with different gradients.

It is also possible for bristles with and without an inclination and/or with different inclinations to be arranged within a bristle field segment.

All of the aforementioned variants can be combined with one another in the context of the design of bristle fields.

According to a particular embodiment, the carrier body on the front side comprises in particular a plurality of bristle holes which each receive a bristle bundle. In particular, the bristle holes are round, very particularly are circular.

A bristle hole in the aforementioned context defines a bristle field segment.

As already mentioned, the carrier body can also be designed in a multi-part manner, so that the bristle holes are shaped out in a separate part or carrier part-body (e.g. bristle anchoring body) which connected to the lower part or carrier part body of the carrier body (e.g. base element) then results in the actual carrier body. The bristle holes can be designed as blind holes or as through-holes. The holes can have different cross-sectional shapes.

The carrier body comprises e.g. 18 to 40 bristle holes, in particular 22 to 35 bristle holes. The bristle holes can have a diameter of 1 mm to 1.7 mm, in particular 1.2 mm to 1.5 mm.

According to a particular embodiment, the carrier body comprises an arrangement of bristle holes and accordingly of bristle bundles which can be divided into three groups. In the neutral position of the bristle carrier, an upper first and lower second group each describe the shape of a circle segment or an arc section, in particular circular arc section. The upper and lower group can also have the shape of a circle segment.

In particular, the arc section or the circular arc section or the circle arc of the circle segment run parallel to the circle line of the in particular circular carrier body. The term "parallel" in its present use is to be understood in the context of parallel curves.

A parallel curve is to be understood as the generalisation of the concept of a parallel to a given straight line in the Euclidean plane. Herewith, the curves with regard to their normals likewise have a distance to one another which remains the same over their course.

The first and the second group in particular consist of two arched rows of bristle bundles which are arranged parallel to one another. The outer row can e.g. comprise four bristle bundles and the inner row three bristle bundles.

The middle group consists of one or more, in particular two parallel, straight-lined rows of bristle holes or bristle bundles. In the neutral position of the brush head, the rows of bristle bundles in particular run perpendicularly to the longitudinal axis of the attachment brush part or to the rotation axis of the drive rod.

If the middle group comprises two or more than two parallel, straight-lined rows of bristle bundles, then this group can form a rectangular bristle part-field. If the middle group comprises more than two parallel, straight-lined rows of bristle bundles, then the middle group can form a bristle part-field with a contour which is designed in an arched manner towards the carrier body edge.

Passageways can be formed between the groups of bristle holes or bristle bundles.

The arrangement of the bristle holes or bristle bundles in three groups with passageways lying therebetween permits an unambiguous separation of the bristle bundles in the manufacturing process. This in turn permits the optimal rounding of the bristle ends even given differently long bristles in the respective groups.

According to a particular further development of the aforementioned embodiment, the bristle field is profiled. Herein, the free bristle ends of the middle group of bristle bundles lie more deeply or have a smaller height than the free bristle ends of the outer-lying first and second group of bristle bundles. The mentioned bristle bundles of the middle group are therefore set back.

This means that the bristles of the upper and lower groups can project beyond the bristles of the middle group. The bristle length of the upper and lower group can hence be 5 mm to 12 mm, in particular 7 mm to 10 mm. The bristle length of the middle group can be 5 mm to 9 mm, in particular 6 mm to 8 mm.

The bristle fields can basically be constructed symmetrically, such as mirror-symmetrically, in particular with respect to the longitudinal axis of the attachment brush part. The symmetry can relate to one or more of the following aspects:

the bristle arrangement,
the bristle type,
the bristle length,
the bristle colour.

The bristle characteristics can vary over the bristle field or within a group of bristles or bristle bundles of a bristle field segment. Such characteristics can be e.g. colour, material nature or bristle length.

According to a further embodiment, the bristle field comprises at least one outer row or circle of bristle bundles, an inner or middle row or circle of bristle bundles as well as a centre region with at least one bristle bundle. The bristle bundles have a round, in particular circularly round base.

In particular, the bristle field can consist of the outer and middle circle as well as the centre region of bristle bundles. In particular, the circles of bristle bundles are arranged concentrically about the carrier rotation axis.

In such a design, for example 8, 10, 12, 13, 14, 15, or 16, preferably 12 bristle bundles can be arranged on the outer circle. 5, 6, 7, 8 or 9, preferably 6 bristle bundles can be arranged on the inner circle. 1, 2, 3, or 4, preferably 3 bristle bundles can be arranged in the centre region.

If 3 bristle bundles are provided, the bristle bundles in the centre region in particular can be arranged on an equilateral triangle. This means that the centres of the 3 bristle bundles form the corner points of the equilateral triangle.

In particular, the centre of the mentioned circles, in particular of the mentioned two circles of the bristle bundles and the centre of the equilateral triangle are identical.

In a further development, one can envisage the bristle bundles of the outermost row or circle of bristle bundles having an inclination in the peripheral direction. The perpendicular height of the bristles parallel to the carrier rotation axis can be 7 mm to 12 mm, in particular 8.5 mm to 11 mm.

According to a further development, bristle bundles of an inner, in particular middle row or circle of bristle bundles can have an inclination which is opposite to those of the outermost row or circle. The perpendicular height of the bristles parallel to the carrier rotation axis can be 6 mm to 11 mm, in particular 8 mm to 10 mm.

The inclination of the bristle bundles with respect to the carrier rotation axis can have an angle of 5° to 30°, in particular of 5° to 10° or 15° to 20°.

The bristle bundles can be inclined towards the carrier rotation axis or away from this.

The inclination axis of the bristle bundles can intersect the carrier rotation axis.

The inclination axis of the bristle bundles can have a skew relation to the carrier rotation axis. This means that the two axes are neither parallel nor do they intersect.

According to a further development, the bristle bundles in the centre region can be perpendicular with respect to the front side of the carrier body, i.e. run parallel to the carrier rotation axis. The perpendicular height of the bristles parallel to the carrier rotation axis can be 5 mm to 11 mm, in particular 7 mm to 10 mm.

It is basically possible for different bristle lengths to be provided within a bristle bundle or bristle field segment. A graduation of the bristles can thus be provided within a bristle bundle. The grading can be 0.5 mm to 5 mm, in particular 0.8 mm to 3 mm. Herein, discrete graduations can be provided. A continuous transition between the bristle lengths can also exist.

Furthermore, it is possible to provide bristles with different characteristics, e.g. with regard to material nature, bristle type, colour, cross section, surface nature, bristle end geometry, in the individual bristle bundles or bristle field segments.

According to a particular embodiment of the invention, the bristle bundles of an outermost circle of bristle bundles can be designed of pointed bristles and the bristle bundles of one or two inner circles with cylindrical bristles.

Alternatively, it is also possible to implement cylindrical bristles in the outermost circle and to design the bristle bundles of the one or both inner circles with pointed bristles.

With regard to the profiling or the bristle cut, the design is preferably such that the bristle bundles which stand above or project beyond the bristle carrier to the highest extent are arranged in the outermost circle and the bristle bundles of the inner circle or inner circles project to a lesser extent. This bristle cut is therefore better adapted to the tooth shape.

Alternatively, the bristle bundles towards the centre stand at a higher extent, so that a more targeted interdental cleaning is possible.

According to an embodiment variant, several movable carrier bodies can be provided in an attachment brush part, and these each form a bristle field. The carrier body can be of the same or of a different design. The carrier bodies can have the same or a different movement pattern.

The carrier bodies of a hard component can be at least partly connected to one another by way of a soft component. The zone of the soft component can be a flexible or pliable zone.

Possible characteristics of the aforementioned function elements which can be arranged for example on the bristle carrier or on the attachment brush housing, are described in more detail hereinafter. These characteristics have already been described to some extent under the respective section.

The function elements can have a care function, such as cleaning and/or massage function. Several function elements can also be combined. The function elements can also comprise an oblique setting.

Conventional, i.e. extruded bristles can be provided as function elements.

Injected bristles, which is to say bristles which are manufactured in an injection moulding method can also be provided as function elements. Injected bristles are manufactured from a bristle component.

The function elements can be a tongue cleaner. The tongue cleaner can be manufactured from a hard component, a soft component or a combination of hard component and soft component. Accordingly, the tongue cleaner can have rubber-elastic characteristics.

The tongue cleaner can also be manufactured from the same plastic component as the injected bristles.

In particular, the manufacture of the tongue cleaner is effected in the injection moulding method.

The tongue cleaner is preferably arranged on the rear side and/or laterally on the attachment brush housing, in particular on the rear side and/or laterally on the housing head.

The function elements can also be a massage and cleaning element. The massage and cleaning element can consist of a soft component. Accordingly, the massage and cleaning element can have rubber-elastic characteristics. The massage and cleaning element can be manufactured by way of injection moulding in the multi-component injection moulding method.

Preferably, a material fit exists between the hard component of the brush head and the massage and cleaning element or other function elements.

Possible characteristics of the aforementioned conventional, i.e. extruded bristles which can be arranged for example on the bristle carrier or on the attachment brush housing are described hereinafter. These characteristic have already been described to some extent under the respective section.

The described positions, postures, inclinations of the conventional bristles or bristle bundles can be completely, individually, regularly or irregularly replaced by other function elements.

The conventional bristles can consist of a hard component or of a soft component. In particular, the conventional bristles can be manufactured from polyamide (PA) or polyester, such as polybutylene terephthalate (PBT).

The conventional bristles can be cylindrical. The conventional bristles can be pointed at one side or at both sides. In particular, the conventional bristles can be pointed via a chemical method, in particular if these consist of a polyester, such as polybutylene terephthalate (PBT).

The conventional bristles can also be designed in a corrugated, twisted and or spiral-shaped manner along their longitudinal axis.

The conventional bristles in cross section can be round, in particular circular, triangular rectangular, square, elliptical, polygonal, trapezoidal, parallelogram-shaped or rhomboidal.

The conventional bristles can have a largest diameter of 0.075-0.25 mm for applications in oral hygiene. The cross-sectional area can be 0.002 to 0.2 mm$^2$.

The conventional bristles can have a largest diameter of 0.025-0.2 mm for applications in cosmetics. The cross-sectional area can be 0.001-0.15 mm$^2$.

As mentioned, the manufacture can be effected by way of an extrusion method of one plastic component or by way of a coextrusion method of more than one plastic component.

The surface of the conventional bristles can be smooth or textured.

The conventional bristles in particular are grouped together into bristle bundles on the carrier body.

In contrast to injected bristles or massage and cleaning elements which are manufactured directly on the carrier body or on the attachment brush housing by way of injection moulding, conventional bristles are extruded in a first step, post-machined e.g. cut in a second step and are attached to the carrier body in a third step. The attachment of the bristles to the carrier body can be effected via the anchor punching method, AFT method, IMT method etc. which is described in yet more detail at another location.

The bristling of the carrier body, as already explained further above, can be effected in different manners. Accordingly, the carrier body can also be constructed completely differently.

A first bristling method is the so-called conventional anchor punching method. With regard to this method, the carrier body comprises blind holes which serve for receiving the bristle bundles. In particular, the blind holes are manufactured during the injection moulding of the carrier body.

The conventional bristles are folded in bundles and are punched into the bristle holes and thus fastened in the carrier body by way of anchor platelets.

Furthermore, anchor-free methods such as AFT (anchor free tufting), IMT (inmould tufting), AMR, PTt or IAP (integrated anchorless production) are also known.

One of these anchor-free bristling methods is the so-called AFT method (anchor free tufting). Concerning this method, the conventional bristles or the bristle bundles are fastened to a bristle anchoring body, e.g. to a carrier platelet, without the help of an anchor.

Herein, the bristles are led in bundles with their end which lies opposite the free used end, from the front side through passages or openings in the bristle anchoring body, so that an end section of the bristle bundle projects beyond the rear side of the bristle anchoring body.

The end sections of the bristle bundles which project beyond the rear side of the bristle anchoring body are connected to the bristle anchoring body by way of melting, bonding or welding.

The bristle anchoring body is subsequently unreleasably fastened to the conventional bristles which are fastened on this, in the recess of a base element, for example by way of (plastic) welding, such as ultrasound welding or bonding. A mechanical anchoring, e.g. a snap connection, is likewise or additionally possible.

The recess in the base element is herein adapted to the geometry of the bristle anchoring body. The recess is surrounded by a peripheral, projecting edge.

The bristle anchoring body and the base element together form the carrier body.

The rear side of the bristle anchoring body is defined as that side which faces the base element and is possibly connected to this and which is directed to the rear side of the body care brush.

The front side of the bristle anchoring body is accordingly indicated as that side, from which the bristles exit with their care-effective bristle section.

Concerning the AFT method, it is important for the bristle anchoring body to be fastened in a centred and horizontal manner with respect to the base element. Imbalances could otherwise arise with the rotating/oscillating operation, and these could lead to undesirable movements or vibrations.

It is also possible in the AFT method to design the base element/carrier body less thickly which is to say thinner in the direction of the bristle field. This is the case due to that fact that no bristle holes or blind holes need to be formed in the component, in comparison with conventional anchor punching methods. By way of this, it is possible for the bearing pin receiver to be designed as a through-hole instead of a blind hole. Despite this, the opening cannot be seen in the finished product since the bristle anchoring body is assembled thereabove and the hole is therefore covered.

According to a first variant which differs from the embodiment of an AFT method which is described above, the bristle anchoring body on the bristle anchoring side comprises a peripheral connection edge which projects in the direction of the base element and which accordingly surrounds a recess. The fastened bristle ends are arranged in the recess. The bristle anchoring body forms a type of U-shape in cross section.

The base element for its part comprises a peripheral edge which forms a connection contact surface for the face end surface of the projecting connection edge of the bristle anchoring body.

The bristle anchoring body is then connected to the base element via the face end surface of the projecting connection edge which lies on the connection contact surface. In particular, the connection contact surface and the face end surface are arranged perpendicularly to the carrier rotation axis.

The connection can be effected by way of (plastic) welding, such as ultrasound welding, or bonding. A mechanical anchoring, e.g. a snap connection, is likewise or additionally possible.

One or more melt elements can be arranged on the face end surface and/or on the connection contact surface. These melt elements project beyond the mentioned surfaces. The melt elements are melted on welding and thus provide additional plastic material for creating a weld connection.

The peripheral edge of the base element encompasses a truncated-cone-shaped body which faces the bristle anchoring body. Starting from a the peripheral edge, this comprises a flank which is inclined to the centre as well as a plane surface which is raised with respect to the peripheral edge and is enclosed by the inclined flank. The truncated-cone-shaped body serves for centring the bristle anchoring body on the base element.

The bristle anchoring body lies on the base element via the face end surface of the projecting connection edge, in particular only on the peripheral edge. A cavity can be formed within the peripheral edge between the base element and the bristle anchoring body.

According to a further development of the first variant, the bristle anchoring body and the base element can comprise positioning aids which permit the bristle anchoring body to be positioned on the base element in a defined angular position about the carrier rotation axis.

This can be of significance for example if the bristle field is not or is only partly symmetrically structured with respect to the arrangement of the bristles, the bristle length, the alignment and nature of the bristles and accordingly needs to be assembled in a correctly positioned manner.

The positioning aids can be pairings of recesses and prominences which are matched to one another, wherein one of the elements is arranged on the bristle anchoring body and the other element on the base element.

The positioning aids now engage into one another at the correct angular position on attaching the bristle anchoring body onto the base element. The positioning aids are accordingly arranged on the sides of the bristle anchoring body and the base element, said sides facing one another.

One can thus envisage the face end surface of the bristle anchoring body and the connection contact surface of the base element meeting one another for the purpose of not creating the connection until in the correct angular position of the bristle carrier.

Thus for example the recesses can be arranged on the base element and the prominences on the bristle anchoring body. A reverse arrangement is likewise possible. An alternating arrangement of prominences and recesses is also possible.

The recesses and prominences can be designed equally but oppositely, so that a positive engagement arises.

For example 1 to 5, in particular 1 to 4 such pairings of recesses and prominences can be provided. Preferably, the pairings are provided in accordance with the symmetries in the bristle field.

Tips, webs, half-spheres on the truncated-cone-shaped bodies etc. can be attached to the base element for reducing the play of the bristle field in the bristle anchoring body. These reduce the freedom movement of play of the bristle field in the assembled state and also prevent noises on account of this.

According to a second variant, the bristle anchoring body on the bristle anchoring side likewise comprises a peripheral connection edge which projects in the direction of the base element and accordingly surrounds a recess. The fastened bristle ends are arranged in the recess. The bristle anchoring body forms a type of U-shape in cross section.

In contrast to the first variant, the peripheral, projecting connection edge on the bristle anchoring body comprises a step which starting from a face end surface forms a contact shoulder which is set back inwards along the carrier rotation axis and is with a shoulder surface.

The base element for its part comprises a peripheral edge which forms a connection contact surface for the shoulder surface of the projecting connection edge of the bristle anchoring body. The bristle anchoring body in now connected to the base element via the shoulder surface which lies on the connection contact surface. The connection contact surface and the shoulder surface in particular are arranged perpendicularly to the carrier rotation axis.

The connection can be effected by way of (plastic) welding such as ultrasound welding or bonding.

One or more melt elements can be arranged on the shoulder surface and/or on the connection contact surface. These project from the mentioned surfaces. The melt elements are melted on welding and therefore provide additional plastic material for creating a weld connection.

The bristle anchoring body with a peripheral outer connection edge section which runs out at the end side in the face end surface and at the carrier side in the contact shoulder now engages over the connection contact surface of the base element at the outer side. The bristle anchoring body with its outer connection edge section overlaps the peripheral surface of the base element.

The outer connection edge section serves for the centring of the bristle anchoring body on the base element. For this, the outer connection edge section forms a centring surface which faces the peripheral surface of the base element. The centring surface can run parallel to the carrier rotation axis.

The peripheral surface of the base element which lies opposite the outer connection edge section of the bristle anchoring body can be designed in a conically tapering manner in the direction of the bristle anchoring body.

According to a modification of the second variant, the peripheral surface which is on the base element and which lies opposite the outer connection edge section of the bristle carrier is designed tapering conically in the direction of the bristle anchoring body, wherein the peripheral surface forms a connection contact surface.

The centring surface of the outer connection edge section likewise comprises an inclination which corresponds to the inclination of the peripheral surface. In this manner, an extensive connection is formed between the centring surface and the peripheral surface on attaching the bristle anchoring body to the base element.

The melt elements which have already been described above can be arranged in the peripheral surface and/or in the contact surface.

The step with the contact shoulder can be designed more narrowly according to this modified embodiment.

The aforedescribed second variant and its modification can also comprise positioning aids for securing a defined angular position of the bristle anchoring body. The description concerning the first variant is referred to concerning this subject.

The function unit can additionally serve as a positioning aid given the welding process between the base element and the bristle anchoring body. In particular, the bearing pin receiver can serve as a positioning aid during the welding process between the base element and the bristle anchoring body. Since forces can occur with the welding recess between the base element and the bristle anchoring body, it is useful to secure the function unit on the welding facility by way of supports, in a manner such that no undesirable deformations of the function unit can occur during the welding process.

A further, anchor-free method is the so-called IMT (in mould tufting) method. With regard to this method, for anchoring, conventional bristles are peripherally injected by way of plastic in an injection moulding machine.

For this, the individual bristle bundles are melted with one another at their fastening-side ends.

A bristle anchoring body which is provided with the aforementioned bristle bundles is subsequently inserted into the cavity of an injection moulding mould, in which a plastic component is subsequently injected for anchoring the bristle bundles. This together with the bristle anchoring body forms the carrier body.

In a modification of this method, also only the aforementioned bristle bundles at least with their fastening-side end sections can be inserted into the cavity of an injection moulding mould, in which a plastic component which forms the carrier body is subsequently injected for anchoring the bristle bundles.

This modified method can also be carried out in a two-stage manner, by way of the aforementioned bristle bundles in a first step being peripherally injected with a first plastic component in an injection moulding tool whilst forming a bristle anchoring body. In a second step, the bristle anchoring body is peripherally injected with a second plastic component in the injection moulding tool amid the formation of the complete carrier body. This method is also called IAP (integrated anchorless production).

A further anchor-free bristling method is the so-called AMR method. Concerning this method, the conventional bristles or the bristle bundles are led through into the through-holes of a bristle anchoring body. The bristle bundles which exit out of the bristle anchoring body at the rear side are connected to the bristle anchoring body by way of melting. In a further step, the rear side with the bristle molten mass is over-injected with a soft component in an injection moulding tool.

A further anchor-free bristling method is the so-called PTt method. Concerning this method, the conventional bristles or the bristle bundles are fastened to the carrier body, likewise without the help of an anchor.

Herein, the bristles with their end which lies opposite the free used end are led in bundles through openings of a holding/pressing device. The bristle bundles are subsequently melted in bundles at their end sections which are to be anchored in the carrier body.

In a further step, the carrier body which has already been injection moulded prior to this is heated at least partly to the glass transition temperature parallel to this. The melted bristle bundles are then inserted into blind holes or recesses in the carrier body by way of a holding/pressing device. The bristle bundles are fixed in the blind holes or recesses by the holding/pressing device amid the application of pressure. Concerning this procedure, the blind holes or recesses are reduced in size, which leads to an anchoring of the bristle bundles.

This method however has the problem that by way of heating the carrier body to the glass transition temperature, without any special measures the function unit which is arranged on its rear side and which is with the bearing pin receiver, the second toothing and the lateral stops can become damaged or become deformed.

Indeed, a deformation of the function unit cannot be allowed to occur since the components which are designed with low tolerances concerning the function unit, such as bearing pin, drive rod or housing head can no longer interact in an optimal manner.

As a measure against an undesirable deformation, the function unit can be thermally insulated for example during the bristling. This can be effected via insert parts or intermediate elements. Herewith, the function unit is not heated or to a lesser extent.

Alternatively, as with the AFT method, the carrier body can be divided into a bristle anchoring body and a base element which are connected to one another after attaching the bristle bundles (e.g. as described above). In contrast to the AFT method, the bristle anchoring body in this case has no through-holes or continuous recesses but has blind holes or recesses which are not continuous.

The function unit can serve as a positioning aid with the bristling process. In particular, the bearing pin receiver can serve as a positioning aid during the bristling process. Since forces and thermal deformation can occur with the bristling process, it is useful to secure the function unit on the bristling facility by way of supports, in a manner such that no undesired deformations can occur on the function unit during the bristling process. For this, shape-symmetrical support elements can be moved into the function unit. In particular, it can be necessary to secure the bearing pin receiver by way of the moved-in pin. It can be additionally necessary to secure the second toothing on the bristle carrier by way of a support.

One can also envisage manufacturing the bristle carrier of two different hard components which have different melting temperatures. For example, the carrier body can be manufactured of a first hard component with a lower melting point and the function unit of a second hard component with a higher melting point.

Such a carrier body can be manufactured in a two-component injection moulding method.

A further option can lie in heating the carrier body from the front side to the desired glass transition temperature and subsequently cooling the function unit from the rear side.

Furthermore, support geometries which support the geometry of the function unit can also be incorporated, so that no deformation occurs despite the heating.

The aforedescribed possibilities for preventing the deformation of the function unit during the bristling can of course also be combined with one another. Thus for example a support pin can be inserted into the bearing pin receiver, in order to support this. Furthermore, a support geometry which ensures the shape retention of the first toothing can also be provided for the first toothing.

According to a further method, the bristling of the carrier body can also be effected by way of rotating the bristles into recesses.

The following components, as already described to some extent further above, in particular are manufactured by way of an injection moulding method in an injection moulding tool:

attachment brush housing
drive rod
securing element
bristle carrier, i.e. carrier body with function unit.

In particular, the aforementioned components are manufactured of one part. The aforementioned components can consist of a single plastic component.

The associated injection moulding method can be a hot-runner method or a cold-runner method.

If the components comprise several plastic components, then these can be manufactured by way of a multi-component injection moulding method. A particular variant of this method is the so-called co-injection method as has been described in the published document WO 2013/020 237.

The multi-component injection moulding method amongst other things is characterised in that the plastic components connect to one another via a material fit and/or via a positive fit.

The creation of a positive-fit connection between two plastic components in particular can be assisted by a shrinkage behaviour of the lastly injected plastic component on cooling.

The hard components which are mentioned in the framework of this description can be:

styrene polymerisates such a styrene acrylonitrile (SAN), polystyrene (PS), acrylonitrile butadiene styrene (ABS), styrene methyl methacrylate (SMMA) or styrene butadiene (SB);

polyolefins such as polypropylene (PP) or polyethylene (PE) for example also in the forms of high density polyethylene (HDPE) or low density polyethylene (LDPE) [polyethylene can be applied as a hard component or soft component depending on the processing];

polyesters such as polyethylene terephthalate (PET) in the form of acid-modified polyethylene terephthalate (PETA) or glycol-modified polyethylene terephthalate (PETG), polybutylene terephthalate (PBT), acid-modified polycyclohexylene dimethylene terephthalate (PCT-A) or glycol-modified polycyclohexylene dimethylene terephthalate (PCT-G);

cellulose derivatives such as cellulose acetate (CA), cellulose acetobutyrate (CAB), cellulose propionate (CP), cellulose acetate phthalate (CAP) or cellulose butyrate (CB);

polyamides (PA) such a PA 6.6, PA 6.10 or PA 6.12;
polymethyl methacrylate (PMMA);
polycarbonate (PC);
polyoxymethylene (POM);
polyvinyl chloride (PVC);
polyurethane (PUR) [polyethylene can be applied as a hard component or soft component depending on the processing and modification];
polyamide (PA).

In particular, polypropylene (PP) is used as a hard component.

The modulus of elasticity of the hard component is 1000-2400 N/mm$^2$, preferably of 1300 to 1800 N/mm$^2$.

Hard components are particularly applied in carrier structures. These can be e.g. the grip body housing of the hand part, the attachment brush part or the carrier body.

If several hard components are applied in a multi-component injection moulding method or different hard components are connected to one another by ultrasound welding, then these amongst one another in particular form a material fit.

It is also conceivable for several hard components which do not assume a material fit amongst one another to be applied in a multi-component injection moulding method. A positive fit is provided concerning such component pairings. The positive fit can include undercuts, openings and/or partial or complete peripheral injections. The positive fit can be assisted by way of a shrinkage behaviour of the lastly injected hard component on cooling.

Examples of possible pairings of hard components which assume no material fit are polypropylene-polyester, or polypropylene-styrene acrylonitrile.

The soft components which are mentioned in the framework of this description can be:

thermoplastic styrene elastomers (TPE-S), such as for example a styrene ethylene butylene styrene copolmer (SEBS) or styrene butadiene styrene copolymer (SBS):

thermoplastic polyurethane elastomers (TPE-U);
thermoplastic polyamide elastomers (TPE-A);
thermoplastic polyolefin elastomers (TPE-O)
thermoplastic polyester elastomers (TPE-E).
silicones;
polyethylene (PE) [polyethylene can be applied as a hard component or soft component depending on the processing and modification];
polyurethane (PUR) [polyurethane can be applied as a hard component or soft component depending on the processing and modification].

In particular, thermoplastic elastomers (TPEs) and very particularly thermoplastic styrene elastomers (TPE-S) are applied as a soft component.

In particular, the soft component has a Shore A hardness of smaller than 90, preferably smaller than 50, particularly preferably smaller than 30.

The soft component preferably forms a material fit with the component(s) which is/are injected over it.

The injected bristles which are mentioned within the framework of this description can be of the following components:

thermoplastic polyurethane elastomers (TPE-U);
thermoplastic polyester elastomers (TPE-E)
thermoplastic polyamide elastomers (TPE-A).

The injected bristles consist of a bristle material, i.e. of an elastomer and in particular of a thermoplastic polyurethane elastomer TPE-U. These can be modified for the purpose of achieving improved flow characteristics or a quicker solidification, i.e. a quicker crystallisation. The more rapid solidification is achieved in particular by way of a modification, thanks to which the molecule chains already connect at comparatively high temperatures.

The components (bristle components) for injected bristles have a Shore D hardness of 0 to 100, in particular 30-80. Special shapes of soft components are applied for injected bristles and these as a rule have higher Shore hardnesses than the soft components of soft-elastic cleaning or massage elements or hand-grip zones such as thumb rest or tongue cleaner.

Within the framework of a multi-component injection moulding method, the components for injected bristles or the bristle components as a rule do not assume a material fit with the other applied soft and/or hard components. A positive fit is therefore envisaged for any connections to other hard or soft components. The positive-fit can comprise elements such as undercuts, openings and/or partial or complete peripheral injections. The positive-fit connection can be assisted by way of the shrinkage behaviour of the lastly injected component for injected bristles during the cooling.

Bio-plastics can be used as plastic components (hard or soft components) and these are manufactured of renewable raw materials. Such raw materials can be maize, hemp, sugar, rizinus oil, palm oil, potatoes, wheat, sugar cane, rubber, wood, castor plant/miracle tree.

The base materials which are important for manufacturing bioplastics, such as cellulose, starch, lactic acid (PLA), glucose, chitin or chitosan can be obtained from these raw materials.

Furthermore, water-soluble polymers can also be applied as plastic components (hard or soft component).

Additives can be admixed to the plastic components (hard or soft component), as has already been mentioned at various locations and these additives in combination with the plastic component ensure particular characteristics of the component which is manufactured therefrom. Such characteristics can be: reinforcement of the component, increasing the wear-resistance or improving the sliding characteristics or reducing the friction coefficients.

The additives can be glass fibres (reinforcing the component), glass balls (reinforcing the component), chalk (improving the sliding characteristics) or PTFE (improving the sliding characteristics).

Herein, the plastic component forms the plastic matrix which receives the additives.

The assembly of the attachment brush part in particular is effected on an assembly mandrel. This can comprise an assembly aid in the form of a coupling nub of the hand part, for which aid the attachment brush is manufactured.

In a first step, the securing element is assembled with its hand-part-side sleeve section onto the assembly mandrel.

In a second step, the drive rod is assembled onto the assembly mandrel. The assembly mandrel is designed such that the drive rod is positioned on the assembly mandrel in the correct angular position about the control rotation axis relative to the securing element and accordingly also relative to the subsequently assembled attachment brush housing.

In a third step, the attachment brush housing is assembled on the assembly mandrel via the drive rod and the securing element. With this step, the securing element latches with its latching tongues in the attachment brush housing and is hence fixed therein. Furthermore, the drive rod is also fixed in the attachment brush housing via the securing element and the bearing pin which is moved into the pin receiver.

In the fourth step, the already bristled brush head is assembled in the bristle carrier receiver of the housing head. With this procedure, the brush head is inserted with its function unit into the bristle carrier receiver in a positionally correct manner, wherein the toothings of the brush head and of the drive rod mesh into one another.

The bearing pin is subsequently introduced from the rear side of the housing head and is pressed with its anchoring section into the bearing pin receiver on the brush head. The brush head is now connected to the bearing pin in a rotationally fixed manner and is pivotably mounted in the housing head via the bearing pin.

Thanks to the present invention, attachment brush parts can be manufactured for different models of care brushes from comparatively few injection moulded parts or further components. Less manufacturing/assembly steps occur due to this, and less injection moulding tools are required, which has a positive effect on the manufacturing costs. In particular 5, 6 or 7 components are required for this attachment brush.

Furthermore, less assembly steps also occur due to the reduction in parts, and this renders the assembly more efficient.

Thus for example only a single bearing pin is necessary for fastening the brush head, and this connects the brush head to the housing head without further fastening means.

The bearing pin in this context fulfils several tasks:
rotational mounting of the brush head;
rotationally secured anchoring of the brush head on the bearing pin; as well as
adjusting the play between the brush head and the attachment brush housing.

Electrical toothbrushes, as are present for example here, are often provided with electronic functions which permit an improved oral hygiene or a better application of the toothbrush for the user. Moreover, such functions also avoid an incorrect handling of the toothbrush which can lead to damage to the gums and teeth.

One example of such a function is the pressing pressure control, a function which signalises to the user when he is exerting too much pressure onto the teeth with the toothbrush during use. For this, e.g. an (upper) limit value for the pressing pressure is set, the exceeding of which is displayed by the toothbrush.

The subsequently described function of a pressing pressure control is realised together with a control unit and can be implemented in the same manner for oscillating as well as for sonic toothbrushes (as initially explained and defined).

It is expressly pointed out that the described electrical function can be realised in the context of the movement course of the drive and attachment brush and these systems must be matched to one another. Herein, the detailed mechanical design of the drive and the attachment brush although tending to playing a minor role, the described movement transformation from the drive up to the brush head must be essentially kept to.

Herein, the control unit in particular is accommodated in the toothbrush. The control unit however can also be accommodated on a mobile device which receives corresponding measured values, e.g. the electricity consumption, from the toothbrush.

The measurement of the effective pressing pressure by way of the control unit entails the most varied of factors of the actual electrical toothbrush or of the hand part and of the attachment brush having to be taken into account. For example, the different components for the operation, such as e.g. motor, gear and of course also the attachment brush part, are provided with tolerances, and there are different friction values between the components. Furthermore, the attachment brush parts are exposed for example to toothpaste and saliva during use, and the attachment brush parts also have a certain wear on use.

This finally means that no rigid, non-dynamic function can be realised. Each device at every point in time and in each attachment brush combination is individual with regard to its characteristics, such as pressing pressure.

The present function according to the invention is based on the fact that different pressing pressures cause a different electricity consumption. Herein, the electricity consumption relates to the electricity consumption of the motor for driving the brush head movement.

Specifically, the electricity consumption correlates to the mechanical torque and this correlates to the pressing pressure. The relationship between pressing pressure and electricity consumption is given in this manner. The relation between pressing pressure and electricity consumption can be represented by a characteristic line. The relation between the pressing pressure and the electricity consumption in particular is essentially linear.

The characteristic line of the pressing pressure with respect to the electricity consumption of the toothbrush is defined on manufacturing the toothbrush. The characteristic line represents a straight line with a starting point and a gradient, wherein the starting point corresponds to the freewheel operation, in which no pressing pressure prevails.

The variable which is required later for determining the pressing pressure is merely the gradient of the characteristic line, since the starting point, i.e. the electricity consumption given freewheel operation, is constantly determined afresh on using the toothbrush. This is due to the aforementioned temporally changing factors, such as wear, friction values, etc., which have an influence on the characteristics of the toothbrush or its components and therefore on the relation between the pressing pressure and the electricity consumption.

Two points of the straight line are measured for determining the gradient. This on the one hand is the electricity consumption in freewheel of the hand device with the attachment brush part and on the other a hand the electricity consumption of the hand device with the attachment brush part in the loaded state (pressing pressure is exerted upon the bristle field). The loaded state in this case corresponds to the (upper) limit value for triggering the pressing pressure signal (i.e. the maximally allowable pressing pressure).

These measurements are carried out in a measuring device or calibration device, to which the hand device is connected or inserted. Herein, the measuring device preferably simulates the attachment brush and accordingly the pressing pressure. On account of this, one can prevent the used attachment brush wearing down and an incorrect base value (gradient of the characteristic line) from resulting.

The measured variable, i.e. the gradient of the straight line, is stored or kept in the toothbrush or the control unit and is a device-specific variable. This means that each toothbrush is calibrated individually.

The setting of the gradient of the characteristic line, i.e. the calibration, is therefore effected before the sale of the toothbrush. It can be considered as part of the manufacturing process.

On application of the toothbrush by the user, the starting point of the straight line in the electricity consumption— pressing pressure diagram (characteristic line) is now determined in a continuous manner, i.e. in particular with each (new) start of the toothbrush. This corresponds in each case to the lowest measured electricity consumption in (freewheel) operation. This is continuously read out since the lowest electricity consumption (freewheel operation) also changes in operation. This being due to the fact that the friction values also continuously change.

In particular, the starting point is determined with each starting of the electrical toothbrush. On starting the toothbrush, this value specifically represents an unloaded value since the toothbrush is not started in a loaded manner in the normal case, thus is in freewheel operation (starting point).

By way of determining the starting point of the straight line, the point, i.e. the electricity consumption for activating the pressing pressure signalisation is simultaneously defined. This is effected by way of using the characteristic line with the predefined gradient and reading out the electricity consumption at the intersection point with the (upper) limit value for the pressing pressure.

If it is now determined, at which electricity consumption the mentioned limit value for the pressing pressure is reached, then the pressing pressure can be monitored with regard to the reaching of the (upper) limit value by way of continuous measurement of the electricity consumption during the use of the toothbrush.

This means that the straight line with the gradient which is previously determined in the measuring device is set by the (electricity consumption) measurement value or reading which is determined at the device given unloaded starting operation. The electricity consumption which is necessary for activating the pressing pressure signalisation can be derived from this and be compared to the actual electricity consumption.

On operation, the electricity consumption is then continuously measured. If now the point for triggering the pressing pressure signalisation (exceeding a limit value of the pressing pressure) is exceeded, then a signal is outputted.

In this manner, the pressing pressure can be reliably detected in the most different of operating and product states and the reaching or exceeding can be signalised to the user.

The pressing pressure signalisation can be effected via the device, i.e. toothbrush. The pressing pressure signalisation can also be effected via a mobile device, e.g. with a display, which is connected to the toothbrush in particular in a wireless manner.

Examples for the pressing pressure signalisation in the visual field are the lighting of a lamp, displaying on a display, and in the acoustic field are sounds or in the mechanical field a change of the operating frequency of the electrical toothbrush (vibration).

The limit value of the pressing pressure lies between 150 g and 600 g, preferably between 200 g and 400 g.

The method which is described above with regard to the pressing pressure control or pressing pressure signalisation is furthermore basically applicable to body care brushes.

The attachment brush part according to the invention is used for electrical body care brushes, such as facial brushes, and very particularly for electrical toothbrushes. However, the attachment brush part according to the invention can also be applied for electrical household brushes.

Figures 2A, 2B, 2C, 2D, 2E, 2F, 2G:
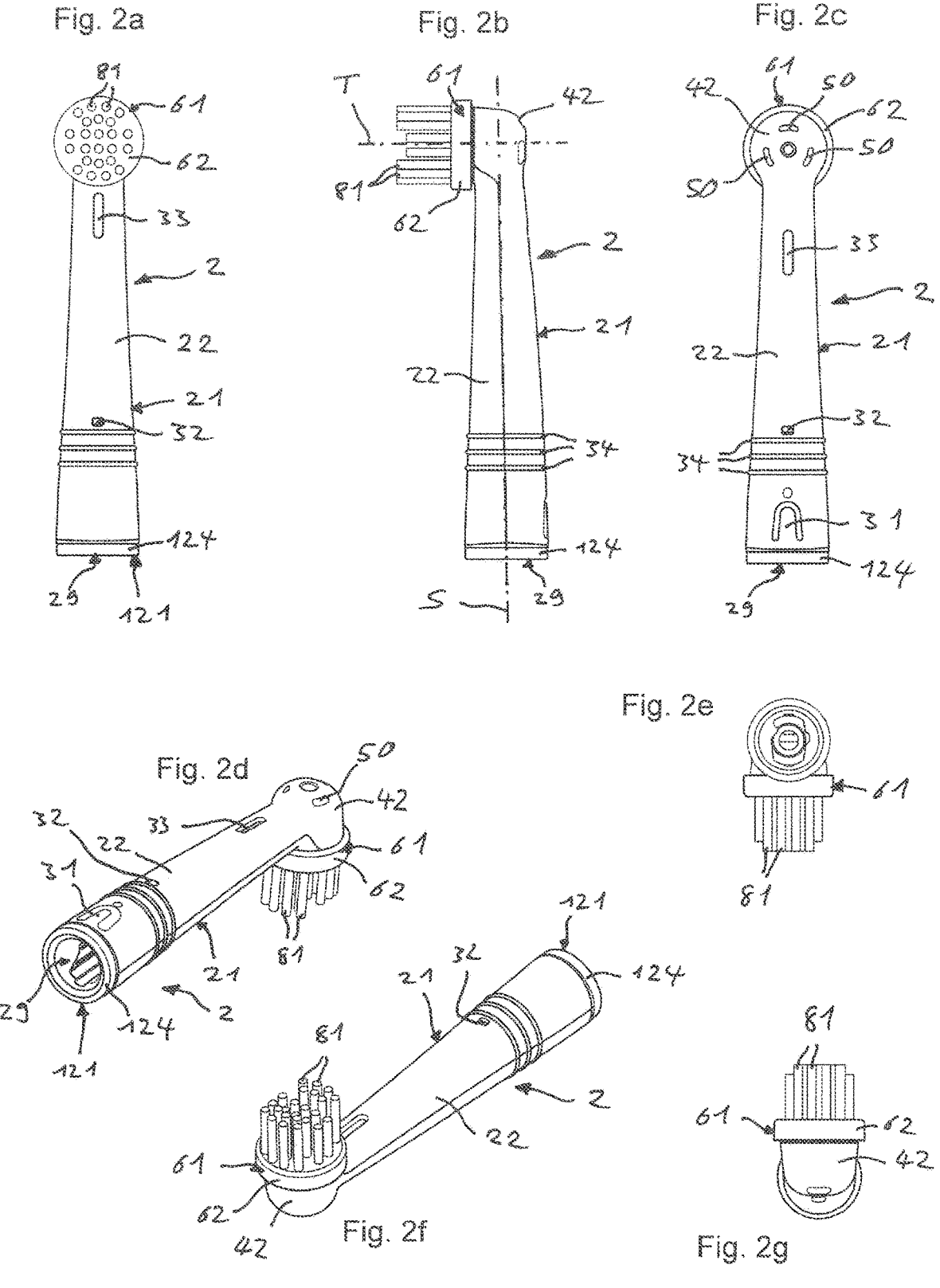
Figure 3F:
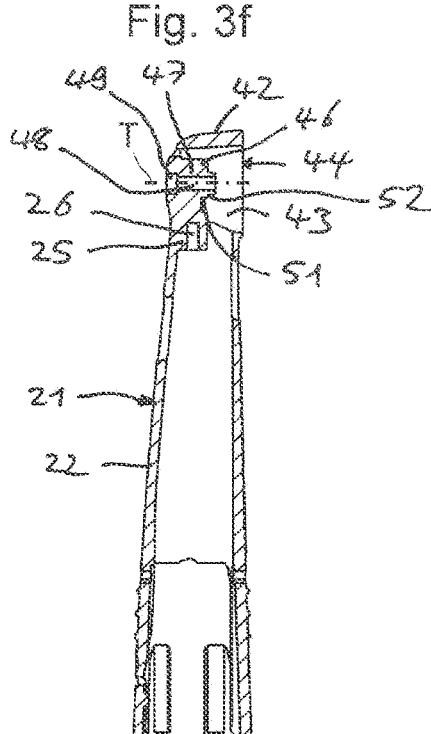
Figure 3G:
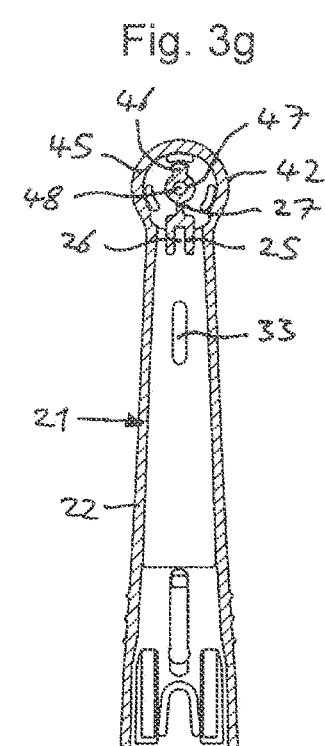
Figure 4A:
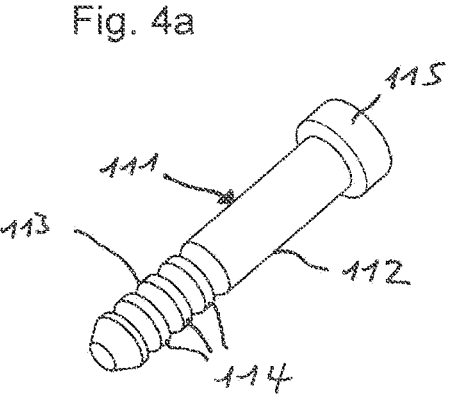
Figure 4B:
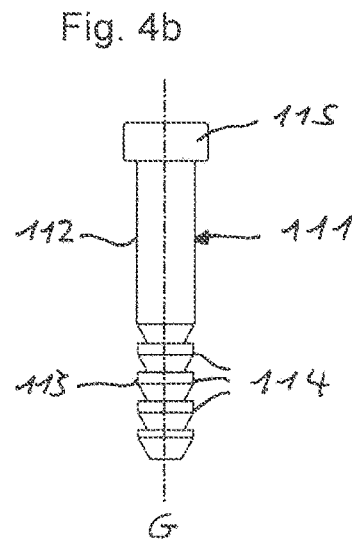
Figures 5A, 5B, 5C, 5D, 5E, 5F, 5G:
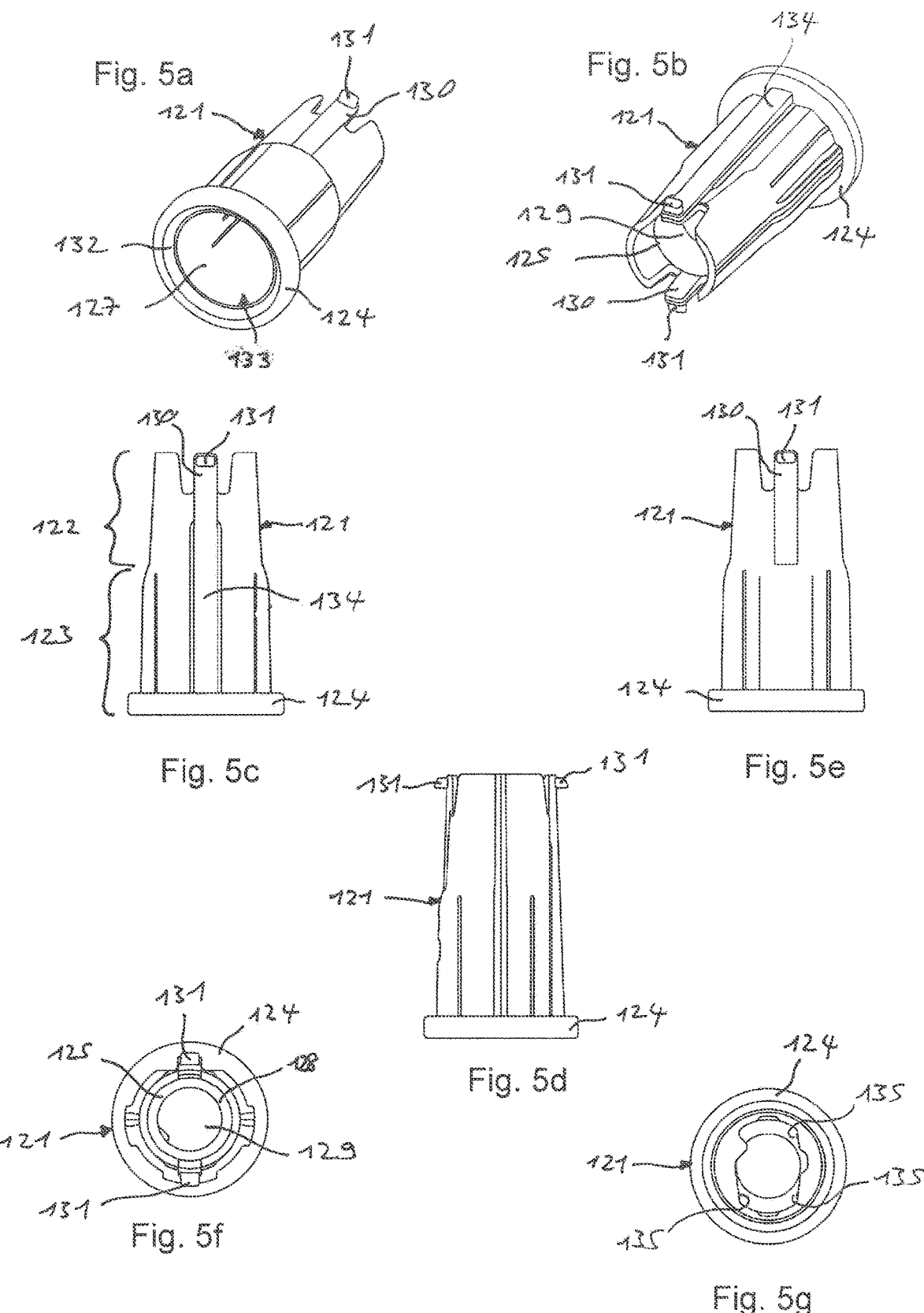
Figure 9:
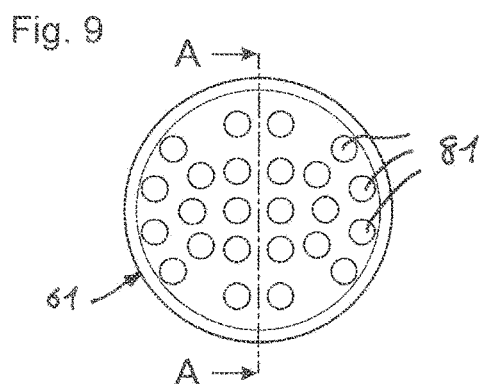
Figure 10A:
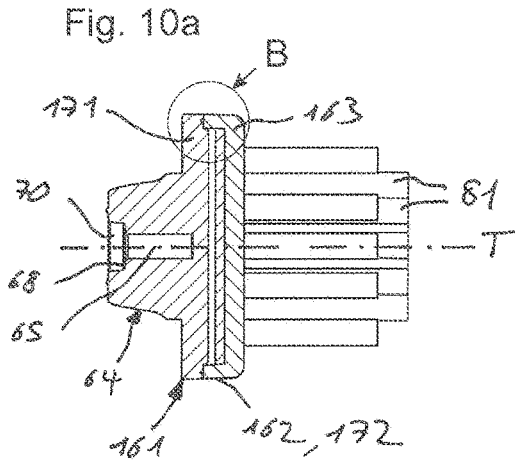
Figure 10B:
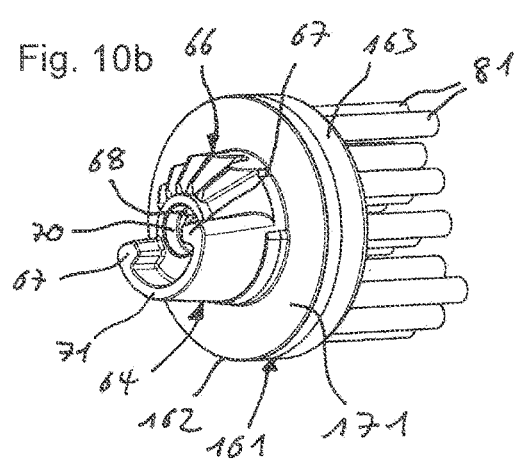
Figure 10C:
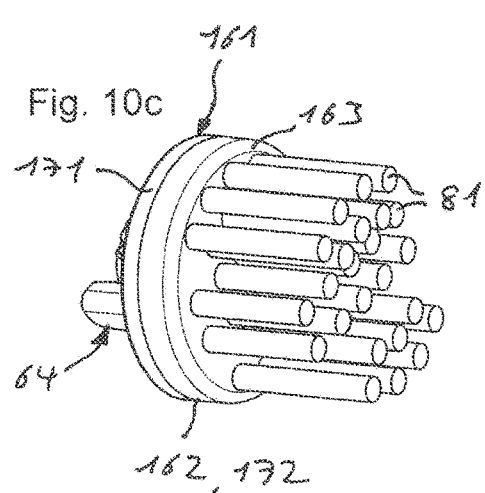
Figure 10D:
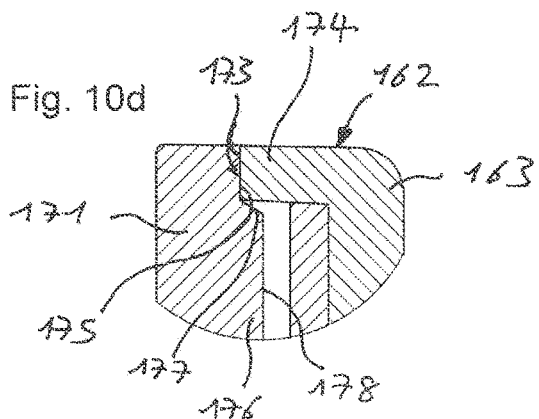

The subject-matter of the invention is hereinafter explained in more detail by way of embodiment examples which are represented in the accompanying drawings. There are shown in:

FIG. 1a: a view of an electrical toothbrush according to the invention from the side;

FIG. 1b: a view of the electrical toothbrush according to FIG. 1a from the rear side;

FIG. 1c: a perspective view of the electrical toothbrush according to FIG. 1a from the front side;

FIG. 2a: a view of an attachment brush part for an electrical toothbrush according to FIG. 1a-1c from the front side;

FIG. 2b: a view of the attachment brush part according to FIG. 2a from the side;

FIG. 2c: a view of the attachment brush part according to FIG. 2a from the rear side FIG. 2d: a perspective view of the attachment brush part according to FIG. 2a from the rear side;

FIG. 2e: a view of the attachment brush part according to FIG. 2a from below;

FIG. 2f: a perspective view of the attachment brush part according to FIG. 2a from the front side;

FIG. 2g: a view of the attachment brush part according to FIG. 2a from above;

FIG. 3a: a perspective view of an attachment brush housing for an attachment brush part according to FIGS. 2a-2g from the front side;

FIG. 3b: a perspective view of the attachment brush housing according to FIG. 3a from the rear side;

FIG. 3c: a perspective view of the attachment brush housing according to FIG. 3a from the front side;

FIG. 3d: a view of the attachment brush housing according to FIG. 3a from the side;

FIG. 3e: a view of the attachment brush housing according to FIG. 3a from the rear side;

FIG. 3f: a cross-sectional view of the attachment brush housing according to FIG. 3a along the plane A-A in FIG. 3c;

FIG. 3g: a cross-sectional view of the attachment brush housing according to FIG. 3a along the plane B-B in FIG. 3d;

FIG. 4a: a perspective view of a bearing pin for an attachment brush part according to FIG. 2a-2g;

FIG. 4b: a view of the bearing pin according to FIG. 4a from the side;

FIG. 5a: a perspective view of a securing element for an attachment brush part according to FIG. 2a-2g obliquely from below;

FIG. 5b: a further perspective view of the securing element according to FIG. 5a obliquely from above;

FIG. 5c: a view of the securing element according to FIG. 5a from the front;

FIG. 5d: a view of the securing element according to FIG. 5a from the side;

FIG. 5e: a view of the securing element according to FIG. 5a from the rear;

FIG. 5f: a front view of the securing element according to FIG. 5a from above;

FIG. 5g: a further front view of the securing element according to FIG. 5a from below;

FIG. 6a: a perspective view of a drive rod for an attachment brush part according to FIG. 2a-2g obliquely from below;

FIG. 6b: a perspective view of the drive rod according to FIG. 6a obliquely from above;

FIG. 6c: a front view of the drive rod according to FIG. 6a from above;

FIG. 6d: a further front view of the drive rod according to FIG. 6a from below;

FIG. 6e: a view of the drive rod according to FIG. 6a from the front;

FIG. 6f: a further view of the drive rod according to FIG. 6a from the side;

FIG. 6g: a further view of the drive from according to FIG. 6a from the rear;

FIG. 7a: a perspective view of a brush head for an attachment brush part according to FIG. 2a-2g obliquely from the rear;

FIG. 7b: a further perspective view of the brush head according to FIG. 7a obliquely from the front;

FIG. 7c: a view of the brush head according to FIG. 7a from the side;

FIG. 7d: a view of the brush head according to FIG. 7a from the front;

FIG. 7e: a further view of the brush head according to FIG. 7a from the rear;

FIG. 8a: a view of the attachment brush part according to FIG. 2a-2g which is stuck onto the hand part, from the front;

FIG. 8b: a view of the attachment brush part according to FIG. 8a from the side;

FIG. 8c: a perspective view of the attachment brush part according to FIG. 8a obliquely from the rear without an attachment brush housing;

FIG. 8d: a cross-sectional view of the attachment brush part according to FIG. 8a along the plane A-A;

FIG. 8e: a cross section of the attachment brush part according to FIG. 8b along the plane B-B;

FIG. 8f: a cross-sectional view of the attachment brush part according to FIG. 8b along the plane E-E;

FIG. 9: a view of the brush head according to the invention from the front;

FIG. 10a: a cross-sectional view of a first embodiment variant of a brush head along the plane A-A according to FIG. 9;

FIG. 10b a perspective view of the brush head according to FIG. 10 obliquely from the rear;

FIG. 10c: a perspective view of the brush head according to FIG. 10a obliquely from the front;

FIG. 10d: a detail view B according to FIG. 10a;

FIG. 11a: an exploded view of a second embodiment variant of a brush head obliquely from the rear;

FIG. 11b: the exploded view of the brush head according to FIG. 11a obliquely from the front;

FIG. 11c: a cross-sectional view of the brush head according to FIG. 11a along the plane A-A according to FIG. 9;

FIG. 11d: a detail view B according to FIG. 11c;

FIG. 12a: an exploded view of a third embodiment variant of a brush head obliquely from the rear;

FIG. 12b: the exploded view of the brush head according to FIG. 12a obliquely from the front;

FIG. 12c: a cross-sectional view of the brush head according to FIG. 12a along the plane A-A according to FIG. 9;

FIG. 12d: a detail view B according to FIG. 12c;

FIG. 13a: an exploded view of a fourth embodiment variant of a brush head obliquely from the rear;

FIG. 13*b*: the exploded view of the brush head according to FIG. 13*a* obliquely from the front;

FIG. 13*c*: a cross-sectional view of the brush head according to FIG. 13*a* along the plane A-A according to FIG. 9;

FIG. 13*d*: a detailed view B according to FIG. 13*c;*

FIG. 14*a*: a view of a further embodiment of a brush head according to the invention, from the front;

FIG. 14*b*: a cross-sectional view of the brush head along the plane A-A according to FIG. 14*a;*

Figure 15A:
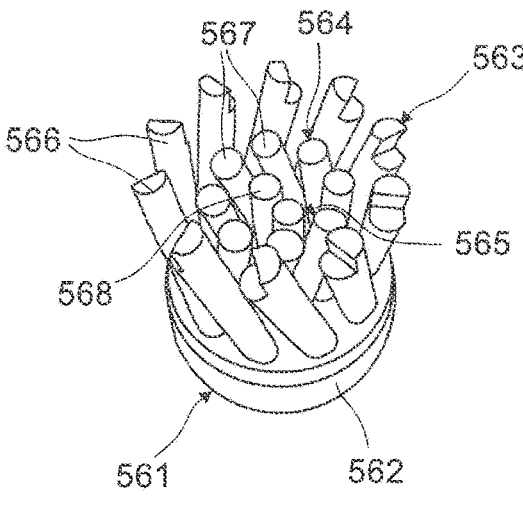
Figure 15B:
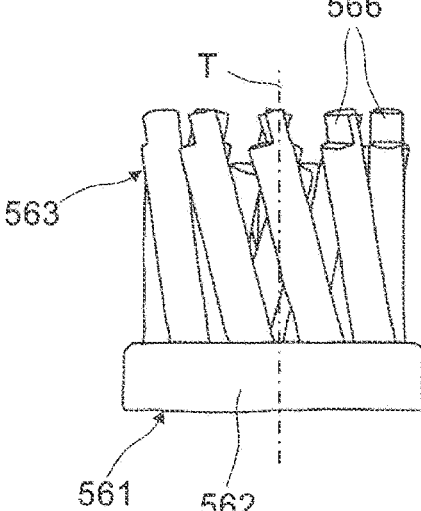
Figure 15C:
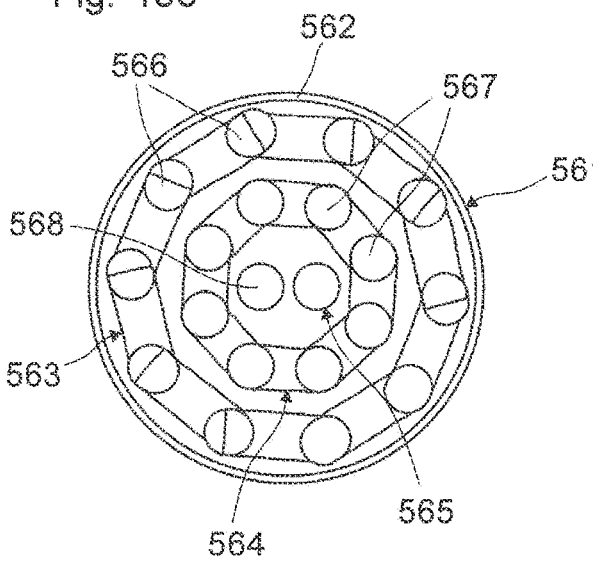

FIG. 14*c*: a perspective view of the brush head according to FIG. 14*a* obliquely from the rear;

FIG. 14*d*: a perspective view of the brush head according to FIG. 14*a* obliquely from the front;

FIG. 15*a*: a perspective view of a further embodiment of a brush head according to the invention obliquely from the front;

FIG. 15*b*: a view of the brush head according to FIG. 15*a* from the side;

FIG. 15*c*: a view of the brush head according to FIG. 15*a* from the front;

FIG. 16*a*: a perspective view of an attachment brush housing for an attachment brush part according to FIG. 2*a*-2*g* from the front side;

FIG. 16*b*: a perspective view of an attachment brush housing according to FIG. 16*a* from the rear side;

FIG. 16*c*: a view of an attachment brush housing according to FIG. 16*a* from the front side;

FIG. 16*d*: a view of the attachment brush housing according to FIG. 16*a* from the side;

FIG. 16*e*: a view of the attachment brush part according to FIG. 16*a* from the rear side;

FIG. 16*f*: a cross-sectional view of the attachment brush housing according to FIG. 16*a* along the plane A-A in FIG. 16*c;*

FIG. 16*g*: a cross-sectional view of the attachment brush housing according to FIG. 16*a* along the plane B-B in FIG. 16*d;*

Figures 17A, 17B, 17C, 17D, 17E, 17F, 17G:
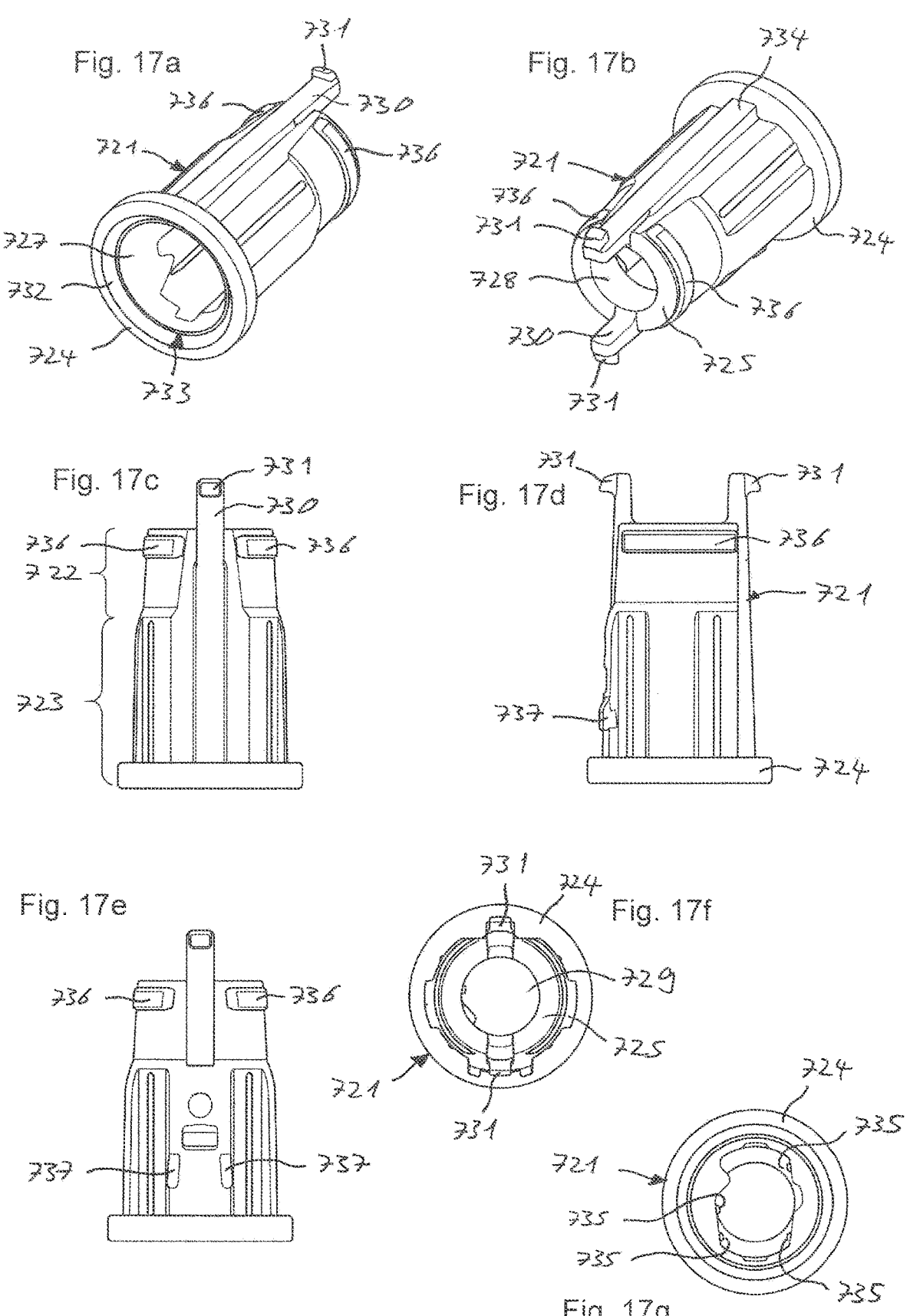
Figures 18A, 18B, 18C, 18D, 18E, 18F, 18G:
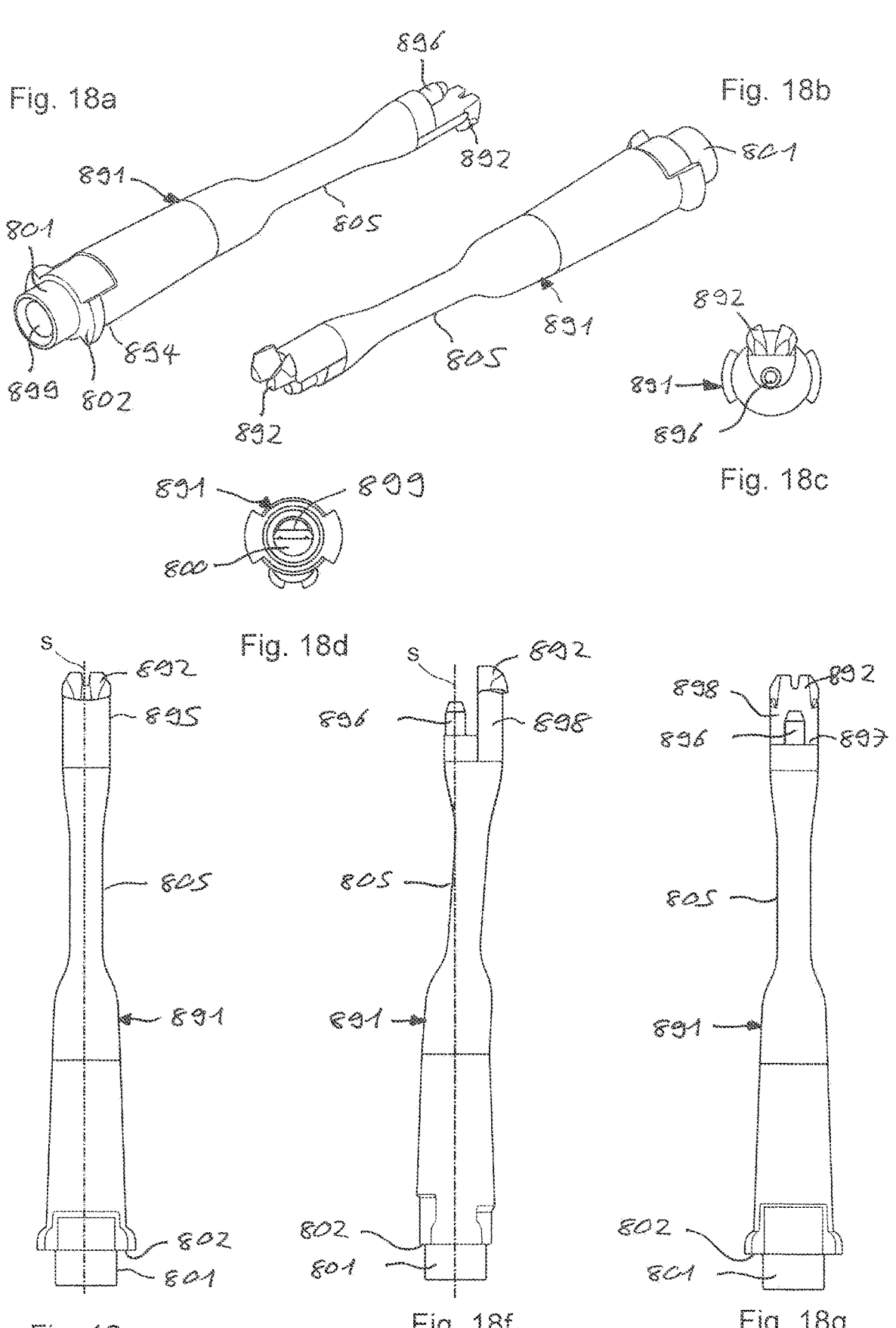
Figure 22A:
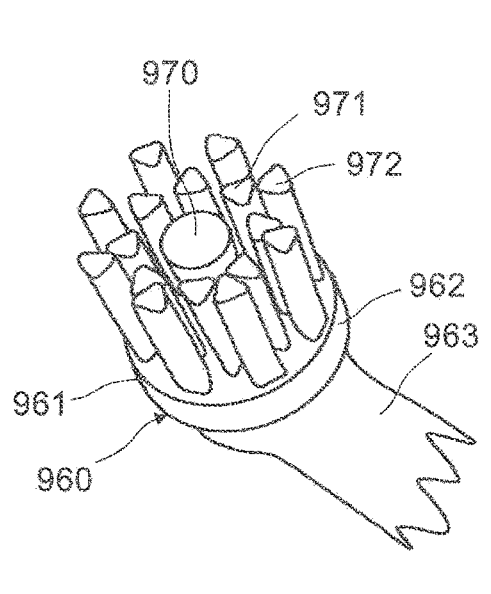
Figure 22B:
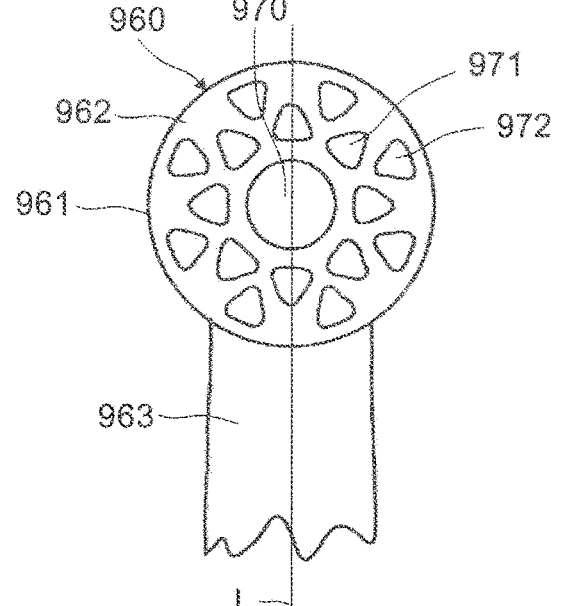
Figure 23A:
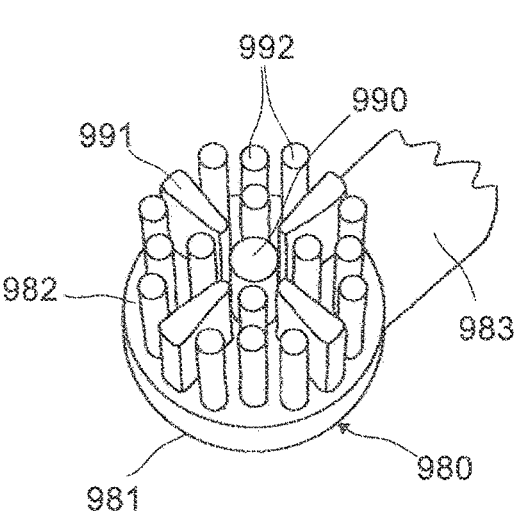
Figure 23B:
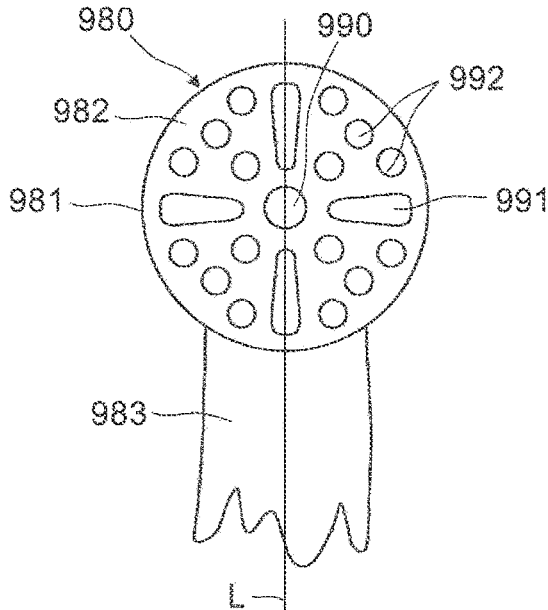

FIG. 17*a*: a perspective view of a securing element for an attachment brush part according to FIG. 2*a*-2*g* obliquely from below;

FIG. 17*b*: a further perspective view of a securing element according to FIG. 17*a* obliquely from above;

FIG. 17*c*: a view of a securing element according to FIG. 17*a* from the front;

FIG. 17*d*: a view of the securing element according to FIG. 17*a* from the side;

FIG. 17*e*: a view of the securing element according to FIG. 17*a* from the rear;

FIG. 17*f*: a front view of the securing element according to FIG. 17*a* from above;

FIG. 17*g*: a further front view of the securing element according to FIG. 17*a* from below;

FIG. 18*a*: a perspective view of a drive rod for an attachment brush part according to FIG. 2*a*-2*g* obliquely from below;

FIG. 18*b*: a perspective view of the drive rod according to FIG. 18*a* obliquely from above;

FIG. 18*c*: a front view of the drive rod according to FIG. 18*a* from above;

FIG. 18*d*: a further front view of the drive rod according to FIG. 18*a* from below;

FIG. 18*e*: a view of the drive rod according to FIG. 18*a* from the front;

FIG. 18*f*: a further view of the drive rod according to FIG. 18 from the side;

FIG. 18*g*: a further view of the drive rod according to FIG. 18*a* from the rear;

FIG. 19: a view of a further embodiment of a brush head from the front;

FIG. 20: a view of a further embodiment of a brush head from the front:

FIG. 21*a*: a perspective view of a further embodiment of a brush head obliquely from the front;

FIG. 21*b*: a view of the brush head according to FIG. 21*a* from the front;

FIG. 22*a*: a perspective view of a further embodiment of a brush head obliquely from the front;

FIG. 22*b*: a view of the brush head according to FIG. 22*a* from the front;

FIG. 23*a*: a perspective view of a further embodiment of a brush head obliquely from the front;

FIG. 23*b*: a view of the brush head according to FIG. 23*a* from the front;

FIG. 24*a*: a perspective view of a further embodiment of a brush head obliquely from the front;

FIG. 24*b*: a view of the brush head according to FIG. 24*a* from the front;

FIG. 24*c*: a further view of the brush head according to FIG. 24*a* from the front, with certain coloured bristle bundles;

FIG. 25: a view of a further embodiment of a brush head from the front.

The present invention is not restricted to the embodiments which are represented in the Figures. The embodiments which are shown in the figures are merely exemplary.

Within the framework of the invention, the individual features and the associated functions of individual embodiments can be combined with other embodiments inasmuch as this is technically meaningful, without departing from the framework of this invention. The descriptions concerning specific figures can of course also be conferred upon other figures which display the same or similar manifestations and in which the manifestations are not described in the same detail.

Basically, in the figures, the same parts are provided with the same reference numerals.

FIGS. 1*a* to 1*c* show an electrical toothbrush 1 according to the invention. This is composed of a hand part 10 as well as of an attachment brush part 2 which can be stuck onto the hand part 10 in a manner such that it can be released from this again. The attachment brush part 2 amongst other things comprises an oscillatorily rotatably mounted brush head 61.

The hand part 10 amongst other things comprises a grip body 11 with a grip body housing 15. In the FIGS. 8*d* and 8*e*, the coupling nub 12 as well as the control pin 13 which exits from the coupling nub 12, and the grip body housing 15 can be deduced from the cross-sectional view.

The electrical toothbrush 1 has a longitudinal axis L.

The FIGS. 2*a* to 2*g* show an attachment brush part 2 with an oscillatorily rotatable brush head 61, as can be applied in an electrical toothbrush 1 according to FIG. 1*a*-1*c* or FIG. 8*a*-8*f.*

The attachment brush part 2 further comprises an attachment brush housing 21 with a housing head 42 and a housing neck 22. The housing neck 22 is designed in a conical manner and tapers to the brush head 61.

Slot-like through-openings 33, 50 are provided in the housing wall, in the housing neck 22 as well as in the housing head 42. These serve for the passage of water on cleaning the attachment brush part 2.

A slot-like through-opening 33 is provided in the housing neck 22 towards the housing head 42, on the front side and the rear side of the attachment brush part 2.

Furthermore, three slot-like through-openings 50 are arranged on the rear side of the housing head 42. The three through-openings 50 are designed in an arched manner and are arranged concentrically about the carrier rotation axis T.

Three annular withdrawal ribs 34 are arranged on the outer side of the housing neck 22. The withdrawal ribs 34 which are arranged concentrically to the control rotation axis S form a grip aid and give the user they required retention for withdrawing the attachment brush part 2 from the hand part 10.

Furthermore, a spring-elastic latching tongue 31 with a latching lug is arranged on the rear side in the housing wall of the housing neck 22 towards a hand-part-side receiver opening 29. The latching tongue 31 is exposed via a U-shaped slot in the housing wall. The latching tongue 31 serves for the axial securing of a securing element 121 which is inserted into the housing neck 22 via the hand-part-side receiver opening 29.

The brush head 61 forms a three-part bristle field with a plurality of bristle bundles 81, 82 which each comprise care bristles 81, said bristle field being arranged on a bristle carrier 62. A part of the bristle field with bristle bundles 81 which is at the top and a part which is at the bottom in the neutral position of the brush head 61 is designed in the form of a circle segment or arc section (as represented). A middle part of the bristle field with bristle bundles 82 consists of two parallel rows of bristle bundles 82. The bristle bundles 81 of the upper and the lower parts of the bristle field project beyond the bristles bundles 82 of the middle part.

A securing element 121 is inserted into the hand-part-side receiver opening 29 of the housing neck 22 and is fixed in the housing neck. The securing element 121 at its hand-part-side end comprises an annular insert limitation flange 124. The outer periphery of the insert limitation flange 124 in the assembled state is flush with the connecting outer periphery of the housing neck 22, into which the securing element 121 is inserted.

The insert limitation flange 124 amongst other things has the function of an insert limitation which is to prevent the securing element 121 being pushed too far into the housing neck 22. The insert limitation is effected by way of the insert imitation flange 124 of the securing element 121 abutting/bearing on the face end surface 28 which surrounds the hand-part-side receiver opening 29.

The securing element 121 which is inserted into the housing neck 22 serves for the radial securing or alignment of the hand-part-side end section of the drive rod 91. Furthermore, the securing element 121 serves for the axial securing or fixation and positioning of the drive rod 91 in the housing neck 22, so that this cannot fall out of the housing neck 22.

Moreover, the securing element 121 forms a hand-part-side sleeve section 123 with a nub receiver 127 which has the function of a coupling section for receiving the coupling nub 12 of the hand part 10.

The securing element is described in yet more detail in the context of FIGS. 5a-5g.

FIGS. 3a to 3g show an attachment brush housing 21 with a housing neck 22 and with a housing head 42 which connects to the housing neck at the brush head side.

The housing neck 22 is a tubular body with a continuous receiver which at the hand part side ends in the receiver opening 29 and at the brush head side runs out in the bristle carrier receiver 43 of the housing head 42.

The housing neck 22 serves for receiving the drive rod 91 as well as the securing element 121 (see also FIGS. 8d and 8e).

The housing neck 22 comprises a hand-part-side first receiving section 23 which connects onto the hand-part-side receiver opening 29 in the direction of the brush head 61, for receiving the securing element 121. Furthermore, a brush-head-side second receiving section 24 for receiving the drive rod 91 connects onto the first receiving section 23 in the direction of the brush head 61 (see also FIGS. 8d and 8e).

A pin receiver body 25 with a pin receiver 26 for receiving the bearing pin 96 of a drive rod 91 which is yet described further below is arranged on the brush-head-side end of the second receiving section 24. The pin receiver body 25 is arranged on the rear-side housing wall and projects from this into the second receiving section 24. Furthermore, the pin receiver body 25 with a longitudinal section projects into the bristle carrier receiver 43 of the housing head 42.

The pin receiver 26 is designed as a blind hole and comprises a longitudinal axis which lies in the control rotation axis S. The pin receiver 26 forms a hand-part-side pin receiver opening.

Two through-openings 32 which are arranged opposite one another are arranged in the section 23, 24, in the housing wall of the housing neck 22. These serve for receiving the latching lugs 131 on the latching tongues 130 on the securing element 121, which are yet described in more detail further below (see also FIG. 8d).

Furthermore, the slot-like through-openings 33, 50 in the housing wall of the attachment brush housing 21 which have already been described with regard to FIGS. 2a-2g and permit the passage of water for cleaning the attachment brush part 2 are represented in the housing neck 22 as well as in the housing head 42.

Moreover, the withdrawal ribs 34 which have already been described with regard to the FIGS. 2a-2g are represented on the outer side of the housing neck 22.

The housing head 42 forms a beaker-like bristle carrier receiver 43 which is open towards the front side via a carrier receiver opening 44. The bristle carrier receiver 43 serves for receiving the function unit 64 of the bristle carrier 62 which is yet described further below.

The carrier receiver opening 44 is delimited by a peripheral face end surface 45 which has different widths along its circular outer periphery. The different widths of the face end surface 45 are based on different wall thicknesses in the housing head 42.

A mounting sleeve 47 with a feed-through opening 48 for leading through a bearing pin 111 which is yet described hereinafter, from the rear side of the housing head 42, is arranged in the bristle carrier receiver 43.

The mounting sleeve 47 forms a peripheral, annulus-shaped stop shoulder 51 which is directed to the front side and which encompasses a cylinder-shaped end section 52 of the mounting sleeve. The stop shoulder 51 lies in one plane with a face end surface of the limitation cam 46 which is directed to the brush head 61.

The cylinder-shaped end section 52 of the bearing sleeve 47 engages into a cylinder receiver 70 on the function unit 64, said cylinder receiver being yet described hereinafter, and bears with the face end surface 69 on a contact shoulder 68 which is likewise described hereinafter and which surrounds a bearing pin receiver 65 (see also FIG. 8f).

A depression 49 for receiving the pin head 115 of the bearing pin 111 is provided on the rear side of the housing head.

A cross-sectionally trapezoidally designed limitation cam 46 which tapers from its free end (at the upper side) to its base on the mounting sleeve 47 is arranged in the bristle carrier receiver 43. The limitation cam 46 is arranged on the outer wall of the bearing sleeve 47 and is connected to this. Starting from the mounting sleeve 47, the limitation cam 46 is directed along the control rotation axis S to the outermost head end. The limitation cam 46 is moreover connected to the rear-side housing wall.

A connection rib 27 which connects the mentioned elements to one another is arranged between the mounting sleeve 47 and the already mentioned pin receiver body 25. The connection rib 27 is moreover connected to the rear-side housing wall.

The pin receiver 26 of the pin receiver body 25, the connection rib 27, the feed-through opening 48 of the mounting sleeve 47 and the limitation cam 46 are arranged in a common plane, in which the control rotation axis S also lies.

The bearing pin 111 according to the FIGS. 4a and 4b comprises a pin shank 112 and a pin head 115 with a diameter which is larger compared to the pin shank 112. The pin shank 112 in an end section comprises an anchoring section 113 with a plurality of cone-shaped anchoring elements 114 which are arranged along a bearing pin axis G and which taper in the direction of the free shank end.

The anchoring elements 114 serve for the axial and rotationally fixed anchoring of the anchoring section 113 in the bearing pin receiver 65 on the bristle carrier 62.

In the assembled state, the bearing pin 111 is led from the rear side of the housing head 42 through the mounting sleeve 47 or the feed-through opening 48 into the bristle carrier receiver 43 and engages with its anchoring section 113 into the bearing pin receiver 65 of the bristle carrier 62. The pin head 115 is recessed in the depression 49 on the housing head 42 (see FIG. 8f).

The securing element 121 according to FIGS. 5a-5g is designed in a sleeve-like manner and forms a continuous sleeve cavity.

The securing element 121 comprises a brush-head-side, first sleeve section 122 for receiving and supporting the hand-part-side end section of the drive rod 91.

The first sleeve section 122 comprises an inner-lying, annular cross-sectional narrowing 128 in the form of an inner ring. The annular cross-sectional narrowing 128 forms an annular inner stop surface 125 which faces the brush head 61. The inner stop surface 125 is orientated perpendicularly to the control rotation axis S. Furthermore, the annular cross-sectional narrowing 128 forms a cylinder-shaped receiving section 129 for receiving the stop cylinder 101 of the drive rod 91 which is yet described further below.

The cylinder-shaped receiving section 129 serves for the pre-centring of the drive rod 91 via the stop cylinder 101 of the drive rod 91 which engages into this. The diameter of the cylinder-shaped receiving section 129 is larger than that of the stop cylinder 101 which engages into this.

In this manner, the stop cylinder 101 is led with play in the cylinder-shaped receiving section 129, by which means no friction occurs between the lateral cylinder surfaces.

The inner stop surface 125 serves for the mounting of a stop shoulder 102 which is peripheral to the stop cylinder 101 and which is on the drive rod 91 (see FIGS. 8d and 8e).

Two oppositely lying latching tongues 130 each with an outwardly directed latching lug 131 are arranged in the sleeve wall of the first sleeve section 122. The latching tongues 130 which are directed in the direction of the brush head 61 are exposed out of the sleeve wall via slot-like openings. The latching tongues 130 or the latching lugs 131 serve for the axial securing of the securing element 121 on the housing neck 22 by way of the mentioned latching lugs

131 engaging into the already mentioned through-openings 32 on the housing neck 22 (see FIG. 8d).

Furthermore, the securing element 121 comprises a hand-part-side, second sleeve section 123 with a nub receiver 127 for receiving the coupling nub 12 of the hand part 91. The second sleeve section 123 thus forms a coupling section.

The securing element 121 consequently also serves for the connection of the attachment brush part 2 to the hand part 10. The nub receiver 127 has an inner geometry which is adapted to the cross-sectional geometry of the coupling nub 12.

The nub receiver 127 in the region of the nub receiver opening 133 comprises a funnel-like widening 132 which serves an insert aid for the coupling nub 12.

The nub receiver 127 further comprises displacement ribs 135 which serve for creating a well pronounced press fit. The displacement ribs 135 run parallel to the longitudinal axis L of the body care brush or the attachment direction.

The outer surfaces of the sleeve sections 122, 123 are designed conically and taper towards the brush head 61. The insertability of the securing element 121 into the conically designed housing neck 22 is ensured by way of this.

A more pronounced tapering which is designed in the form of a step or an annularly peripheral cone surface can be designed in the direction of the brush-side sleeve section in the transition region from the hand-part-side to the brush-side sleeve section.

The outer surface of the securing element 121 can further comprises ribs 134 which extend over both sleeve sections 122, 123. The ribs 134 are aligned essentially parallel to the longitudinal direction L of the body care brush. The ribs can merge towards the brush-side first sleeve section 122 into the latching tongues 130.

Furthermore, the securing element 121 at its hand-part-side end in the region of the nub relieving opening 133 comprises an annular insert limitation flange 124 which has already been described further above. The insert limitation flange 124, as already mentioned, ensures that the securing element 121 is not pushed completely into the housing neck 22.

The drive rod 91 according to FIGS. 6a-6g comprises a hand-part-side end section 94 as well as a brush-head-side end section 95.

The drive rod 91 at the hand-part-side end section 94 comprises a control pin receiver 99 for receiving the end section of the control pin 13. The drive rod 91 is designed in a tubular manner in this section. The longitudinal axis of the control pin receiver 99 lies on the control rotation axis S.

The control pin receiver 99 comprises a circular-cylinder-shaped basic cross section. In the brush-head-side end section, the control pin receiver 99 has a circle-segment-shaped cross-sectional narrowing 100 with respect to the circular basic cross section. This ensures a positive receiving of the control pin 13 in the control pin receiver 99 and thus a rotational lock (see FIGS. 8d and 8e).

Furthermore, the drive rod 91 in the region of the control pin receiver 99 comprises a spring-elastic pressing tongue 103 which is arranged in the wall of the control pin receiver 99. This presses against the control pin 13 which is inserted into the control pin receiver 99 and clamps this in the control pin receiver 99.

The pressing tongue 103 is exposed out of the wall of the control pin receiver 99 by way of a slot-like opening.

Furthermore, the drive rod 91 in the hand-part-side end section 94 comprises an annular stop cylinder 101 in the form of a hollow cylinder, in the extension of the control pin receiver 99. The stop cylinder 101 has a smaller outer diameter than the outer diameter of the receiving section of the drive rod 91 which connects thereto and which is with the control pin receiver 99. Accordingly, a peripheral stop shoulder 102 is formed in the transition from the receiving section to the stop cylinder 101.

The function of the stop cylinder 101 and of the associated stop shoulder 102 has already been explained in the context of the description of the securing element 121.

For transmitting an oscillating rotation movement from the drive rod 91 onto the brush head 61, said movement having being introduced from the control pin 13 into the drive rod 91, the drive rod 91 at its brush-head-side end section comprises a first toothing 92 with two teeth 92.1 for meshing into a second toothing 66 on the bristle carrier 62 of the brush head 61 which is described further below.

The first toothing 92 which is directed to the front side, with the second toothing 66 of the bristle carrier 62 forms a drive toothing for this.

The face end surfaces of the two teeth 92.1 of the first toothing 92, via which the meshing with the teeth 66.1 of the second toothing 66 is effected, have an inclination with respect to the control rotation axis S.

The drive rod 91 at its brush-head-side end section 95 further forms a bearing pin 96, whose longitudinal axis runs in the control rotation axis S. In the assembled state, the bearing pin 96 is rotatably mounted in the pin receiver 26 of the attachment brush housing 21 (see FIGS. 8*d* and 8*e*), as already mentioned.

The drive rod 91 is consequently rotatably mounted and axially as well as radially secured with its brush-head-side end section 95 on the attachment brush housing 21 via the bearing pin 96 and with its hand-part-side end section 94 on the securing element 121 via the stop cylinder 101 with the stop shoulder 102 (see FIG. 8*c* as well as 8*d* and 8*e*).

The drive rod 91 in a brush-head-side end section 95 now forms a cross-sectional recess which is delimited to the hand-part-side end section by a bearing pin shoulder 97. The bearing pin 96 is now arranged on this bearing pin shoulder 97.

The aforementioned first toothing 92 is arranged on the brush-head-side end of a rod continuation 98, said rod continuation starting from the bearing pin shoulder 97 extending in the direction of the brush-head-side end. The rod continuation 98 runs parallel to the bearing pin 96. A recess is provided between the rod continuation 98 and the bearing pin 96.

The bearing pin 96 comprises a conical base, via which this is connected to the bearing pin shoulder 97.

A cylindrical middle section as well as a conically tapering free end section connects to the cone-shaped base (see in particular FIGS. 6*f* and 6*g*).

The bearing pin 96 is arranged behind the first toothing 92 considered from the front side.

The drive rod 91 further comprises a curvature (see FIG. 60. A first hand-part-side longitudinal section of the drive rod 91, encompassing the hand-part-side end section 94, runs parallel to the control rotation axis S, whilst a second brush-head-side longitudinal section is inclined towards the front side with respect to the control rotation axis S.

A brush-head-side end section 95 however again runs parallel with respect to the control rotation axis S. This means that the arcuate section is arranged between the hand-part-side longitudinal section of the drive rod 91, encompassing the hand-part-side end section 94, and the brush-head-side end section 95.

The drive rod 91 at its front side in the region of the control pin receiver 99 further comprises a flattening 104 on the outer periphery. The flattening 104 serves as an assembly aid and simplifies the correct alignment or positioning of the drive rod 91 with respect to its rotation axis before the assembly.

The brush head 61 according to FIGS. 7*a*-7*e* comprises a bristle carrier 62 as well as bristle bundles 81, 82 which are arranged on the front side of the bristle carrier 62 and which each comprise care bristles.

The bristle carrier 62 in turn comprises a carrier body 72 as well as a function unit 64 which is arranged on the rear side of the carrier body 72.

The carrier body 72 comprise a bristle anchoring body 63, on which the care bristles or bristle bundles 81, 82 are anchored or fastened.

The care bristles or bristle bundles 81, 82 can be anchored in the bristle anchoring body 63 in different manner. Accordingly, the carrier body 72 can also be constructed differently. Particular embodiments of carrier bodies 72 with a bristle anchoring body 63 as well as of care bristles or bristle bundles 81, 82 or function elements which are arranged on this body are described further below by way of FIGS. 10 to 15.

The function unit 64 amongst other things comprises a second toothing 66. The second toothing 66 consists of three teeth 66.1 which are arranged on the rear side of the bristle anchoring body 63. The teeth 66.1 are arranged in a radiant or radially running manner, departing from the carrier rotation axis T.

The face end surfaces of the second teeth 66.1, via which the meshing of the first teeth 92.1 is effected, have an inclination with respect to the carrier rotation axis T.

The function unit 64 further comprises a rotation angle limitation device for the brush head, with two lateral stops 67 for the limitation cam 46 which is already described further above. The lateral stops 67 are arranged above the second toothing 66.

In the assembled state of the brush head 61, the limitation cam 46 is arranged between the two lateral stops 67. The bristle carrier 62 is now only rotatable about a defined rotation angle W which is defined by the abutting of the lateral stops 67 on the limitation cam 46. In the neutral position, the limitation cam 46 lies precisely between the two lateral stops 67.

The lateral stops 67 are connected to one another via a circular-arc-shaped guide wall 71. The guide wall 71 is arranged concentrically to the carrier rotation axis T or to the bearing pin receiver 65.

The lateral stops 67 and the circular-arc-shaped guide wall 71 project beyond the second toothing 66 along the carrier rotation axis T.

The function unit 64 moreover comprises a bearing pin receiver 65 which is open to the rear side, for receiving the anchoring section 113 of the bearing pin 111 which has already been described further above. The bearing pin receiver 65 is designed as a blind hole. This means that the bearing pin receiver 65 is not open towards the front side of the carrier body 72 but in contrast ends in the bristle anchoring body 63.

The lateral stops 67 are arranged laterally of the bearing pin receiver (with respect to the longitudinal axis L) in the neutral position of the bristle carrier 62. The longitudinal axis of the bearing pin receiver 65 lies in the carrier rotation axis T.

The function unit 64 moreover forms an annular contact shoulder 68 which surrounds the opening of the bearing pin receiver 65. The annular contact shoulder 68 is delimited by an annular wall which forms a cylinder receiver 70. The annular contact shoulder 68 serves for the resting contact of the bristle carrier 62 on the mounting sleeve 47 of the housing head 42.

For this, the bristle carrier 62 bears on the face end surface of the cylinder-shaped end section 52 of the bearing sleeve 47 via the contact surface of the contact shoulder 68. In the assembled state, the cylinder receiver 70 with the annular wall engages over the cylinder-shaped end section 52 of the bearing sleeve 47 and thus ensures an adequate centring of the bristle carrier 62 on the housing head 42 before the assembly of the bearing pin 111 (see FIG. 8*f*).

The design according to the invention has the advantage that pressing forces which act upon the brush part 61 are introduced into the mounting sleeve via the annular contact shoulder 68 and in this manner into the housing head 42.

FIGS. 10 to 13 show different embodiment variants of brush heads 161, 261, 361 concerning which the bristling is effected in each case by way of the so-called AFT method. The AFT method has already been described in detail in the general description part and is therefore no longer described here.

Since the front view of a brush head is the same for all of the embodiment examples of brush heads which are represented in the figures of the present patent application, with regard to reference to the cross-sectional view along the plane A-A in FIG. 9, one forgoes representing a separate front view of a brush head for each embodiment.

Rather, FIG. 9 is referred to with regard to this, which shows a front view of a brush head 61 as is the case for all of the embodiment examples of brush heads which are represented in the figures of the present patent application.

Since the function unit 64 of the embodiment variants according to FIG. 10-13 is identical in each case, and this corresponds to the function unit 64 according to the embodiment example according to FIG. 7*a*-7*e*, here the function unit 64 is not described any further. Rather the description concerning FIGS. 7*a*-7*e* is referred to.

The mentioned embodiment variants according to FIG. 10-13 each comprise a carrier body 172, 272, 372 which is composed of a base element 171, 271, 371 and a bristle anchoring body 163, 263, 363 which is stuck onto this and is connected to the base element 171, 271, 371.

The bristle anchoring body 163, 263, 363 at its bristle anchoring side which lies opposite the front side comprise a peripheral connection edge 174, 274, 374 which projects in the direction of the base element 171, 271, 371 and which accordingly encompasses a deepening. The bristle ends which are anchored on the bristle anchoring body 163, 263, 363 are arranged in the deepening. The bristle anchoring body 163, 263, 363 forms a U-shaped cross section.

The already mentioned function unit 64 is arranged on the rear side of the mentioned base element 171, 271, 371.

The base element 171, 271, 371 for its part comprises a peripheral edge 175, 275, 375 which forms a connection contact surface to the projecting connection edge 174, 274, 374 of the bristle anchoring body 163, 263, 363.

According to the embodiment variant according to FIG. 10*a*-10*d*, the connection contact surface of the peripheral edge 175 of the base element 171 is designed in a plane manner and is arranged perpendicularly to the carrier rotation axis T.

The peripheral, projecting connection edge 174 on the bristle anchoring body 163 forms a plane face end surface which is likewise arranged perpendicularly to the carrier rotation axis T. The bristle anchoring body 163 is now connected to the base element 171 via the face end surface of the projecting connection edge 174 which lies on the connection contact surface.

The connection between the face end surface and the connection contact surface is effected by way of (plastic) welding, such as ultrasonic welding.

For this, melt elements 173 are arranged on the face end surface. The melt elements 173 project beyond the face end surface and are melted on welding. In this manner, the melt elements 173 provide additional plastic material for creating the weld connection. The melt elements 173, 273, 373 are represented schematically, so that these are also visible in the melted state.

The peripheral edge 175 of the base element 171 encloses a truncated-cone-shaped body 176 which is directed towards the bristle anchoring body 163. This is characterised by a flank 177 which departing from the peripheral edge 175 is inclined towards the centre, as well as by a plane surface 178 which is raised with regard to the peripheral edge 175 and which is enclosed by the inclined flank 177. The truncated-cone-shaped body 176 serves for centring the bristle anchoring body 163 on the base element 171.

The bristle anchoring body 163 lies on the base element 171 merely via the face end surface of the projecting connection edge 174 on the peripheral edge 175. A cavity is formed between the base element 171 and the bristle anchoring body 163, within the peripheral edge 175.

According to a further development of the embodiment variant according to FIG. 10*a*-10*c*, so-called positioning aids 179, 180 are arranged on the bristle anchoring body 163 and the base element 171, wherein these permit the bristle anchoring body 163 to be positioned on the base element 171 at a defined angular position about the carrier rotation axis T (see FIGS. 11*a*-11*d*).

The positioning aids are pairings of positioning ribs 179 and positioning notches 180, wherein these pairings are matched to one another and positively mesh into one another on depositing the bristle anchoring body 163 onto the base element 171 at the correct angular position.

A plurality of positioning ribs 179 are thus arranged on the bristle anchoring body 163 along the inner periphery of the projecting connection edge 174, i.e. on its inner side, as well as a plurality of positioning notches 180 on the base element 171 along the outer periphery of the truncated-cone-shaped body 176 in its inclined flank.

The described positioning aids 179, 180 have the characteristic that the face end surface of the projecting connection edge 174 of the bristle anchoring body 163 and the connection contact surface of the peripheral edge 175 of the base element 171, for the purpose of creating the connection, do not meet one another until in the correct angular position, which is say when the positioning aids 179, 189 mesh into one another.

According to the embodiment variant according to FIG. 12*a*-12*d*, the connection contact surface of the peripheral edge 275 of the base element 271 is likewise designed in a plane manner and is arranged perpendicularly to the carrier rotation axis T.

In contrast to the embodiment variant according to FIG. 10*a*-10*d*, the peripheral, projecting connection edge 274 on the bristle anchoring body 263 comprises a peripheral step which is directed to the carrier rotation axis T and which departing from a face end surface forms a contact shoulder 267 which is with a shoulder surface and which is set back inwards along the carrier rotation axis T. The shoulder surface is designed in a plane manner and is arranged perpendicularly to the carrier rotation axis T.

The base element 271 for its part comprises a peripheral edge 275 which forms a connection contact surface for the shoulder surface on the projecting connection edge 274 of the bristle anchoring body 263, said connection contact surface being arranged perpendicularly to the carrier rotation axis T. The bristle anchoring body 263 is then connected to the base element 271 via the shoulder surface of the contact shoulder 276 which lies on the connection contact surface of the peripheral edge 275.

The bristle anchoring body 263 lies on the base element 271 merely via the shoulder surface of the contact shoulder 276 on the projecting connection edge 274 via the peripheral edge 275. A cavity is formed within the peripheral edge 275, between the base element 271 and the bristle anchoring body 263.

The connection between the shoulder surface and the connection contact surface is effected by way of (plastic) welding, such as ultrasound welding.

For this, melt elements 273 are arranged on the shoulder surface of the contact shoulder 276. The melt elements 273 project beyond the shoulder surface and are melted on welding. In this manner, the melt elements 273 provide additional plastic material for creating the weld connection.

Furthermore, the bristle anchoring body 263 with a peripheral, outer connection edge section 277 which is delimited at the end side by a face end surface and at the carrier side by the contact shoulder 276 engages over the connection contact surface of the base element 271 at the outer side. The bristle anchoring body 263 with its outer connection edge section 277 overlaps a peripheral surface 279 of the base element 271.

The outer connection edge section 277 serves for the centring of the bristle anchoring body 263 on the base element 271, by way of this forming a centring surface 278 which faces the peripheral surface 279 of the base element 217 and which is aligned parallel to the carrier rotation axis T.

The peripheral surface 279 of the base element 271 which lies opposite the outer connection edge section 277 of the bristle anchoring body 263 or its centring surface 278 is designed in a conically tapering manner in the direction of the bristle anchoring body 263.

According to the embodiment variant according to FIG. 13a-13d which corresponds to a modification of the embodiment variant according to FIG. 12a-12d, the peripheral surface on the base element 371 and which lies opposite the outer connection edge section 377 of the bristle anchoring body 363 or its centring surface 378 is likewise designed in a conically tapering manner in the direction of the bristle anchoring body 363, wherein the peripheral surface 379 of the base element 371 forms a connection contact surface The centring surface 378 of the outer connection edge section 377 likewise comprises an inclination which corresponds to the inclination of the peripheral surface 379 on the base element 371. In this manner, an extensive connection between the centring surface 378 and the peripheral surface 379 is formed on attaching the bristle anchoring body 363 on the base element 371.

Here too, the connection between the centring surface 378 and the peripheral surface 379 is effected by way of (plastic) welding such as ultrasound welding. For this, the melt elements 373 which are already described further above are arranged in the peripheral surface 379.

Analogously to the embodiment variant according to FIG. 12a-12c, the peripheral, projecting connection edge 374 on the bristle anchoring body 363 comprises a peripheral step which is directed to the carrier rotation axis T and which departing from a face end surface forms a contact shoulder 376 with a shoulder surface, said contact shoulder being set back inwards along the carrier rotation axis T. The shoulder surface 376 is designed in a plane manner and is arranged perpendicularly to the carrier rotation axis T. In contrast to the embodiment variant according to FIG. 12a-12c, the contact shoulder 376 here however is designed in a significantly narrower manner.

The base element 371 for its part comprises a peripheral edge 375 which connects onto the peripheral surface and which on the projecting connection edge 374 of the bristle anchoring body 263 forms a connection contact surface for the shoulder surface on the contact shoulder 376. This is arranged perpendicularly to the carrier rotation axis T.

The bristle anchoring body 363 is now additionally connected to the base element 371 via the shoulder surface of the contact shoulder which lies on the connection contact surface. The connection corresponds to an aforementioned weld connection.

A cavity is likewise formed within the peripheral edge 375 of the base element 371, between the base element 371 and the bristle anchoring body 363.

The aforedescribed second variant and its modification can also comprise positioning aids for fixing a defined angular position of the bristle anchoring body.

It is of course possible to design the centring in a multi-step manner with all solutions according to FIGS. 10 to 13. This means that for example several truncated-cone-shaped bodies with successively different diameters and heights can be realised, or that a centring via a truncated-cone-shaped body can be effected additionally to a centring type.

The brush head 461 according to the embodiment according to FIG. 14a-14d is characterised by extensive, lamellae-shaped care elements 473 which are anchored in the bristle carrier 462. The lamellae-shaped care elements 473 are designed in a wave-shaped or arched manner in a plan view.

The brush head 561 according to the embodiment according to FIG. 15a-15c is characterised in that the bristle field is composed of an outer-lying, first circle 563 of bristle bundles 566, of a second circle of bristle bundles 567 which lies within the first circle 563 as well as of a centre region 565 with two bristle bundles 568. The two circles 563, 564 of bristle bundles are arranged concentrically about the carrier rotation axis T. The bristle bundles 566, 567, 568 each comprise a plurality of care bristles.

The bristle bundles 566 of the outer-lying first circle 563 have an inclination in the peripheral direction relative to the carrier rotation axis T of 17°.

The bristle bundles 567 of the second circle 564 which lies within the first circle 563 likewise have an inclination in the peripheral direction relative to the carrier rotation axis T of 8°. However, the inclination of the bristle bundles 567 of the second circle 564 is opposite to the inclination of the bristle bundles 566 of the first circle.

Both bristle bundles 568 in the centre region 565 are aligned parallel to the carrier rotation axis T.

The bristle length is different within the individual bristle bundle of the outer-lying circle 563 of bristle bundles to the extent that a step is formed in the care-side end of the bristle bundles 566.

FIGS. 16a to 16g show a further attachment brush housing 621 with a housing neck 622 and with a housing head 642 which connects to the housing neck at the brush head side. With the exception of a certain deviation which is explained further blow, the design corresponds essentially to FIGS. 3a to 3g.

The housing neck 622 is a tubular body with a continuous receiver which at the hand part side ends in the receiver opening 629 and at the brush head side runs out in the bristle carrier receiver 643 of the housing head 642.

The housing neck 622 serves for receiving the drive rod 91, 891 as well as the securing element 121, 721 (see also FIGS. 8d and 8e).

The housing neck 622 comprises a hand-part-side, first receiving section 623 which connects onto the hand-part-side receiver opening 629 in the direction of the brush head 61, for receiving the securing element 121. Furthermore, a brush-head-side second receiving section 624 for receiving the drive rod 91, 891 connects onto the first receiving section 623 in the direction of the brush head 61 (see also FIGS. 8d and 8e).

A pin receiver body 625 with a pin receiver 626 for receiving the bearing pin 96, 896 of an already described drive rod 91, 891 is arranged at the brush-head-side end of the second receiving section 624. The pin receiver body 625 is arranged on the rear-side housing wall and projects from this into the second receiving section 624. The pin receiver body 625 further projects with a longitudinal section into the bristle carrier receiver 643 of the housing head 642.

The pin receiver 626 is designed as a blind hole and has a longitudinal axis which lies in the control rotation axis S. The pin receiver 626 forms a hand-part-side pin receiver opening.

Two through-openings 632 which lie opposite one another are arranged in the housing wall of the housing neck 622 in the transition from the first to the second receiving section 623, 624. These serve for receiving the latching lugs 131, 731 on the latching tongues 130, 730 on the securing element 121, 721 (see also FIG. 8d).

One or more grooves can be arranged around the periphery in the first receiving section, and these grooves in the first receiving section lie in the direction of the second receiving section, shown in the FIGS. 16g and 16f. Two grooves 635 which are axially incorporated in the attachment brush housing 621 at the same location or at the same height and each cover a part of the periphery are preferably formed. In the assembled state, these interact with prominences 736 which are shaped out in the alternative securing element 721 (see FIGS. 17a to 17g). Together, they lead to a very stable assembly.

Furthermore, the slot-like through-openings 633, 650 which have already been described with regard to FIGS. 2a-2g are represented in the housing wall of the attachment brush part 621, in the housing neck 622 as well as in the housing head 642, and these serve for the passage of water for cleaning the attachment brush part 2.

Furthermore, the withdrawal ribs 634 which have already been described with regard to the FIGS. 2a-2g are represented on the outer side of the housing neck 622.

The housing head 642 forms a beaker-like bristle carrier receiver 643 which is open to the front side via a carrier receiver opening 644. The bristle carrier receiver 643 serves for receiving the already described function unit 64 of the bristle carrier 62.

The carrier receiver opening 644 is delimited by a peripheral face end surface 645 which has different widths along its circular outer periphery. The different widths of the face end surface 645 are based on different wall thicknesses in the housing head 642.

A mounting sleeve 647 with a feed-through opening 648 for leading through an already described bearing pin 111 from the rear side of the housing head 642 is arranged in the bristle carrier receiver 643.

The mounting sleeve 647 forms a peripheral, annulus-shaped stop shoulder 651 which is directed to the front side and which encompasses a cylinder-shaped end section 652 of the bearing sleeve. The stop shoulder 651, with a face end surface of the limitation cam 646 which is directed to the brush head 61 lies in one plane.

The cylinder-shaped end section 652 of the mounting sleeve 647 engages into the aforedescribed cylinder receiver 70 on the function unit 64 and with the face end surface 69 lies on a contact shoulder 68 which is likewise described hereinafter and which surrounds a bearing pin receiver 65 (see also FIG. 8f).

A depression 649 for receiving the pin head 115 of the bearing pin 111 is provided on the rear side of the housing head.

A limitation cam 646 which is designed trapezoidally in cross section and which tapers from its free end (at the upper side) to its base on the mounting sleeve 647 is arranged in the bristle carrier receiver 643. The limitation cam 646 is arranged on the outer wall of the bearing sleeve 647 and is connected to this. Departing from the mounting sleeve 647, the limitation cam 646 is directed towards the outermost head end along the control rotation axis S. Furthermore, the limitation cam 646 is connected to the rear-side housing wall.

A connection rib 627 which connects the mentioned elements to one another is arranged between the mounting sleeve 647 and the already mentioned pin receiver body 625. The connection rib 627 is moreover connected to the rear-side housing wall. The connection rib 627 is shaped as an arrow-like element of an arrow shank 636 and an arrow tip 637. This automatically entails a larger (face-)end surface, which is also a support or a tilt limitation for the brush head.

The pin receiver 626 of the pin receiver body 625, the connection rib 627, the feed-through opening 648 of the mounting sleeve 647 and the limitation cam 646 are arranged in a common plane, in which the control rotation axis S also lies.

The alternative securing element 721 according to FIGS. 17a-17g is designed in a sleeve-like manner and forms a continuous sleeve cavity. The design basically corresponds to FIGS. 5a to 5g, with the exception of a certain difference in principle which is explained further below.

The securing element 721 comprises a brush-head-side, first sleeve section 722 for receiving and supporting the hand-part-side end section of the drive rod 91, 891.

The first sleeve section 722 comprises an annular cross-sectional narrowing in the form of an inner ring. The annular cross-sectional narrowing 728 forms an annular stop surface 725 which faces the brush head 61. The stop surface 725 is orientated perpendicularly to the control rotation axis S. The annular cross-sectional narrowing 728 further forms a cylinder-shaped receiving section 729 for receiving the described stop cylinder 101, 801 of the drive rod 91, 891.

The cylinder-shaped receiving section 729 serves for the pre-centring of the drive rod 91, 891 via the stop cylinder 101, 801 of the drive rod 91, 8981 which engages into this section. The diameter of the cylinder-shaped receiving section 729 is larger than that of the stop cylinder 101, 801 which engages into this.

In this manner, the stop cylinder 101, 801 is led with play in the cylinder-shaped receiving section 729, by which means no friction occurs between the lateral cylinder surfaces.

The stop surface 725 serves for the mounting of a stop shoulder 102, 802 which is peripheral about the stop cylinder 101, 801 and which is on the drive rod 91, 891 (see FIGS. 8d and 8e).

Two latching tongues 730 which lie opposite one another and are each with an outwardly directed latching lug 731 are arranged in the extension of the sleeve wall of the first sleeve section 722. The latching tongues 730 which are directed in the direction of the brush head 61 are exposed and lie in the extension of the sleeve wall. The latching tongues 730, more specifically the latching lugs 731 serve for axially securing the securing element 721 on the housing neck 22, 622 by way of the mentioned latching lugs 731 engaging into the already mentioned through-openings 32, 632 on the housing neck 22, 622 (see FIG. 8d).

Prominences 736 which are arranged axially at the same height on the periphery of the securing part 721 and which latch into corresponding grooves 635 on the attachment brush housing 621 are designed as further elements for the retention of the securing part 621 in the attachment brush housing. These prominences and grooves are latched into one another on inserting the parts into one another. These are attached to the cylinder-shaped receiving section 729 axially roughly above the annular cross-sectional narrowing 728.

Furthermore, the securing element 721 comprises a hand-part-side, second sleeve section 723 with a nub receiver 727 for receiving the coupling nub 12 of the hand part 10. The second sleeve section 723 thus forms a coupling section.

The securing element 721 consequently also serves for the connection of the attachment brush part 2 to the hand part 10. The nub receiver 727 has an inner geometry which is adapted to the cross-sectional geometry of the coupling nub 12.

The nub receiver 727 in the region of the nub receiver opening 733 comprises a funnel-like widening 732 which serves as an insertion aid for the coupling nub 12.

The nub receiver 727 further comprises displacement ribs 735 which serve for creating a well-pronounced press fit/seat. The displacement ribs 735 run parallel to the longitudinal axis L of the body care brush or to the attachment direction.

The outer surfaces of the sleeve sections 722, 723 are designed in a conical manner and taper towards the brush head 61. The insertability of the securing element 721 into the conically designed housing neck 22, 622 is ensured by way of this.

A reinforced tapering which is designed in the form of a step or an annularly peripheral cone surface can be formed in the direction of the brush-side sleeve section, in the transition region from the hand-part-side to the brush-side sleeve section.

The outer surface of the securing element 721 can further comprise ribs 734 which extend over both sleeve sections 722, 723. The ribs 734 are aligned essentially parallel to the longitudinal direction of the body care brush. The ribs towards the brush-side, first sleeve section 722 can merge into the latching tongues 730.

Furthermore, geometries which correspond to the U-shaped slot of the latching tongue 31, 631 of the attachment brush housing are created on the rear side of the securing element 721. Two stumps or projections 737 are shaped on the hand-part-side end of the securing element 721 and these bear on the end of the U-shaped slot in the assembled state. Furthermore, these stumps can be provided with a ramp, so that the insertion of the securing element into the attachment brush housing and therefore also the moving of the stumps into the U-shaped recess is assisted.

Furthermore, the securing element 721 comprises an annular insert limitation flange 724 on its hand-part-side end in the region of the nub receiver opening 733, said flange having already been described further above. As already described, the insert limitation flange 724 ensures that the securing element 721 is not completely inserted into the housing neck 22, 622.

The drive rod 891 according to FIGS. 18a-18g comprises a hand-part-side end section 894 as well as a brush-head-side end section 895. The design basically corresponds to the FIGS. 6a to 6g with the exception of a certain difference which is explained further below.

The drive rod 891 forms a control pin receiver 899 for receiving the end section of the control pin 13, on the hand-part-side end section 894. The drive rod 891 is designed annularly in this section. The longitudinal axis of the control pin receiver 899 lies on the control rotation axis S.

The control pin receiver 899 has a circular-cylinder-shaped basic cross section. In the brush-head-side end section, the control pin receiver 899 has a circle-segment-shaped cross-sectional narrowing 800 with respect to the circular basic cross section. This ensures a positive receiving of the control pin 13 in the control pin receiver 899 and thus a rotation lock (see FIGS. 8d and 8e).

Moreover, the drive rod 891 comprises an annular stop cylinder 801 in the form of a hollow cylinder, in the hand-part-side end section 894 in the extension of the control pin receiver 899. The stop cylinder 801 has a smaller outer diameter than the outer diameter of the receiving section of the drive rod 891 which connects thereto and which is with the control pin receiver 899. Accordingly, a peripheral contact shoulder 802 is formed in the transition from the receiving section to the stop cylinder 801.

The function of the stop cylinder 801 and of the associated stop shoulder 802 have already been explained in the context of the description of the securing element 121, 721.

For transmitting an oscillating rotation movement which is introduced from the control pin 13 into the drive rod 891, from the drive rod 891 onto the brush head 61, the drive rod 891 on its brush-head-side end section comprises a first toothing 892 with two teeth 892.1 for meshing into a second toothing 66 on the bristle carrier 62 of the brush head 61 which is described further below.

The first toothing 892 which is directed to the front side, with the second toothing 66 of the bristle carrier 62 forms a drive toothing for this.

The face end surfaces of the two teeth 892.1 of the first toothing 892, via which the meshing with the teeth 66.1 of the second toothing 66 is effected, have an inclination with respect to the control rotation axis S.

The drive rod 891 at its brush-head-side end section 895 further forms a bearing pin 896 whose longitudinal axis runs in the control rotation axis S. As already mentioned, in the assembled state the bearing pin 896 is rotatably mounted in the pin receiver 26, 626 of the attachment brush housing 21, 621 (see FIGS. 8d and 8e).

The drive rod 891 is consequently rotatably mounted and axially as well as radially secured with its brush-head-side end section 895 on the attachment brush housing 21, 621 via the bearing pin 896 and with its hand-part-side end section 894 on the securing element 121, 171 via the stop cylinder 801 with the stop shoulder 802 (see FIG. 8c as well as FIGS. 8d and 8e).

The drive rod 891 in a brush-head-side end section 895 now forms a cross-sectional recess which is delimited to the hand-part-side end section by a bearing pin shoulder 897. The bearing pin 896 is now arranged on this bearing pin shoulder 897.

The aforementioned first toothing 892 is arranged on the brush-head-side end section of a rod continuation 898, said continuation departing from the bearing pin shoulder 897 extending in the direction of the brush-head-side end. The rod continuation 898 runs parallel to the bearing pin 896. A recess is provided between the rod continuation 898 and the bearing pin 896.

The bearing pin 896, departing from the bearing pin shoulder 897 comprises a cylindrical base section as well as a conically tapering, free end section (see in particular FIGS. 18*f* and 18*g*).

The bearing pin 896 is arranged behind the first toothing 892 considered from the front side.

The drive rod 891 further comprises a curvature (see FIG. 18*f*). A first hand-part-side longitudinal section of the drive rod 891 runs parallel to the control rotation axis S, whilst a second brush-head-side longitudinal section is inclined towards the front side with respect to the control rotation axis S.

A brush-head-side end section 895 however again runs parallel with respect to the control rotation axis S. This means that the arcuate section is arranged between the hand-part-side longitudinal section of the drive rod 891, comprising the hand-part-side end section 894, and the brush-head-side end section 895.

The drive rod 891 between a hand-part-side longitudinal section or end section 894 and a brush-head-part-side end section 895 comprises a necking section 805 which lies therebetween and which has a smaller diameter than in the hand-part-side and brush-head-part-side longitudinal or end section. The drive rod 891 can taper conically from the hand-part-side and brush-head-part-side longitudinal section or end section, towards the necking section 805.

The inclination of the drive rod 891 which is described above in particular runs in the necking section 805.

FIGS. 19 to 25 each show an attachment brush part 900, 920, 940, 960, 980, 1000, 1020 with a brush head 901, 921, 941, 961, 981, 1001, 1021 which comprises a bristle carrier 902, 922, 942, 962, 982, 1002, 1022. The circular bristle carrier 902, 922, 942, 962, 982, 1002, 1022 forms a bristle field which is composed of several bristle field segments. The bristle field segments are hereinafter described in more detail by way of the figures.

The geometric rotation axis of the brush head 901, 921, 941, 961, 981, 1001, 1021 (not shown) which corresponds to the carrier rotation axis, leads through the centre of the bristle carrier.

The bristle field segments according to the shown embodiment examples are formed in particular from care bristles or bristle bundles of care bristles. However, it is also possible for individual ones of the shown bristle field segments, in particular elongate bristle field segments to be formed from soft material and in particular in a single-part manner. This means that not all segments of a bristle field need necessarily need consist of bristles.

A bristle field segment of the shown embodiments in turn does not need to be formed exclusively from care bristles. The bristle field segment, apart from the care bristles, can also comprise other types of care elements, e.g. of a soft material.

The possible design and manufacture of the care bristles has already been described further above in the general description part.

For reasons of a better overview, not all bristle field segments are provided with reference numerals in the figures. Basically, at least one bristle field segment of a certain type or a certain shape of bristle field segment is provided with a reference numeral.

The bristle bundles which can form the bristle field or the bristle field segment, according to the shown embodiments can be designed in a radiant manner. The mentioned bristle bundles however can also be designed cylindrically.

The bristle bundles which in particular are designed radiantly can be pointed.

Round, in particular circular bristle field segments of the shown embodiments are formed in particular from individual or individually standing bristle bundles.

The bristle fields of the shown embodiment examples in particular have a profiling. The profiling of the bristle field can be designed such that the centre region of the bristle field lies most deeply in each case.

The brush head 901 according to the embodiment according to FIG. 19 is characterised in that the bristle field is fashioned by differently shaped bristle field segments in particular of care bristles. The manufacture of the bristle field or of the bristle field segments is effected in an anchor-free manufacturing method such as e.g. AFT or PTt.

The preferred construction of the bristle field from the inside to the outside is such that four mirror-symmetrically arranged bristle field segments 910 which lie opposite one another, are T-shaped in a plan view and are formed by T-shaped bristle bundles are attached in the inside. This means that the bristle field segments 910 each have a T-shaped cross section or base surface. Herein, the T-shaped bristle field segments 901 are directed with their trunk towards one another.

In the present embodiment example, the T-shaped bristle field segments 910 are distanced to one another via intermediate spaces. The T-shaped bristle field segments 910 or bristle bundles however can alternatively also be connected into one or two bristle bundles i.e. abut one another without intermediate spaces. The T-shaped bristle field segments 910 or bristle bundles can therefore be connected to a distal trunk end of an adjacent T-shaped bristle field segment 910 via their distal trunk end or to the distal limb end of an adjacent T-shaped bristle field segment 910 via one or both of their distal limb ends, i.e. abut one another without an intermediate space.

The four T-shaped bristle field segments 910 or their trunks are each arranged at an angle of 90° to one another about the centre of the bristle carrier 902.

The bristle field is aligned along the longitudinal axis L of the attachment brush 900 such that the T-shaped bristle field segments 910 or their trunks are not in line with the longitudinal axis L in the neutral position of the bristle head 91 but are arranged in an X-like manner at an angle of 45° to this.

The bristle field further comprises four bristle field segments 916 which are each formed from a bristle bundle. The bristle field segments 916 to the outside form a semi-oval and towards the centre a straight-lined outer contour. The bristle field segments 916 are arranged with the trunk of the adjacent T-shaped bristle field segments 910 in one line. These bristle field segments 916 are each arranged offset to one another by 90° (angle degrees).

An elongate arched bristle field segment 912 which partly encompasses or surrounds a point-like bristle field segment 913, considered in the longitudinal axis direction L is arranged before and after the structure with the T-shaped bristle field segments 900. The bending of the arched bristle field segments 912 points towards the centre. The point-like bristle field segments 913 are arranged at the front and at the rear end of the brush head 901 and of the bristle field respectively.

A pairing of two elongate, arched bristle field segments 914, 915 which are arranged in parallel are formed to the left and right in the plan view.

These can have the shape of a circular arc section. The bending of the arched bristle field segments 914, 915 points outwards.

The semi-oval-shaped bristle field segments 916 are each arranged between a pairing of arched bristle field segments 914, 915 and an arched bristle field segment 912.

The bristle field is constructed in each case in a mirror-symmetrical manner via two symmetry axes which lead through the centre. The first symmetry axis is arranged parallel to the longitudinal axis of the attachment brush part 900 and the second symmetry axis is arranged perpendicularly to this.

The bristle section, i.e. the bristle lengths are designed in particular such that the central bristle field segments are set somewhat deeper than the outer bristle field segments. I.e. the bristle length of the inner-lying bristle field segments is shorter that the bristle length of the outer-lying bristle field segments.

The bristle bundles of the T-shaped bristle field segments 910 can be cylindrical or be formed from cylindrical bristles. The four bristle bundles of the semi-oval-shaped bristle field segments 916 can comprise pointed bristle bundles. These can project beyond the bristle field as a whole, so that a better interdental penetration is possible.

The further bristle field segments can be shaped from cylindrical bristles, wherein with regard to the concentrically arranged arched bristle field segments 914, 915 which lie to the left and the right there is also the possibility of the use of pointed bristles. As a whole, there is likewise the possibility of manufacturing all bristle bundles or bristle field segments with cylindrical bristles.

The T-shaped bristle field segments 910 can also be integrated in the bristle field with another configuration of bristle field segments. However, they are preferably brought into the centre region and with regard to the height profile are preferably maximally equal in height or slightly higher than the bristle bundles or bristle field segments which are arranged around these.

In the bristle head 921 according to FIG. 20, T-shaped bristle field segments 930 are arranged in the centre region analogously to the preceding embodiment example according to FIG. 19. The description concerning FIG. 19 is therefore referred to with regard to the design and arrangement of the T-shaped bristle field segments 930.

A difference to FIG. 19 lies in the fact that the T-shaped bristle field segments 930 are designed smaller. Here too however, the T-shaped bristle field segments 930 are distanced to one another via intermediate spaces. Analogously to the embodiment example according to FIG. 19, the T-shaped bristle field segments 930 can alternatively also be connected into one or two bristle field segments or bristle bundles, i.e. abut one another without intermediate spaces, as already explained in more detail in the description concerning FIG. 19. Here too, the T-shaped bristle field segments 930 are also directed towards one another with their trunk.

The structure of the bristle field continues in four dash-shaped bristle field segments 931 which at the centre side connect onto the intermediate space between two limbs of two T-shaped bristle field segments 930 and extends radially outwards from the centre. The dash-shaped bristle field segments 931 are arranged at a 90° angle to one another and form a cross-like arrangement. Two dash-shaped bristle field segments 931 lie on the longitudinal axis L of the attachment brush part 920. Two dash-shaped bristle field segments 931 are accordingly arranged at an angle of 90° to the longitudinal axis L.

In each case, an inner-lying circular-arc-shaped bristle field segment 932 is arranged between the dash-shaped bristle field segments 931.

Furthermore, in each case three outer-lying circular bristle field segments 933 are arranged in a circular-arc-shaped manner between the dash-shaped bristle field segments 931. The circular bristle field segments 933 in particular consist of individual bristle bundles.

The circular bristle field segments 933 form an outer-lying ring or circle which is merely interrupted by the dash-shaped bristle field segments 931.

The inner-lying circular-arc-shaped bristle field segments 932 are accordingly each arranged between the T-shaped bristle field segment 930 or its limbs and the ring or circle of circular bristle field segments 933.

The bristle bundles which form the bristle field and the bristle field segments can be cylindrical. The profiling of the bristle field or the length of the bristles or bristle bundles in particular is designed such the centre region of the bristle field lies most deeply. The dash-shaped bristle field segments 931 can also be designed from pointed bristle bundles and with regard to height can protrude somewhat, so that the cleaning performance is again improved.

FIGS. 21*a* and 21*b* show a bristle field, concerning which a spiral-shaped bristle field segment 950 is formed in the centre region. At the outer side, a ring of circular bristle field segments 951 surrounds the spiral-shaped bristle field segment 950. The circular bristle field segments 951 are designed from individually standing bristle bundles.

The spiral-shaped bristle field segment 950, considered from the inside (centre) to the outside, can have an increasing height (centre is the highest point) or a reducing height (centre is the deepest point) along the spiral course.

The individually standing bristle bundles of the outer-lying bristle field segments 951 can be lower than the outer end of the spirals or higher than these. The individually standing bristle bundles of the outer-lying bristle field segments 951 preferably have a height which lies between the height of the inner-lying start and the outer-lying end of the spiral-shaped bristle field segment 950. The spiral-shaped bristle field segment 950 can change in cross section over the length, e.g. the spiral-shaped bristle bundle or bristle field segment 950 can increase or reduce in width from the inside to the outside. The spiral-shaped bristle field segment 950 comprises two windings in the present embodiment example The spiral-shaped bristle field segment 950 can of course also be realised with other shapes of bristle field segments which are arranged about the spiral-shaped bristle field segment 950.

The spiral-shaped bristle field segment 950 can be designed from cylindrical or pointed bristles or of a combination of cylindrical and pointed bristles. The bristle types can therefore be arranged in an alternating manner in sections over the course of the spiral.

A special variant envisages the innermost end or the innermost end section of the spiral—which preferably stands the tallest—being occupied by pointed bristles. This can be effected in a pointwise manner or can relate to an elongate end section of the spiral-shaped bristle field segment 950 which is occupied by pointed bristles.

According to the embodiment example according to FIGS. 22*a* and 22*b*, the bristle field comprises a central, circular bristle field segment 970 which is designed in a comparatively large manner and has a diameter which is roughly a quarter of the diameter of the bristle carrier 962.

The central bristle field segment 970 is surrounded by triangular bristle field segments 971, 972, hereinafter also simply called "triangles". In the present embodiment example, the triangles are equilateral. The triangles can also be designed as isosceles triangles.

The central bristle field segment 970 is therefore surrounded by a first ring of triangular bristle field segments 971, concerning which a tip of the triangle is directed outwards away from the centre. In this manner, the central bristle field segment 970 together with the first ring of triangular bristle field segments 970 essentially forms a sun-like bristle field structure.

Furthermore, the bristle field comprises a further, second ring of triangular bristle field segments 972 which surrounds the first ring of triangular bristle field segment 970 and lies at the outside. The two rings, also called circles, of triangular bristle field segments 971, 972 are arranged concentrically. The triangular bristle field segments 972 of the second ring are arranged such that in each case a tip of the triangle points inwards to the centre.

The triangles 971, 972 of the inner and outer ring are each arranged offset to one another in a manner such that the outwardly pointing tip of the triangles 971 of the inner-lying ring is directed in each case between two triangles 972 of the outer-lying ring and the inwardly pointing tip of the triangles of the outer-lying ring 972 is directed in each case between two triangles 971 of the inner-lying ring. Furthermore, the triangles 971, 972 of the two rings which are arranged offset to one another engage into one another such that the mentioned tips of the triangles are each arranged between two triangles of the other ring.

The two rings each have equal as many triangular bristle field segments 971, 972. In each case, 6, 8 or 10 triangular bristle field segments 971, 972 can be arranged on the two rings.

The bristle lengths of the individual bristle field segments increases from the inside to the outside so that a profiling of the bristle field is present. According to the present embodiment example, the central bristle field segment 970 has a first height, the triangular bristle field segments 971 of the first ring which connects thereto a second height and the triangular bristle field segments 972 of the outermost, second ring a third height. The third height is greater than the second height and the second height is greater than the first height.

The central bristle field segment 970 can also be integrated with other configurations of bristle field segments around it into a bristle field.

The central bristle field segment 970 can be designed of cylindrical or pointed or a combination of cylindrical and pointed bristles.

The triangular bristle field segments 971, 972 can likewise be shaped of cylindrical or pointed bristles or a combination of these. It is also possible to design the inner, first ring of cylindrical bristles and the outer, second ring of pointed bristles. Furthermore, it is also possible for bristle bundles of cylindrical bristles and bristle bundles of pointed bristles to alternate with regard to the triangular bristle field segments 971, 972. This can be the case with only one of the rings or both rings. If the bristle bundles alternate on both rings, then the bristle bundles of the same type form a spiral-shaped arrangement.

The bristle field according to FIGS. 23*a* and 23*b* likewise comprises a central, circular bristle field segment 990 which is formed by a bristle bundle. Four radially outwardly directed dash-shaped or elongate bristle field segments 991 are arranged departing from the central bristle field segment 990.

A first pairing of dash-shaped bristle field segments 991 is arranged in the longitudinal axis L of the attachment brush part 980, a second pairing of dash-shaped bristle field segments 991 is arranged at an angle of 90° to the longitudinal axis L of the attachment brush part 980. The dash-shaped bristle field segments 991 form a cross-like arrangement in this manner.

Two dash-shaped bristle field segments 991 each enclose a bristle field sector. Further, circularly designed bristle field segments 992 are arranged in this bristle field sector. These are each formed by a bristle bundle.

Four circular bristle field segments 992 in a triangular shape with a tip pointing to the centre are each arranged in a bristle field sector.

The dash-shaped bristle field segments 991 in cross section are wider to the outside. However, it is also conceivable for the cross section to the outside to remain constant. Furthermore, it is possible for the cross section to taper to the outside.

The dash-shaped bristle field segments 991 can project beyond the other bristle field segments 990, 992.

The bristle field can be profiled in a manner such that the care bristles or bristle bundles are at their deepest in the centre region and at their highest at the outside. The height of the care bristles or brittle bundles can continuously increase outwards departing from the centre.

The bristle bundles can be designed of pointed or cylindrical bristles. For example, the care bristles of the dash-shaped bristle field segments can be pointed and the care bristles of the other bristle field segments can be cylindrical.

The bristle field which is shown in FIGS. 24*a* and 24*b* is composed of a plurality of circular bristle field segments 1010, 1011, 1012 with a different diameter which are each formed from one bristle bundle The bristle field comprises a central, i.e. centrically arranged circular bristle field segment 1010 which is formed by a bristle bundle.

Three rings or circles of circularly round bristle field segments 1011, 1012, 1013 which are likewise each formed by a bristle bundle are arranged concentrically about the central bristle field segment 1010. The bristle field segments 1011, 1012, 1013 of these rings have different diameters.

The bristle field segments 1011 of a first inner-lying ring or circle thus have a first diameter, the bristle field segments 1012 of a second middle ring or circle a second diameter and the bristle field segments 1013 of a third, outer-lying ring or circle a third diameter. The first diameter of is smaller than the second and third diameter. The second diameter is larger than the first diameter and smaller than the third diameter. The third diameter is larger than the first and second diameter. The diameter of the central bristle field segment 1010 is larger than the first and second diameter and roughly the same size as the third diameter.

A modification, according to which the care bristles or bristle bundles of the bristle field segment have different characteristics, is shown in FIG. 24*c*. In FIG. 24*c*, the bristle field segments 1010-103 which are represented by empty circles have a first characteristic and the bristle field segments 1011'-1013' which are represented by black circles have second characteristics. The characteristic can be the design of the bristles or bristle bundles, such as e.g. the colour, the cross-sectional size, the cross-sectional shape, the design of the free bristle end (pointed, round, flat, stepped, etc.), the bristle length or height of the bristle or bristle ends, etc.

The bristle field segments can be designed such that bristle field segments 1011'-1013' with care bristles or bristle bundles with the same characteristics form spiral-shaped structures, as is shown by way of example in FIG. 24c.

The individual spirals consist of bristle field segments 1011'-1013' with a different size but with the same bristle characteristics. They are arranged in particular in a point-symmetrical manner with respect to the centre.

The spiral structure forms in a clockwise or anti-clockwise manner and is formed by consecutive bristle field segments 1011'-1013' of large bristle bundles to smaller bristle bundles. As mentioned, the individual spiral structures can be characterised for example by an equal bristle type.

The embodiment which is shown in FIG. 25 comprises a bristle field with a plurality of circularly round bristle field segments 1030, 1031, 1032, 1033 of a differently large diameter. The bristle field segments 1030, 1031, 1032, 1033 are formed by respective bristle bundles.

In the present embodiment example, the bristle field comprises four types of bristle field segments 1030, 1031, 1032, 1033 which each have a different diameter. The bristle field now comprises several bristle field segments 1030, 1031, 1032, 1033 per bristle field segment type. The bristle field segments 1030, 1031, 1032, 1033 are arranged distributed uniformly over the bristle field, wherein the spatial arrangement in the bristle field is however random and follows no given pattern.

The diameter of the bristle field segments 1031 with the largest diameter measures a multiple of the diameter of the bristle field segments 1033 with the smallest diameter. The bristle field segments 1033 with the smallest diameter herein in particular fill the gaps between the bristle field segments with the largest diameter 1031.

For all shown brush heads, it is the case that the bristle bundles or the individual bristles or care bristles can be manufactured from cylindrical or pointed bristles.

Individual care elements of a bristle field, as already mentioned, can also be formed from a soft component. These can be manufactured directly with the carrier and for example directly replace a respective bristle hole or be arranged therebetween.

The heights of the different bristle bundles can be different. The heights of the different bristle bundles can also be uniform, so that all bristle ends lie in the same plane, in particular parallel to be base surface.

Bristle fields with the designs which have been mentioned above, depending on the height profile, in combination with the linear movement of the bristle carrier can entail improved cleaning results. Individual bristle bundles which stand taller do not have the same stability as several bristle bundles of the same height which are arranged next to one another. Accordingly these can be deflected by the linear travel and thus be pressed against the surface to be cleaned, to a greater extent. In the manner, an improved interdental penetration can be achieved. This effected can also be achieved with structures which form parts of a bristle bundle which stand taller.

The invention claimed is:

1. An attachment brush part for an electrical toothbrush, the attachment brush part being designed of several parts and comprising:

a brush head with a bristle carrier and with care bristles which are arranged on the bristle carrier;

an attachment brush housing with a housing head for receiving the bristle carrier of the brush head;

a drive rod for driving the brush head;

a securing element for rotatable mounting of a hand-part-side end section of the drive rod; and a bearing pin for positioning, securing and for an oscillatorily rotatable mounting of the brush head on the attachment brush housing, wherein:

the bearing pin comprises a pin shank and a pin head with a diameter which is larger compared to the pin shank, and the pin shank towards the pin head comprises a first cylindrical section, and the pin shank towards a free end comprises a second fastening section with a structured surface, the housing head is formed in one piece and comprises a bristle carrier receiver and a carrier receiver opening which is arranged on a front side as well as a bearing sleeve with a feed-through opening which leads from a rear side of the housing head into the bristle carrier receiver, wherein the bristle carrier is formed in one piece and at least partially engages with the bristle carrier receiver and the bearing pin is led from the outside and from the rear side of the housing head through the housing head and the feed-through opening of the bearing sleeve, wherein the pin head is arranged on the outside of the rear side of the housing head, the first cylindrical section serves as a bearing for the bearing pin in the bearing sleeve, and the bearing pin engages with the fastening section into a bearing pin receiver on the bristle carrier which is open to the rear side and establishes an axially and rotationally fixed connection to the bristle carrier such that the bearing pin at one hand forms a physical rotation axle for the bristle carrier and on the other hand fixes and holds the bristle carrier on the housing head, and a limitation cam is arranged on the bearing sleeve, and the limitation cam is configured to interact with the bristle carrier such that a rotation angle of the bristle carrier around a carrier rotation axis is limited.

2. The attachment brush part according to claim 1, wherein the first cylindrical section has a smooth surface.

3. The attachment brush part according to claim 1, wherein the structured surface comprises at least one anchoring element for anchoring of the fastening section in the bristle carrier.

4. The attachment brush part according to claim 3, wherein the structured surface comprises two to eight anchoring elements.

5. The attachment brush part according to claim 3, wherein the at least one anchoring element is a cone-shaped anchoring element, or a barb.

6. The attachment brush part according to claim 3, wherein the at least one anchoring element include a plurality of anchoring elements that are several cone bodies which are arranged successively along the pin axis and which each taper to the free end of the pin shank.

7. The attachment brush part according to claim 3, wherein the fastening section comprises a roughness pattern which is superimposed on the at least one anchoring element.

8. The attachment brush part according to claim 1, wherein the receiving of the fastening section of the bearing pin in the bearing pin receiver of the bristle carrier is effected via a press fit or friction fit.

9. The attachment brush part according to claim 1, wherein a depression for receiving the pin head is provided on the rear side of the housing head, so that the pin head in the depression is arranged flush with an outer surface of the housing head or is slightly sunk with respect to this.

10. The attachment brush part according to claim 1, wherein the first cylindrical section of the bearing pin with a smooth surface is arranged in the bearing sleeve with radial play so that the bearing pin can rotate within the bearing sleeve.

11. The attachment brush part according to claim 1, wherein the bearing pin has play in a longitudinal direction, so that the brush head is slightly displaceable along the carrier rotation axis relative to the housing head, such that stresses between the brush head and the housing head are avoided.

12. The attachment brush part according to claim 1, wherein the bearing pin consists of metal.

13. The attachment brush part according to claim 1, wherein a length of the bearing pin is 6 mm to 11 mm.

14. The attachment brush part according to claim 1, wherein a diameter of the pin shank is 0.5 mm to 2.5 mm.

15. The attachment brush part according to claim 1, wherein the drive rod has a brush-head-side end section, on which a first toothing is arranged, and the hand-part-side end section, and wherein the bristle carrier comprises a second toothing, and the first and the second toothing form a drive toothing for the driving of the brush head by the drive rod.

16. The attachment brush part according to claim 15, wherein the bristle carrier comprises a carrier body, on whose front side care bristles are arranged, as well as comprises a function unit which is arranged on a rear side of the carrier body, and the function unit comprises the second toothing, the bearing pin receiver for receiving the fastening section of the bearing pin which is formed as an anchoring section.

17. The attachment brush part according to claim 16, wherein the function unit comprises lateral stops for the limitation cam on the housing head.

18. The attachment brush part according to claim 17, wherein the limitation cam which interacts with the lateral stops on the brush head in a manner such that the rotation angle of the bristle carrier is limited, is arranged in the bristle carrier receiver of the housing head on the bearing sleeve for the bearing pin.

19. An electrical toothbrush, with a hand part and with the attachment brush part according to claim 1.

20. An attachment brush part for an electrical toothbrush, the attachment brush part being designed of several parts and comprising:

a brush head with a bristle carrier and with care bristles which are arranged on the bristle carrier;

an attachment brush housing with a housing head for receiving the bristle carrier of the brush head;

a drive rod for driving the brush head;

a securing element for rotatable mounting of a hand-part-side end section of the drive rod; and a bearing pin for positioning, securing and for an oscil-latorily rotatable mounting of the brush head on the attachment brush housing, wherein:

the bearing pin comprises a pin shank and a pin head with a diameter which is larger compared to the pin shank, and the pin shank towards the pin head comprises a first cylindrical section, and the pin shank towards a free end comprises a second fastening section with a struc-tured surface, the housing head is formed in one piece and comprises a bristle carrier receiver and a carrier receiver opening which is arranged on a front side as well as a bearing sleeve with a feed-through opening which leads from a rear side of the housing head into the bristle carrier receiver, wherein the bristle carrier is formed in one piece and at least partially engages with the bristle carrier receiver and the bearing pin is led from the outside and from the rear side of the housing head through the housing head and the feed-through opening of the bearing sleeve, wherein the pin head is arranged on the outside of the rear side of the housing head, the first cylindrical section serves as a bearing for the bearing pin in the bearing sleeve, and the bearing pin engages with the fastening section into a bearing pin receiver on the bristle carrier which is open to the rear side and establishes an axially and rotationally fixed connection to the bristle carrier such that the bearing pin at one hand forms a physical rotation axle for the bristle carrier and on the other hand fixes and holds the bristle carrier on the housing head, a cylinder-shaped end section of the bearing sleeve engages into a cylinder-shaped receiver arranged on the rear side of the bristle carrier, and the cylinder-shaped end section bears with an end surface on a contact shoulder which is arranged within the cylinder-shaped receiver and which surrounds the bear-ing pin receiver.

* * * * *